United States Patent
Kim et al.

(10) Patent No.: US 8,416,361 B2
(45) Date of Patent: Apr. 9, 2013

(54) DISPLAY APPARATUS

(75) Inventors: Cheolsoo Kim, Seoul (KR); Sunghwan Kim, Seoul (KR); Yunjoo Kim, Seoul (KR); Sangdon Park, Seoul (KR); Jonghyun Byeon, Seoul (KR); Moungyoub Lee, Seoul (KR); Hyoungsuck Oh, Seoul (KR); Deogjin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/288,122

(22) Filed: Nov. 3, 2011

(65) Prior Publication Data

US 2012/0050639 A1  Mar. 1, 2012

(30) Foreign Application Priority Data

| Jan. 12, 2011 | (KR) | 10-2011-0003123 |
| Jan. 12, 2011 | (KR) | 10-2011-0003124 |
| Jan. 17, 2011 | (KR) | 10-2011-0004541 |
| Jan. 17, 2011 | (KR) | 10-2011-0004544 |
| Mar. 31, 2011 | (KR) | 10-2011-0029966 |

(51) Int. Cl.
*G02F 1/1333* (2006.01)

(52) U.S. Cl.
USPC .............. 349/58; 349/65; 362/633; 362/634

(58) Field of Classification Search ........... 349/58, 349/60, 65, 122; 362/632, 633, 634, 97.2, 362/97.1, 612, 615
See application file for complete search history.

(56) References Cited

U.S. PATENT DOCUMENTS

| 8,319,912 | B2* | 11/2012 | Byeon et al. | 349/58 |
| 2003/0223249 | A1 | 12/2003 | Lee et al. | 362/561 |
| 2009/0225252 | A1 | 9/2009 | Jeong | 349/58 |
| 2009/0237583 | A1 | 9/2009 | Chol | 349/58 |
| 2009/0268121 | A1* | 10/2009 | Hisada | 349/58 |
| 2012/0062815 | A1* | 3/2012 | Kim et al. | 349/61 |
| 2012/0105761 | A1* | 5/2012 | Lee et al. | 349/58 |

(Continued)

FOREIGN PATENT DOCUMENTS

| EP | 2 058 693 A1 | 5/2009 |
| JP | 2001-183628 A | 7/2001 |

(Continued)

OTHER PUBLICATIONS

United States Notice of Allowance dated Sep. 24, 2012 issued in U.S. Appl. No. 13/283,738.

(Continued)

*Primary Examiner* — Edward Glick
*Assistant Examiner* — David Chung
(74) *Attorney, Agent, or Firm* — KED & Associates LLP

(57) ABSTRACT

A display device includes a display panel including a front substrate and a back substrate, a plurality of first brackets attached to a non-display area of a back surface of the back substrate using an adhesive, a frame disposed in the rear of the display panel, an optical layer disposed between the frame and the display panel, a light guide plate disposed between the frame and the optical layer, a light source disposed on the side of the light guide plate, a second bracket disposed on the plurality of first brackets, and a connection frame including a first portion inserted into a hole or a groove of each of the plurality of first brackets and a second portion connected to the second bracket.

17 Claims, 97 Drawing Sheets

U.S. PATENT DOCUMENTS

| | | | |
|---|---|---|---|
| 2012/0106048 A1* | 5/2012 | Byeon et al. | 361/679.01 |
| 2012/0106121 A1* | 5/2012 | Lee et al. | 362/19 |
| 2012/0106122 A1* | 5/2012 | Ryu et al. | 362/19 |
| 2012/0182700 A1* | 7/2012 | Byeon et al. | 361/749 |

FOREIGN PATENT DOCUMENTS

| | | | |
|---|---|---|---|
| JP | 2002-108238 A | 4/2002 | |
| JP | 2004-133098 A | 4/2004 | |
| JP | 2004-133099 A | 4/2004 | |
| JP | 2005-077557 A | 3/2005 | |
| JP | 2007-101938 A | 4/2007 | |
| JP | 2008-216814 A | 9/2009 | |
| KR | 10-1998-015704 A | 5/1998 | |
| KR | 10-1998-022417 A | 7/1998 | |
| KR | 10-2002-0031895 A | 5/2002 | |
| KR | 10-2002-0056704 A | 7/2002 | |
| KR | 10-2003-0074628 A | 9/2003 | |
| KR | 10-2004-0033818 A | 4/2004 | |
| KR | 10-0480822 B1 | 4/2005 | |
| KR | 10-0487435 B1 | 5/2005 | |
| KR | 10-2005-009692 A | 10/2005 | |
| KR | 10-0517136 B1 | 1/2006 | |
| KR | 10-2006-0133651 A | 2/2006 | |
| KR | 10-0570647 B1 | 4/2006 | |
| KR | 10-2008-0106604 A | 12/2008 | |
| KR | 10-2009-0016971 A | 2/2009 | |
| KR | 10-2009-0042452 A | 4/2009 | |
| KR | 10-0931583 B1 | 12/2009 | |
| KR | 10-2010-0077279 A | 7/2010 | |

OTHER PUBLICATIONS

International Search Report dated Dec. 22, 2011 issued in Application No. PCT/KR2011/002064.

Korean Notice of Allowance dated Feb. 20, 2012 issued in Application No. 10-2010-0106196.

Korean Office Action dated Apr. 12, 2012 issued in Application No. 10-2010-0092577.

International Search Report dated Apr. 16, 2012 issued in Application No. PCT/KR2011/009077.

International Search Report dated Apr. 13, 2012 issued in Application No. PCT/KR2011/008166.

International Search Report dated Apr. 27, 2012 issued in Application No. PCT/KR2011/008142.

European Search Report dated May 22, 2012 issued in Application No. 11 00 9073.

European Search Report dated May 29, 2012 issued in Application No. 11 00 8668.

United States Office Action dated Feb. 13, 2013 issued in U.S. Appl. No. 13/652,616.

* cited by examiner (A)

(B)

DISPLAY APPARATUS

This application claims the benefit of Korean Patent Application Nos. 10-2011-0003123, and 10-2011-0003124 both filed on Jan. 12, 2011; 10-2011-0004541 and 10-2011-0004545 both filed on Jan. 17, 2011; and 10-2011-0029966 filed on Mar. 31, 2011, which are incorporated herein by reference for all purposes as if fully set forth herein.

BACKGROUND OF THE INVENTION

1. Field of the Invention

Embodiments of the invention relate to a display device.

2. Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

In one aspect, there is a display device including a display panel including a front substrate and a back substrate, a plurality of first brackets attached to a non-display area of a back surface of the back substrate using an adhesive, a frame disposed in the rear of the display panel, an optical layer disposed between the frame and the display panel, a light guide plate disposed between the frame and the optical layer, a light source disposed on the side of the light guide plate, a second bracket on which the optical layer is disposed, the second bracket being disposed on the plurality of first brackets, and a connection frame connecting the first brackets and the second bracket.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
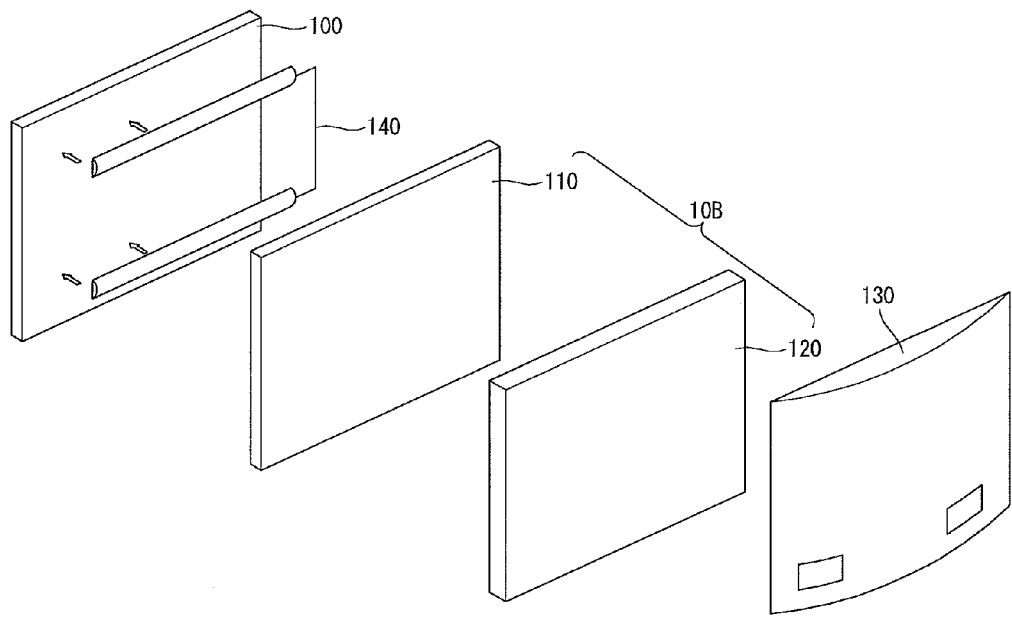
FIGS. 1 to 3 illustrate a configuration of a display device according to an example embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Hereinafter, a liquid crystal display panel is used as an example of a display panel. Other display panels may be used. For example, a plasma display panel (PDP), a field emission display (FED) panel, and an organic light emitting diode (OLED) display panel may be used.

Figure 2:
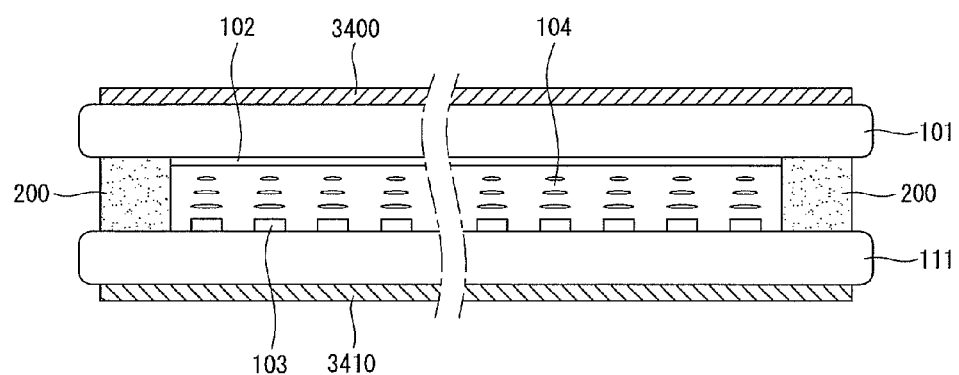
Figure 3:
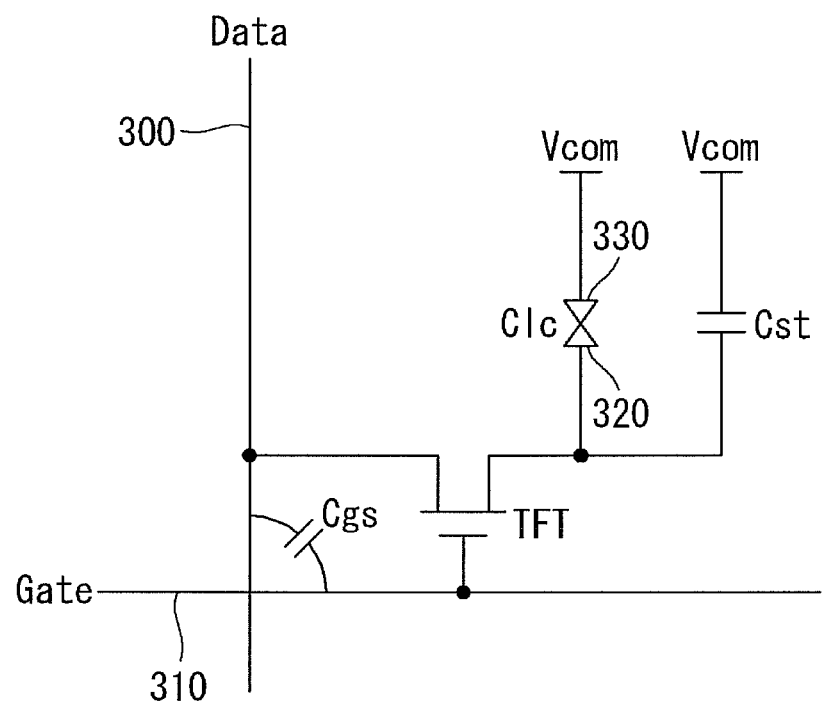

FIGS. 1 to 3 illustrate a configuration of a display device according to an example embodiment of the invention.

As shown in FIG. 1, a display device according to an example embodiment of the invention may include a display panel 100, a backlight unit 10B including an optical layer 110, a light source 120, a back cover 130, and a bracket 140.

Although not shown, the display panel 100 may include a front substrate and a back substrate that are positioned opposite each other. The bracket 140 may be attached to a back surface of the back substrate of the display panel 100.

The optical layer 110 may be disposed between the back substrate and the back cover 130. The optical layer 110 may not be fixed to the bracket 140. Even in this case, the optical layer 110 may be fixed by a pressure applied by both the backlight unit 120 and the back substrate.

Alternatively, the optical layer 110 may be fixed to the bracket 140. The optical layer 110 may include a plurality of sheets. For example, although not shown, the optical layer 110 may include at least one of a prism sheet and a diffusion sheet.

The backlight unit 10B may be positioned in the rear of the optical layer 110. Although not shown, the backlight unit 10B may further include a frame as well as the light source 120. In the embodiment disclosed herein, the backlight unit 10B includes the light source 120, the optical layer 110, and the frame (not shown). However, the backlight unit 10B may include a light guide plate (not shown). Further, in the embodiment disclosed herein, the backlight unit may be used as the light source 120 and thus may indicate the light source 120. In other word, the backlight unit 10B may be referred to as the light source. The configuration of the backlight unit may be variously changed.

Various types of light sources may be used in the embodiment of the invention. For example, the light source may be one of a light emitting diode (LED) chip and a LED package having at least one LED chip. In this instance, the light source may be a colored LED emitting one of red, green, and blue light or a white LED.

The back cover 130 may be positioned in the rear of the backlight unit 120. The back cover 130 may protect the backlight unit 120 and the optical layer 110 from the outside.

The optical layer 110 may be closely attached to the display panel 100. Alternatively, the backlight unit 120 may be closely attached to the optical layer 110. In this instance, a thickness of the display device according to the embodiment of the invention may be reduced.

As shown in FIG. 2, the display panel 100 may include a front substrate 101 and a back substrate 111, that are positioned opposite each other and are attached to each other to form a uniform cell gap therebetween. A liquid crystal layer 104 may be formed between the front substrate 101 and the back substrate 111. A seal part 200 may be formed between the front substrate 101 and the back substrate 111 to seal the liquid crystal layer 104.

A color filter 102 may be positioned on the front substrate 101 to implement red, green, and blue colors. The color filter 102 may include a plurality of pixels each including red, green, and blue subpixels. Other configurations of the subpixels may be used for the pixel. For example, each pixel may include red, green, blue, and white subpixels. When light is incident on the color filter 102, images corresponding to the red, green, and blue colors may be displayed.

A predetermined transistor 103, for example, a thin film transistor (TFT) may be formed on the back substrate 111. The transistor 103 may turn on or off liquid crystals in each pixel. Thus, the front substrate 101 may be referred to as a color filter substrate, and the back substrate 111 may be referred to as a TFT substrate.

The display panel 100 may include a front polarizing film 3400 and a back polarizing film 3410. The front polarizing film 3400 may be positioned on a front surface of the front substrate 101 to polarize light passing through the display panel 100. The back polarizing film 3410 may be positioned on a back surface of the back substrate 111 to polarize light passing through the optical layer 110 positioned in the rear of the back substrate 111. In the embodiment disclosed herein, the front polarizing film 3400 may be referred to as a first front polarizing film, and the back polarizing film 3410 may be referred to as a second front polarizing film.

The liquid crystal layer 104 may be formed of a plurality of liquid crystal molecules, and the arrangement of the liquid crystal molecules may change in response to a driving signal supplied by the transistor 103. Hence, light provided by the backlight unit may be incident on the color filter 102 in response to the molecular arrangement of the liquid crystal layer 104.

As a result, the color filter 102 may implement red, green, and blue light, and thus a predetermined image may be displayed on the front substrate 101 of the display panel 100.

As shown in FIG. 3, each pixel of the display panel 100 may include data lines 300, gate lines 310 crossing the data lines 300, and the TFT 103 connected to crossings of the data lines 300 and the gate lines 310.

The TFT 103 supplies a data voltage supplied through the data lines 300 to a pixel electrode 320 of a liquid crystal cell Clc in response to a gate pulse from the gate lines 310. The liquid crystal cell Clc is driven by an electric field generated by a voltage difference between a voltage of the pixel electrode 320 and a common voltage Vcom applied to a common electrode 330, thereby controlling an amount of light passing through a polarizing plate. A storage capacitor Cst is connected to the pixel electrode 320 of the liquid crystal cell Clc and holds a voltage of the liquid crystal cell Clc.

Since the above-described structure and the above-described configuration of the display panel 100 are only one example, they may be changed, added, or omitted.

FIGS. 4 to 35 illustrate a display device according to an embodiment of the invention. In the following description, the descriptions of the configuration and the structure described above are omitted.

Figure 4:
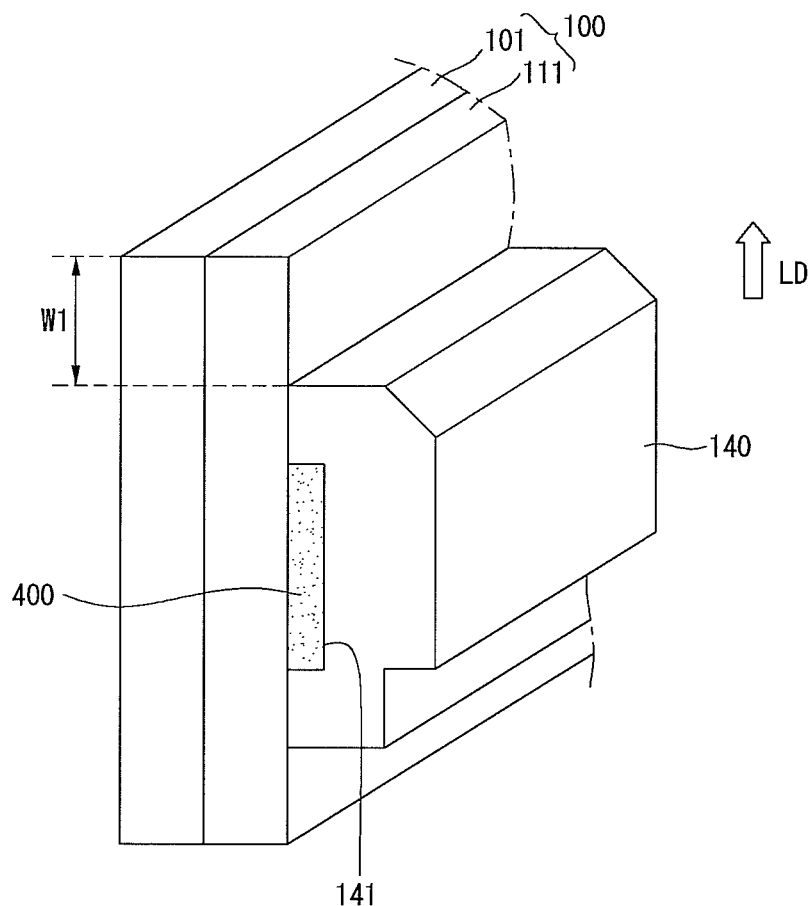
FIGS. 4 to 35 illustrate a display device according to an example embodiment of the invention.

As shown in FIG. 4, an adhesive layer 400 may be formed between the back surface of the back substrate 111 of the display panel 100 and the bracket 140. The bracket 140 may be attached to the back surface of the back substrate 111 using the adhesive layer 400.

When the bracket 140 is attached to the back surface of the back substrate 111 using the adhesive layer 400, a supporting member such as a pem nut and a boss and a fastening member such as a screw are not used. Therefore, a fixing process may be simply performed, the manufacturing cost may be reduced, and the thickness of the display device may be reduced.

A groove 141 may be formed in one surface of the bracket 140 facing the back substrate 111, so as to improve an adhesive strength between the bracket 140 and the back substrate 111. It may be preferable that the adhesive layer 400 is formed in the groove 141. In this instance, because the groove 141 may prevent from an adhesive material of the adhesive layer 400 from being discharged to the outside of the bracket 140, an attaching process may be easily performed.

When the bracket 140 is attached to the back surface of the back substrate 111, the display panel 100 may include a portion W1 extending further than the bracket 140 in a longitudinal direction of the display panel 100.

Figure 5:
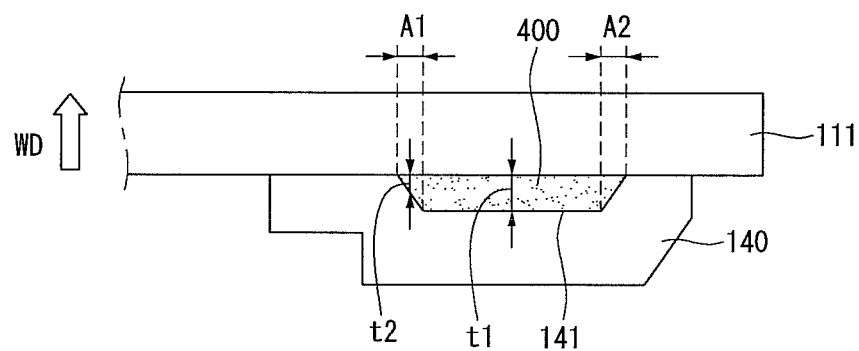

As shown in FIG. 5, the groove 141 may include portions having each a different depth.

More specifically, the groove 141 of the bracket 140 may include portions A1 and A2 each having a gradually decreasing or increasing depth in a width direction WD, so as to further improve the adhesive strength between the bracket 140 and the back substrate 111 while efficiently injecting the adhesive material of the adhesive layer 400 into the groove 141.

For example, a depth t1 of a middle portion of the groove 141 may be different from a depth t2 of an edge portion of the groove 141. A length of the groove 141 in the edge portion of the groove 141 may gradually decrease.

In other words, the adhesive layer 400 formed in the groove 141 may include portions having each a different thickness. For example, a width of a middle portion of the adhesive layer 400 may be greater than a width of an edge portion of the adhesive layer 400.

The bracket 140 may include a portion having different widths. More specifically, the bracket 140 may include a portion having different widths as measured in the longitudinal direction of the display panel 100, i.e., the horizontal direction. In other words, the bracket 140 may include a portion having a gradually decreasing width as the bracket 140 goes in the direction away from the display panel 100.

Figure 6:
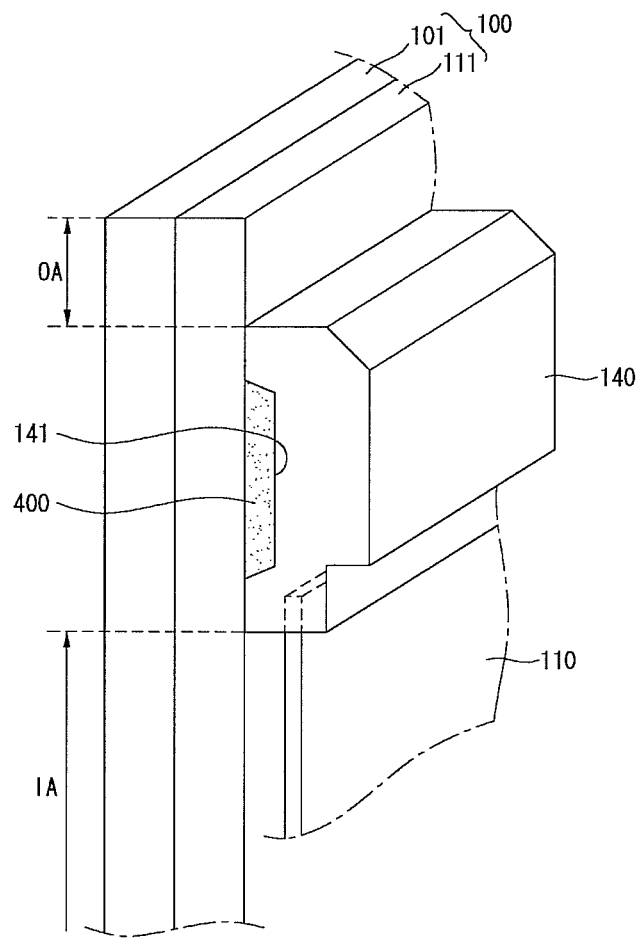

As shown in FIG. 6, the optical layer 110 may be positioned in an inner area IA of the bracket 140. The display panel 100 may extend in an outer area OA of the bracket 140.

Preferably, the optical layer 110 may be fixed to the bracket 140 in the inner area IA of the bracket 140. When the optical layer 110 is fixed to the bracket 140, a portion of the optical layer 110 may overlap the bracket 140. In other words, the portion of the optical layer 110 may be positioned inside the bracket 140 or contact the bracket 140.

Figure 7:
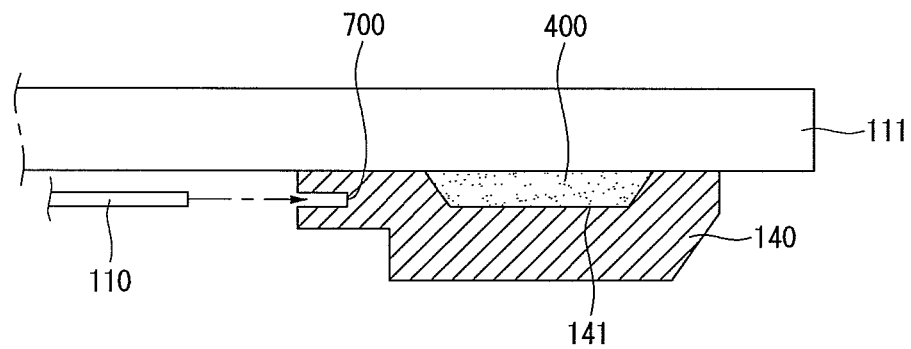

As shown in FIG. 7, a groove 700 may be formed in the bracket 140, so as to fix the optical layer 110 to the bracket 140. The optical layer 110 may be fixed to the bracket 140 by inserting the optical layer 110 into the groove 700. The groove 700 may be formed in the side of the bracket 140 and may be depressed in a direction parallel to the longitudinal direction of the display panel 100.

Figure 8:
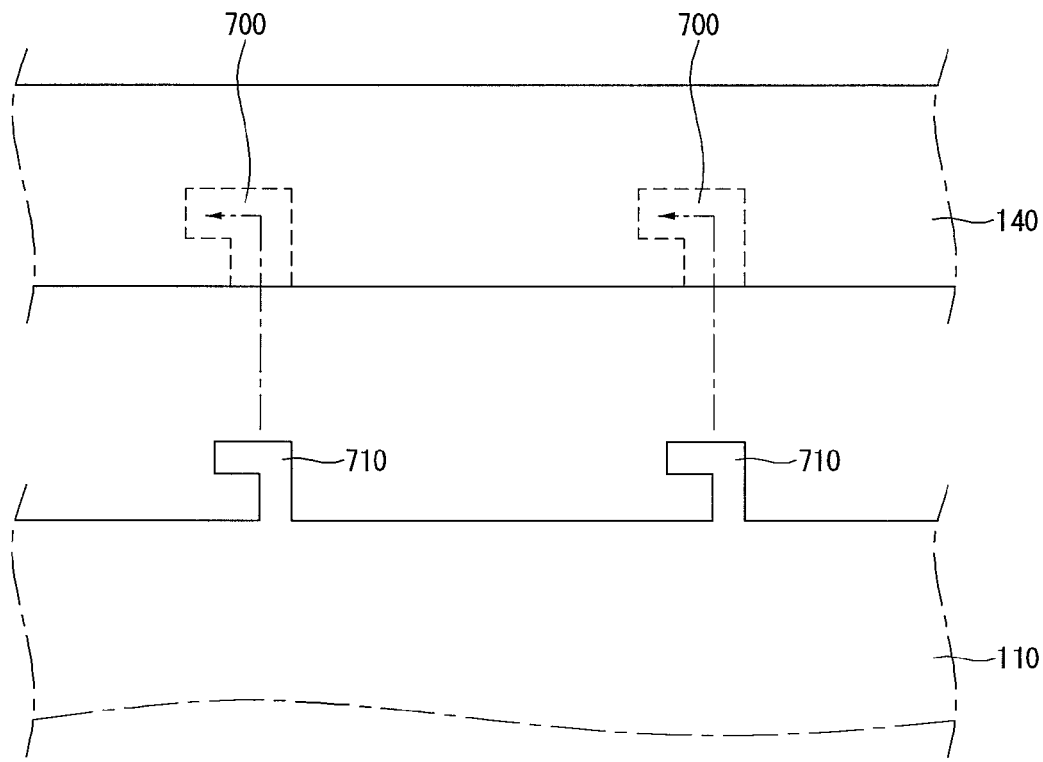

As shown in FIG. 8, the groove 700 may have a hook shape, so as to improve a coupling strength between the optical layer 110 and the bracket 140. In this instance, a protrusion 701 corresponding to the groove 700 may be formed in the optical layer 110. The optical layer 110 may be coupled with the bracket 140 by inserting the protrusion 701 into the groove 700.

Figure 9:
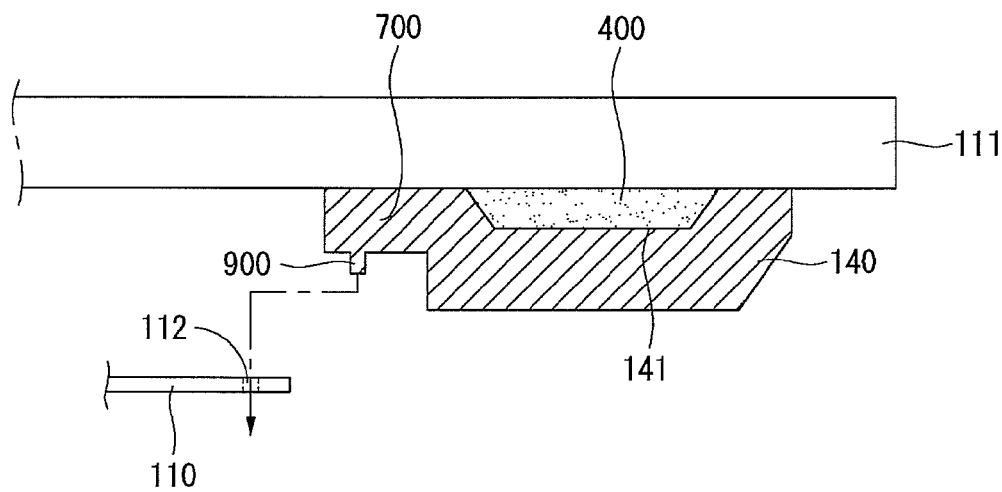

Alternatively, as shown in FIG. 9, a protrusion 900 may be formed in the bracket 140, a hole 112 may be formed in the optical layer 110, and the protrusion 900 of the bracket 140 may pass through the hole 112 of the optical layer 110. Hence, the optical layer 110 may be fixed to the bracket 140.

Figure 10:
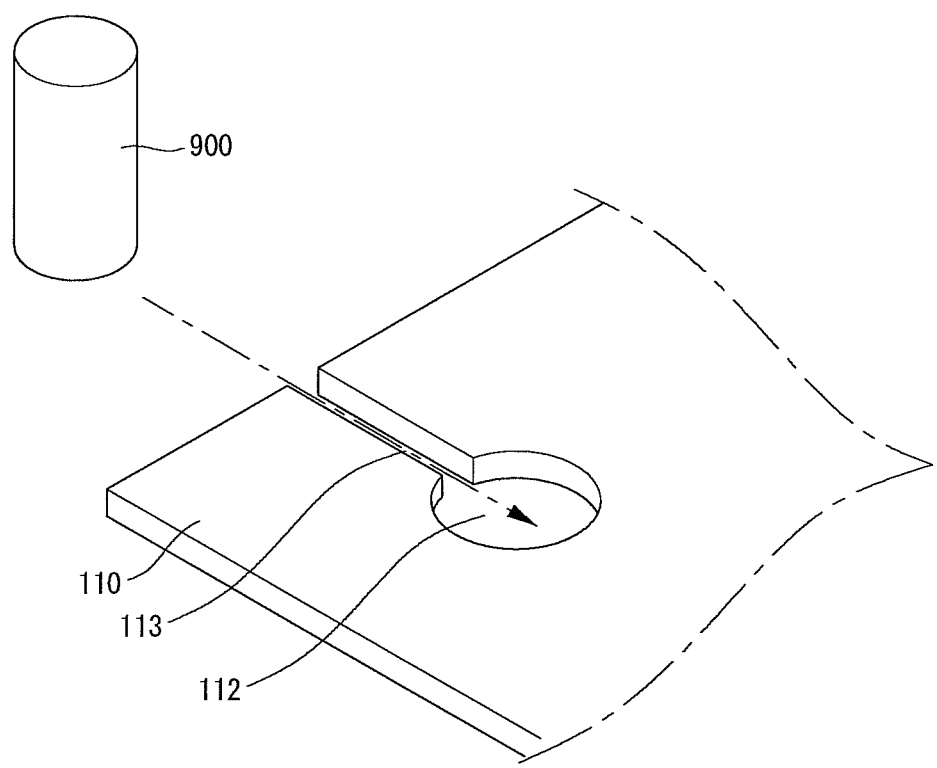

Alternatively, as shown in FIG. 10, the optical layer 110 may include a guide part 113 capable of passing through the hole 112 and the protrusion 900 of the bracket 140. The protrusion 900 of the bracket 140 may pass through the guide part 113 and may be positioned in the hole 112.

Figure 11:
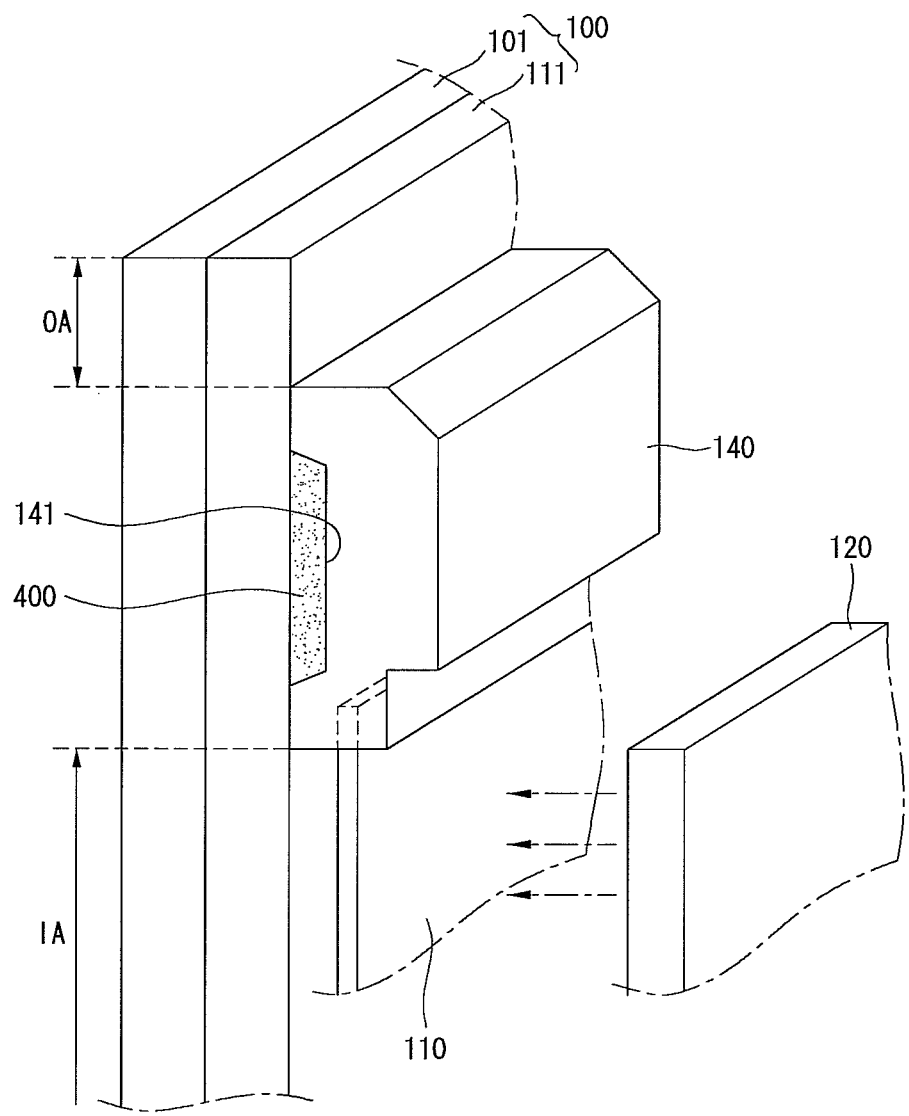

As shown in FIG. 11, the light source 120 may be positioned in the rear of the optical layer 110. The light source 120 may be a direct type light source and also may be an LED module including a plurality of LEDs and a substrate.

Figure 12:
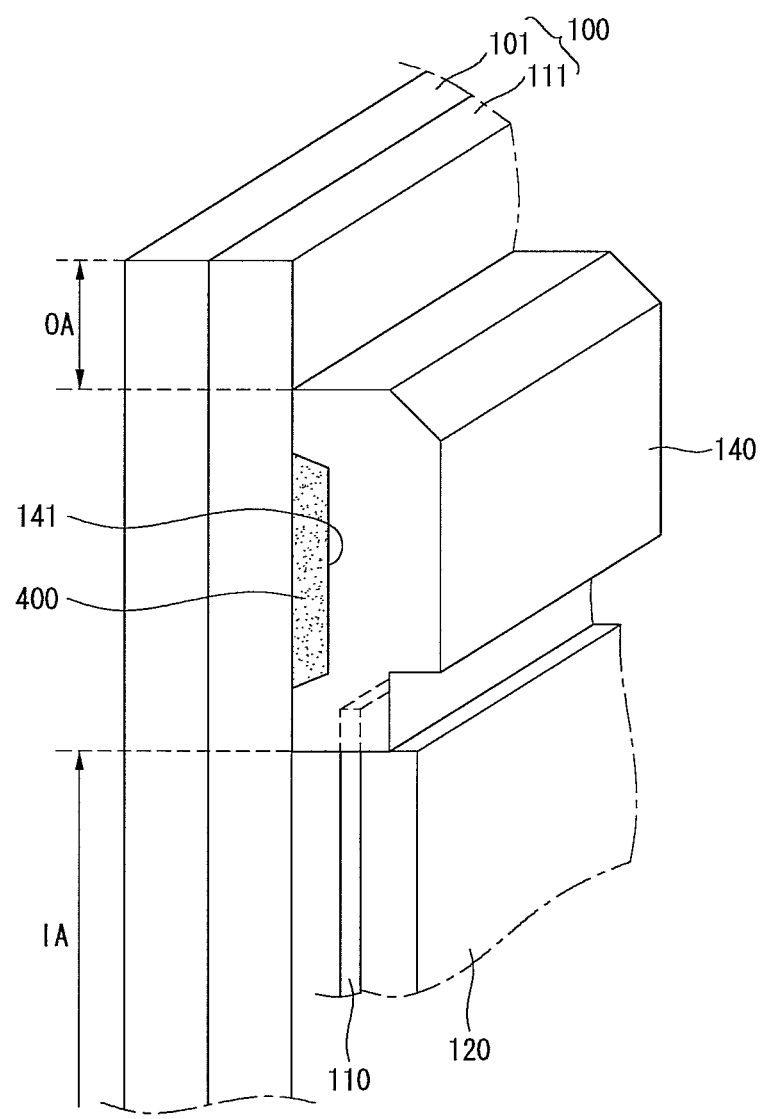

As shown in FIG. 12, the light source 120 may be attached to a back surface of the optical layer 110. For this, an adhesive layer (not shown) may be formed between the optical layer 110 and the light source 120.

Alternatively, unlike the structure illustrated in FIG. 12, the light source 120 may be separated from the optical layer 110 by a predetermined distance.

Figure 13:
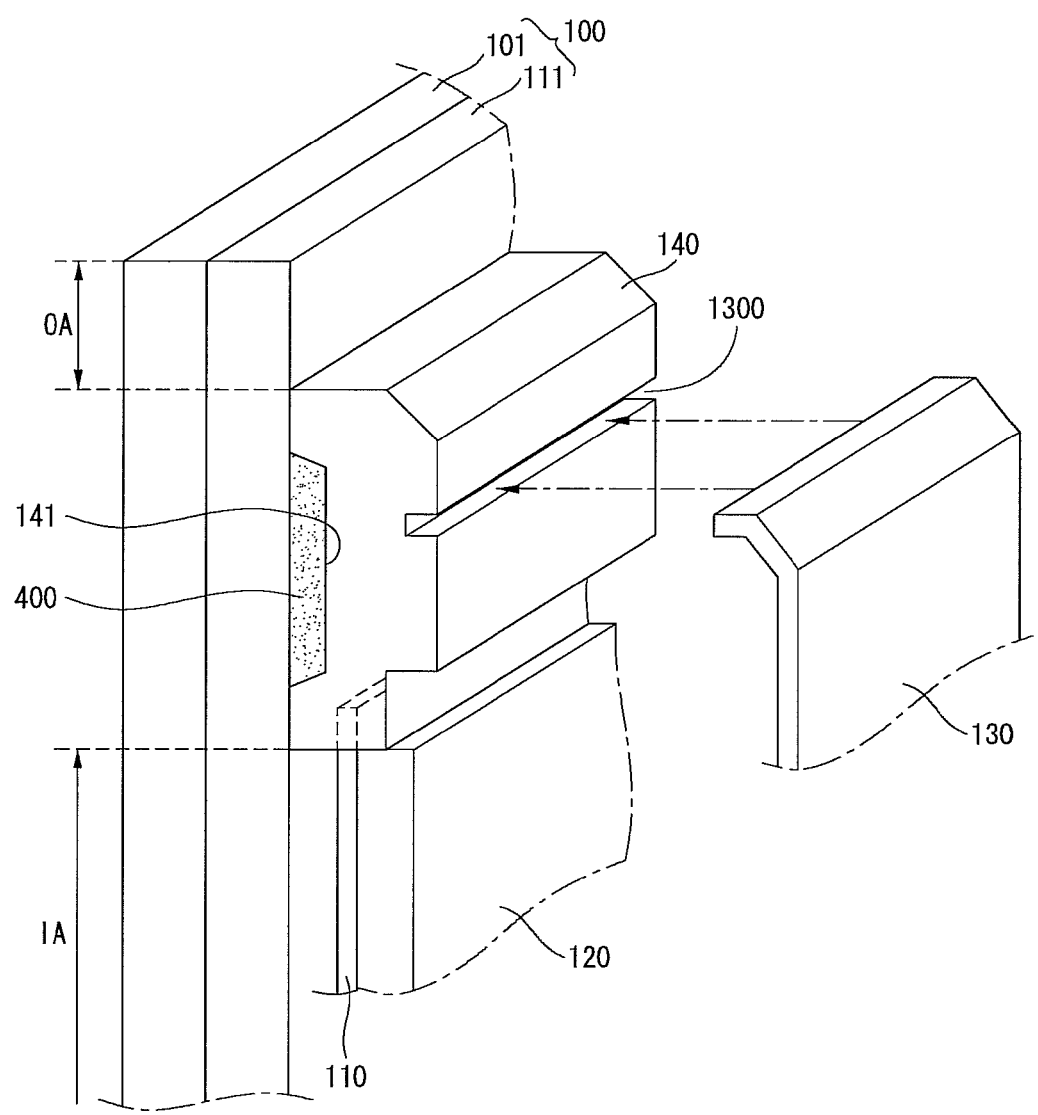

As shown in FIG. 13, the back cover 130 may be positioned in the rear of the backlight unit and may be fixed to the bracket 140. For this, a groove 1300 may be formed in the bracket 140 and may be depressed in a direction toward the display panel 100. The back cover 130 may be fixed to the bracket 140 by inserting an end of the back cover 130 into the groove 1300.

Figure 14:
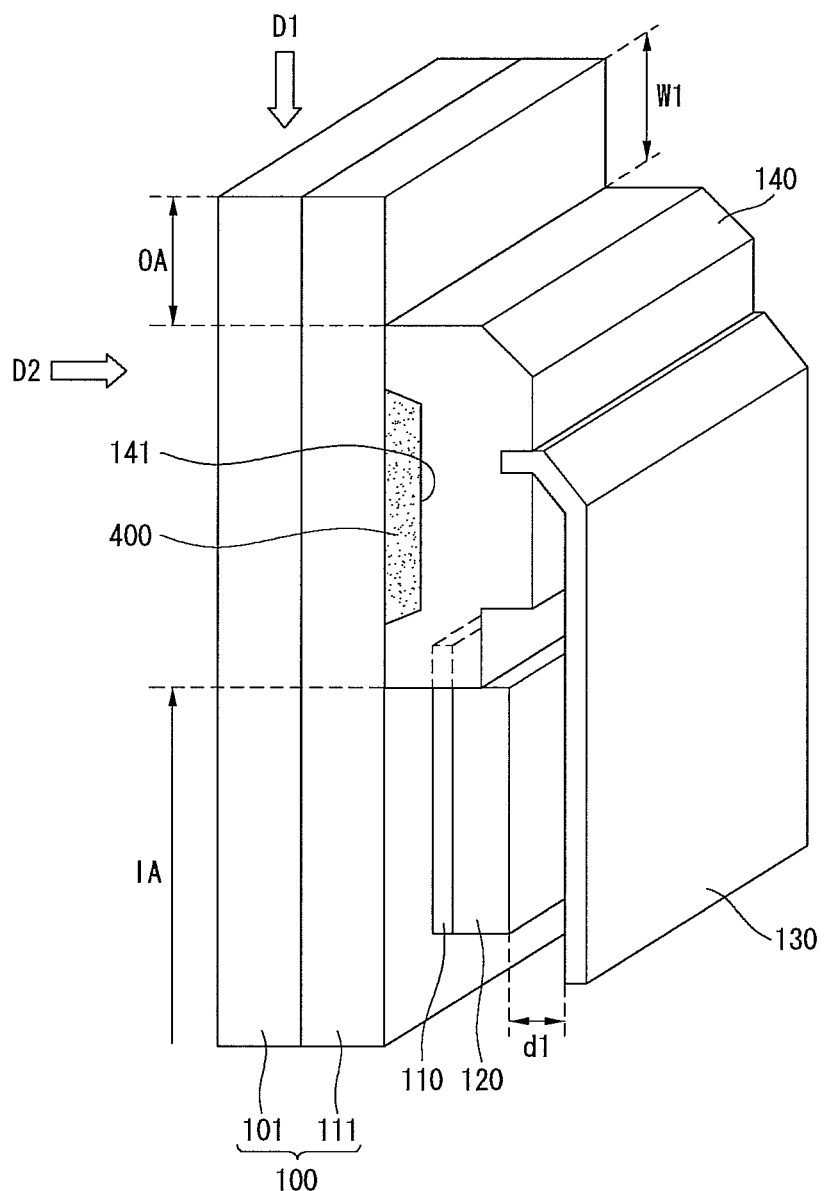

As shown in FIG. 14, when the back cover 130 is fixed to the bracket 140, the back cover 130 and the light source 120 (i.e., the back cover 130 and the backlight unit) may be separated from each other by a predetermined distance d1.

An edge of the front surface of the front substrate 101 or an edge of the side of the front substrate 101 may be exposed in a state where the back cover 130 is fixed to the bracket 140. The exposure of the edge of the front surface of the front substrate 101 may indicate that an edge of a front surface of the front polarizing film 3400 attached to the front substrate 101 is exposed.

The exposure of the edge of the front surface of the front substrate 101 may indicate that an observer can view the edge of the front surface of the front substrate 101 when the observer in the front of the display panel 100 views the front surface of the front substrate 101, i.e., when the observer in the front of the display panel 100 views the display panel 100 in a direction D2. The exposure of the edge of the side of the front substrate 101 may indicate that the observer can view the edge of the side of the front substrate 101 when the observer in the side of the display panel 100 views the front surface of the front substrate 101, i.e., when the observer in the side of the display panel 100 views the display panel 100 in a direction D1.

As above, when the edge of the front surface of the front substrate 101 or the edge of the side of the front substrate 101 is exposed after the back cover 130 is fixed to the bracket 140, the front substrate 101 may be formed of a tempered glass. In this instance, although the edge of the front surface of the front substrate 101 or the edge of the side of the front substrate 101 is exposed, the front substrate 101 may be prevented from being damaged by an external impact.

Further, a thickness of the front substrate 101 may be greater than a thickness of the back substrate 111, so as to further improve the rigidity of the front substrate 101. In this instance, although the front substrate 101 is exposed, the front substrate 101 may be prevented from being damaged.

Figure 15:
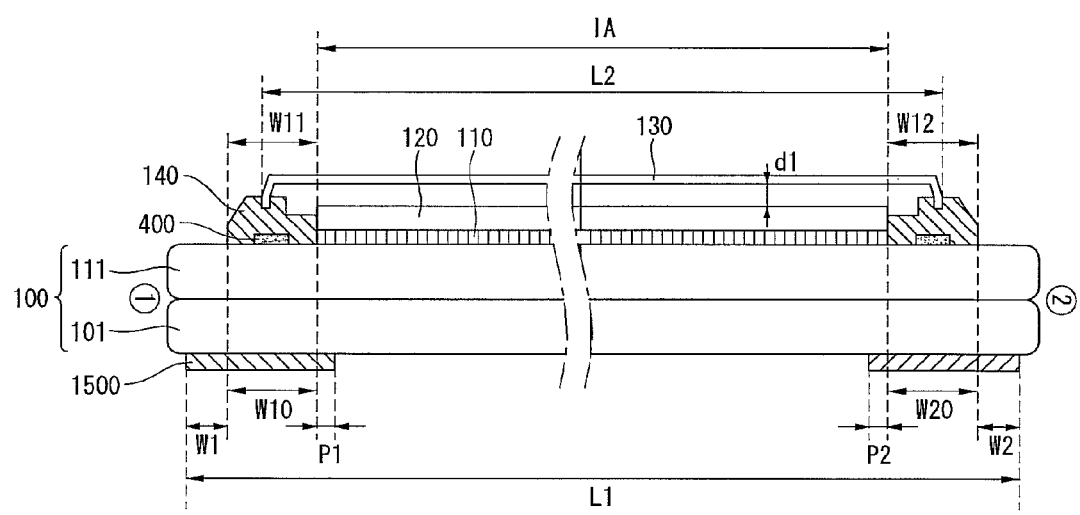

As shown in FIG. 15, a width L2 of the back cover 130 may be less than a width L1 of the display panel 100. In other words, the width L2 of the back cover 130 may be less than a width of at least one of the front substrate 101 and the back substrate 111 of the display panel 100.

In this instance, when the observer in the front of the display panel 100 views the display panel 100, the observer may observe almost the entire area of the display panel 100. Hence, an attractive appearance of the display panel 100 may be provided. Further, because another edge of the side of the display panel 100 may not be showed to the observer, a visual effect, in which the observer may feel that the screen size of the display panel 100 is greater than the real screen size of the display panel 100, may be obtained.

In this instance, the edge of the front surface of the front substrate 101 and the edge of the side of the front substrate 101 in each of an upper part (①) and a lower part (②) of the display panel 100 may be exposed.

It can be seen from FIG. 15 that the optical layer 110 is positioned in the inner area IA of the bracket 140.

A blocking member 1500 may be positioned at the edge of the front surface of the front substrate 101. Preferably, the blocking member 1500 may be attached to the edge of the front surface of the front substrate 101. Because the blocking member 1500 hides a dummy area positioned outside an active area of the display panel 100 on which an image is displayed, the image displayed on the active area may be more prominently showed.

The blocking member 1500 may have lightness lower than ambient lightness. For example, the lightness of the blocking member 1500 may be lower than lightness of the display panel 100. For this, the blocking member 1500 may be substantially black. For example, the blocking member 1500 may be substantially a black tape and may be formed by attaching a black tape to the front surface of the front substrate 101. Thus, the blocking member 1500 may be referred to as a black layer.

Figure 16:
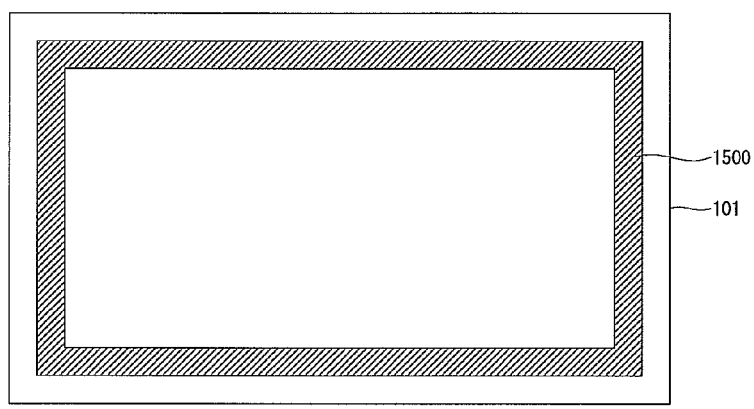

Because the blocking member 1500 is positioned on the front surface of the front substrate 101 and the edge of the front surface of the front substrate 101 is exposed, almost the entire portion of the blocking member 1500 may be exposed as shown in FIG. 16. In other words, when the observer in the front of the display panel 100 views the display panel 100, the observer may view almost the entire portion of the blocking member 1500. Namely, the observe may observe almost the entire portion of the blocking member 1500.

Because the bracket 140 does not display the image, it may be preferable that the bracket 140 is positioned in the dummy area outside the active area. Further, it may be preferable that the bracket 140 is hidden by the blocking member 1500. Hence, as shown in FIG. 15, the blocking member 1500 may overlap the bracket 140. Preferably, the bracket 140 may entirely overlap the bracket 140. More preferably, widths W10 and W20 of the blocking member 1500 may be greater than widths W11 and W12 of the bracket 140. In this instance, the blocking member 1500 may include portions P1 and P2 extending further than the bracket 140 in a middle direction of the front substrate 101. Further, the blocking member 1500 may include portions W1 and W2 extending further than the bracket 140 in the opposite direction of the middle direction of the front substrate 101.

The widths W10 and W20 of the blocking member 1500 and the widths W11 and W12 of the bracket 140 may be a width in a cross section of the display panel 100.

Figure 17:
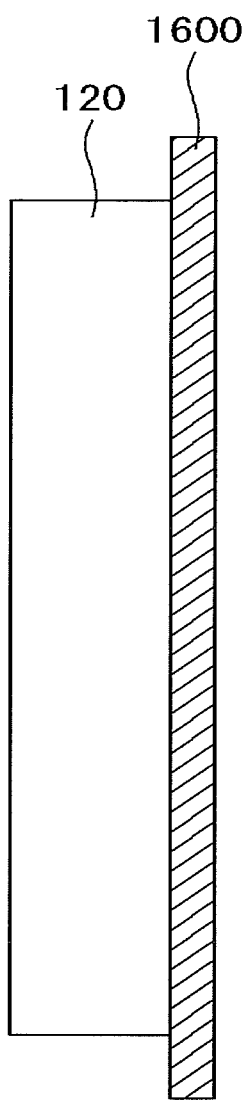

As shown in FIG. 17, a frame 1600 may be positioned in the rear of the light source 120. Namely, the backlight unit may further include the frame 1600. The frame 1600 may improve the structural stability of the backlight unit and the uniformity of light. Preferably, the frame 1600 may be attached to a back surface of the light source 120.

The frame 1600 may contain a material having a high strength and the thermal conductivity. For example, the frame 1600 may contain a metal material, preferably, aluminum (Al).

Figure 18:
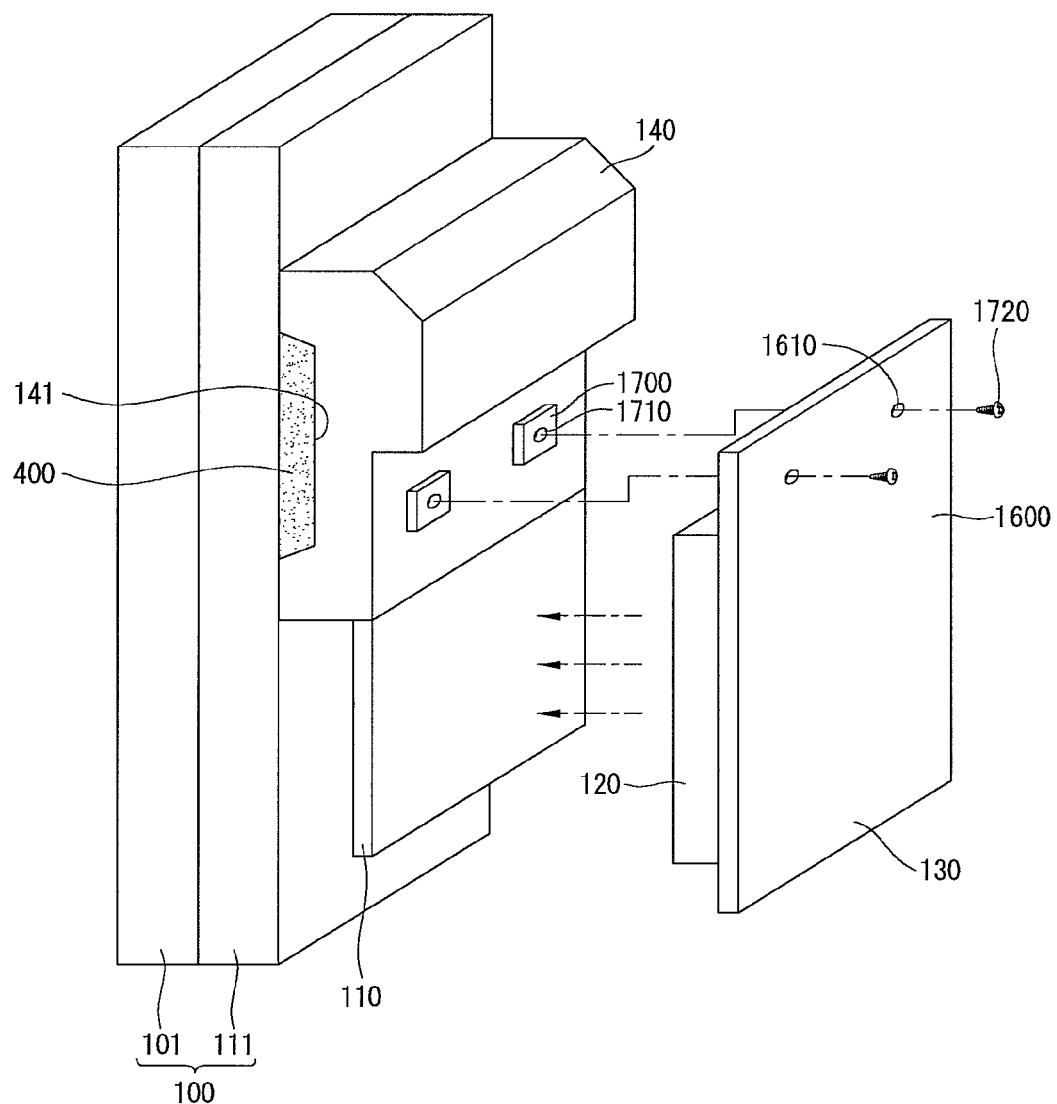

In this instance, the frame 1600 may be fixed to the bracket 140. More specifically, as shown in FIG. 18, a receiving part 1700 may be formed on the bracket 140, a coupling hole 1610 may be formed in the frame 1600, and a coupling member 1720 may pass through the coupling hole 1610 of the frame 1600. Hence, the coupling member 1720 may be fixed to the receiving part 1700 of the bracket 140. As a result, the frame 1600 may be fixed to the bracket 140.

Figure 19:
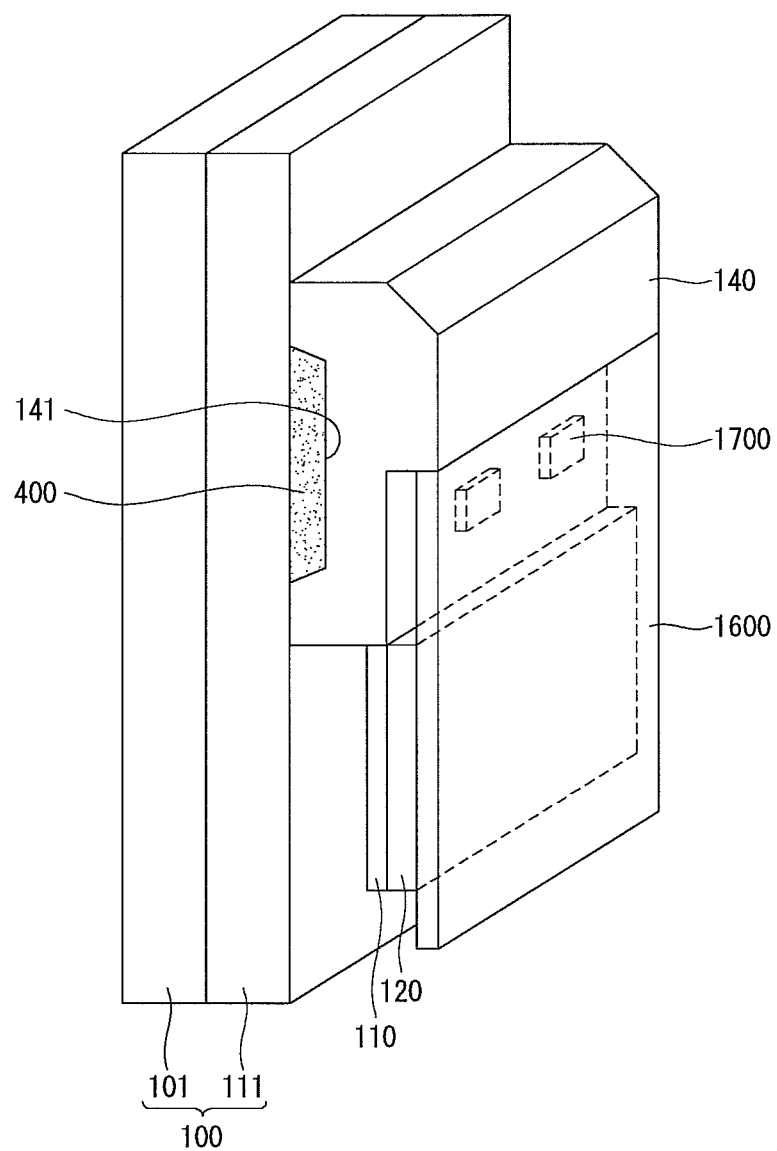

Even in this case, as shown in FIG. 19, the light source 120 and the optical layer 110 may be closely attached to each other.

Alternatively, unlike the structure illustrated in FIG. 19, the light source 120 and the optical layer 110 may be separated from each other.

When the frame 1600 is positioned in the rear of the backlight unit, the back cover 130 may be omitted.

Alternatively, when the frame 1600 is positioned in the rear of the backlight unit, the size of the back cover 130 may be reduced.

Alternatively, the frame 1600 may be separated from the backlight unit. Further, another structure may be added between the frame 1600 and the backlight unit.

Figure 20:
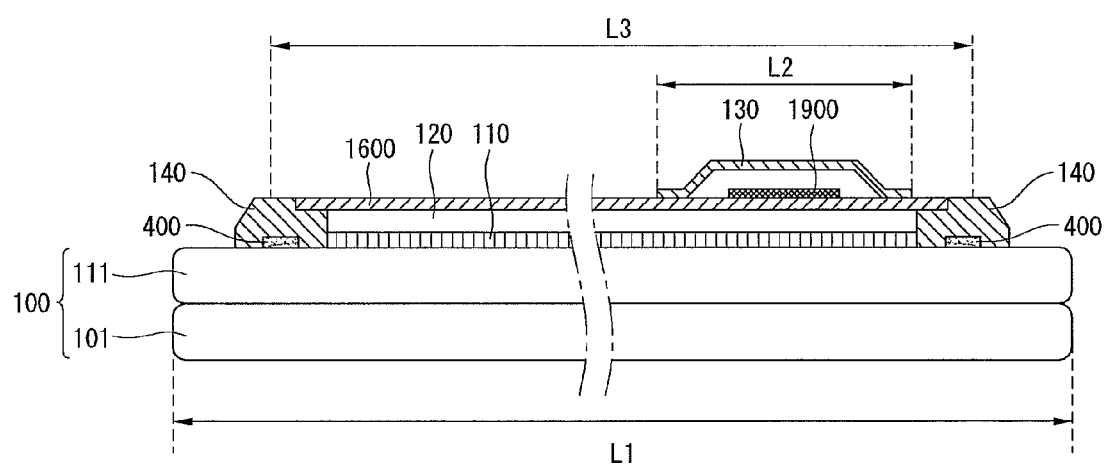

As shown in FIG. 20, the back cover 130 may be positioned on a portion of a back surface of the frame 1600. A driving board 1900 may be positioned between the back cover 130 and the frame 1600 to supply a driving signal to the display panel 100. In this instance, the width L2 of the back cover 130 may be less than a width L3 of the frame 1600. The width of the display panel 100, for example, the width L1 of the front substrate 101 may be greater than the width L2 of the back cover 130 and the width L3 of the frame 1600.

Figure 21:
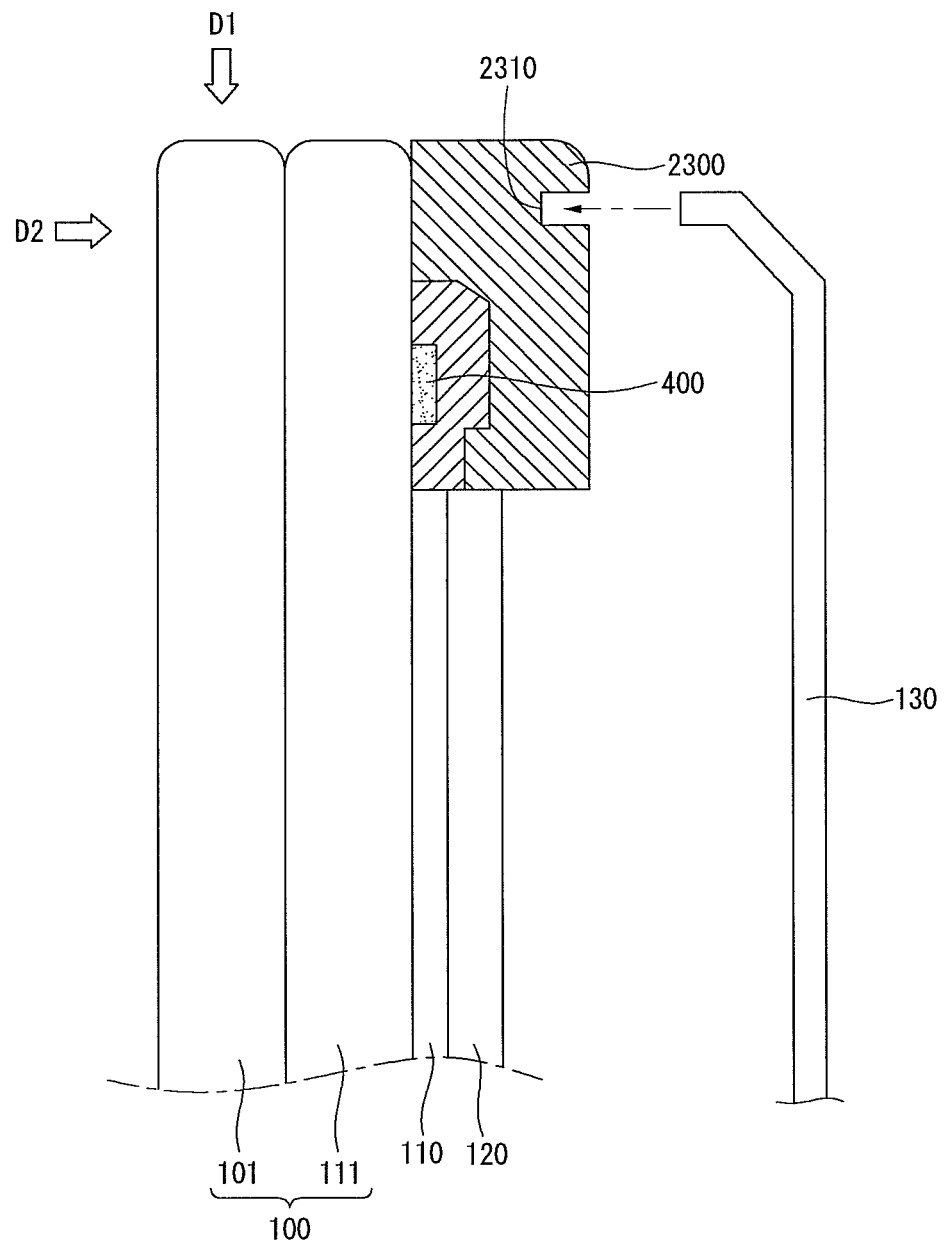

As shown in FIG. 21, an auxiliary bracket 2300 may be positioned between the bracket 140 and the back cover 130. When the auxiliary bracket 2300 is used, a design of the display device may be easily changed by changing the shape of the auxiliary bracket 2300 exposed to the outside without changing the shape of the bracket 140. More specifically, the connection structure of the back cover 130 may be easily changed using the auxiliary bracket 2300 without changing the location structure of the optical layer 110 or the backlight unit 120. Namely, the external shape such as the connection structure of the back cover 130 may be easily changed without changing the basic structure of the display device. In the embodiment disclosed herein, the bracket 140 may be referred to as a first bracket, and the auxiliary bracket 2300 may be referred to as a second bracket.

One side of the auxiliary bracket 2300 may be fixed to the bracket 140, and the other side of the auxiliary bracket 2300 may be fixed to the back cover 130.

The auxiliary bracket 2300 may have a groove 2310, that is depressed in a direction toward the bracket 140, so as to fix the back cover 130 to the auxiliary bracket 2300. An end of the back cover 130 may be inserted into the groove 2310.

When the back cover 130 is fixed to the auxiliary bracket 2300, the back cover 130 and the light source 120 (i.e., the back cover 130 and the backlight unit) may be separated from each other by a predetermined distance. This structure may be substantially the same as the structure illustrated in FIGS. 14 and 15, in which the back cover 130 fixed to the bracket 140 and the backlight unit are separated from each other by the predetermined distance.

Even when the back cover 130 is fixed to the auxiliary bracket 2300, the edge of the front surface of the front substrate 101 or the edge of the side of the front substrate 101 may be exposed. This structure was described above with reference to FIGS. 14 and 15.

Figure 22:
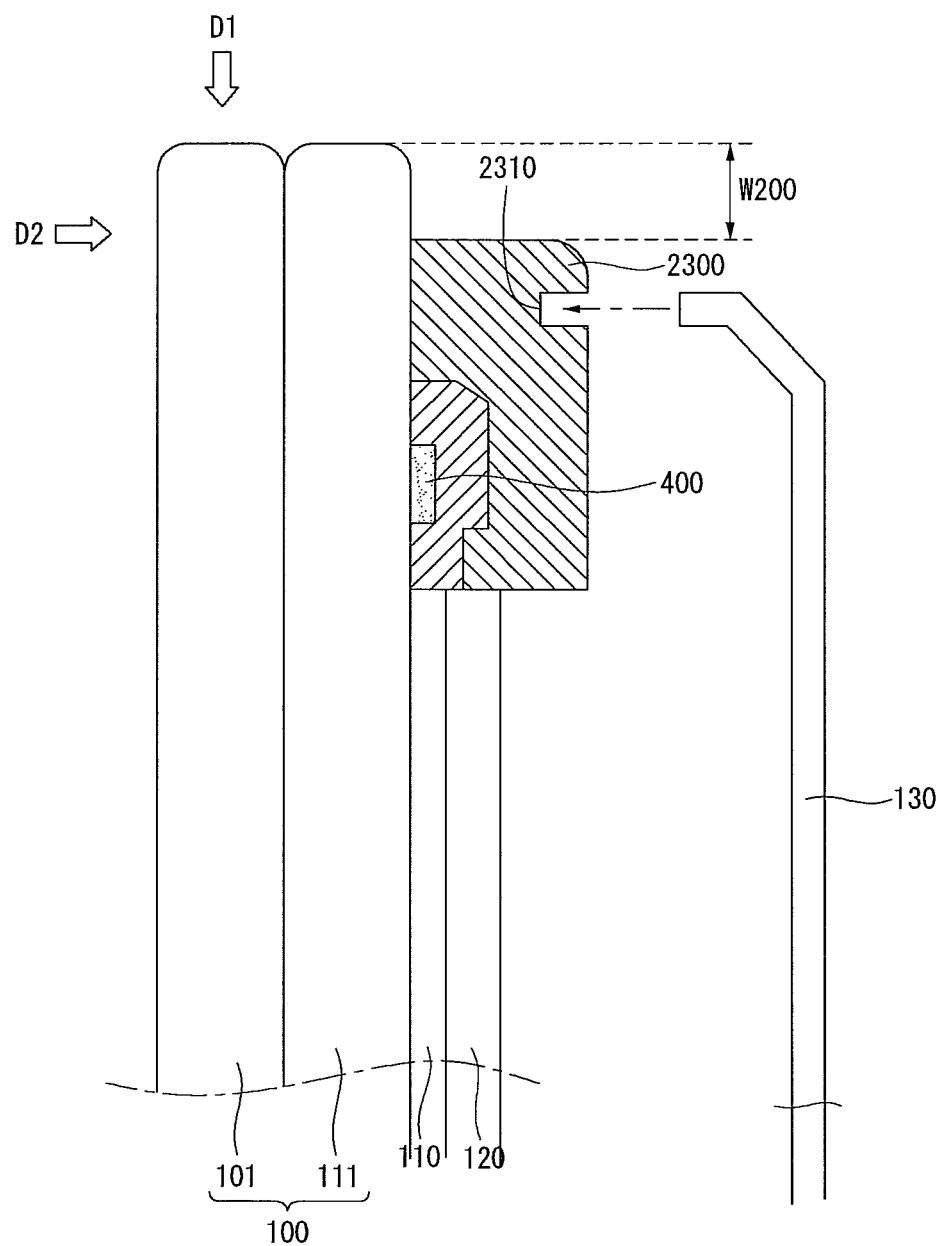

As shown in FIG. 22, the display panel 100 may include a portion W200 extending further than the auxiliary bracket 2300 in the longitudinal direction.

Figure 23:
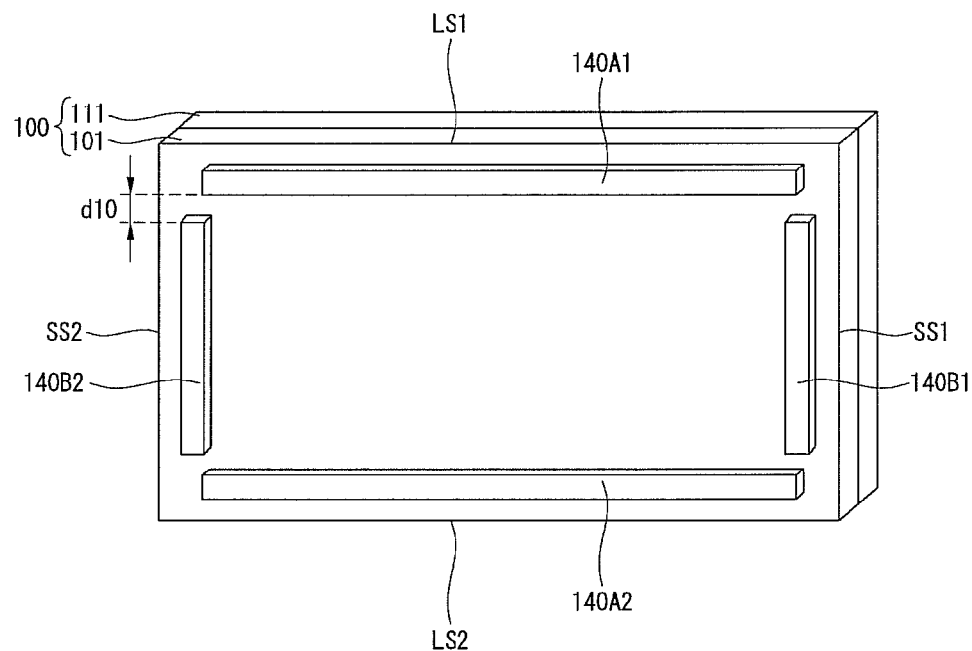

The bracket 140 may be divided into a plurality of parts. For example, as shown in FIG. 23, the bracket 140 may include transverse brackets 140A1 and 140A2 and longitudinal brackets 140B1 and 140B2.

The transverse brackets 140A1 and 140A2 may be respectively attached to long sides LS1 and LS2 of the back surface of the back substrate 111 of the display panel 100. The longitudinal brackets 140B1 and 140B2 may be respectively attached to short sides SS1 and SS2 of the back surface of the back substrate 111.

The transverse brackets 140A1 and 140A2 may be separated from the longitudinal brackets 140B1 and 140B2 by a predetermined distance d10. Preferably, the transverse brackets 140A1 and 140A2 and the longitudinal brackets 140B1 and 140B2 may be separated from each other in the corner of the back surface of the back substrate 111. In this instance, a process for attaching the transverse brackets 140A1 and 140A2 and the longitudinal brackets 140B1 and 140B2 to the back substrate 111 may be easily performed, and the manufacturing cost of the bracket 140 may be reduced. Hence, the manufacturing cost of the display device may be reduced.

Figure 24:
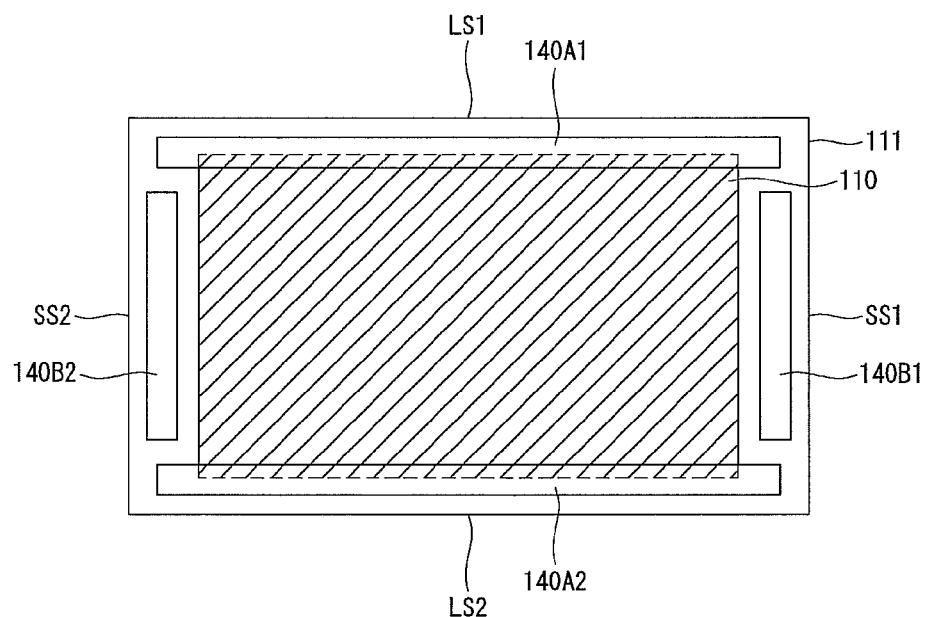

The optical layer 110 may be fixed to the transverse brackets 140A1 and 140A2, the longitudinal brackets 140B1 and 140B2, or both. For example, as shown in FIG. 24, the optical layer 110 may be fixed to the transverse brackets 140A1 and 140A2 and may not be fixed to the longitudinal brackets 140B1 and 140B2. In other words, the optical layer 110 may overlap or contact the transverse brackets 140A1 and 140A2. The optical layer 110 may not overlap the longitudinal brackets 140B1 and 140B2 and may be separated from the longitudinal brackets 140B1 and 140B2 by a predetermined distance.

Figure 25:
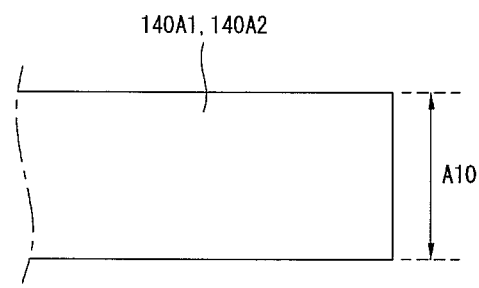

In this instance, widths A10 of the transverse brackets 140A1 and 140A2 may be different from widths A20 of the longitudinal brackets 140B1 and 140B2. Preferably, as shown in FIG. 25, the widths A10 of the transverse brackets 140A1 and 140A2 fixed to the optical layer 110 may be greater than the widths A20 of the longitudinal brackets 140B1 and 140B2. Because the optical layer 110 is not fixed to the longitudinal brackets 140B1 and 140B2, the widths A20 of the longitudinal brackets 140B1 and 140B2 may be less than the widths A10 of the transverse brackets 140A1 and 140A2.

Figure 26:
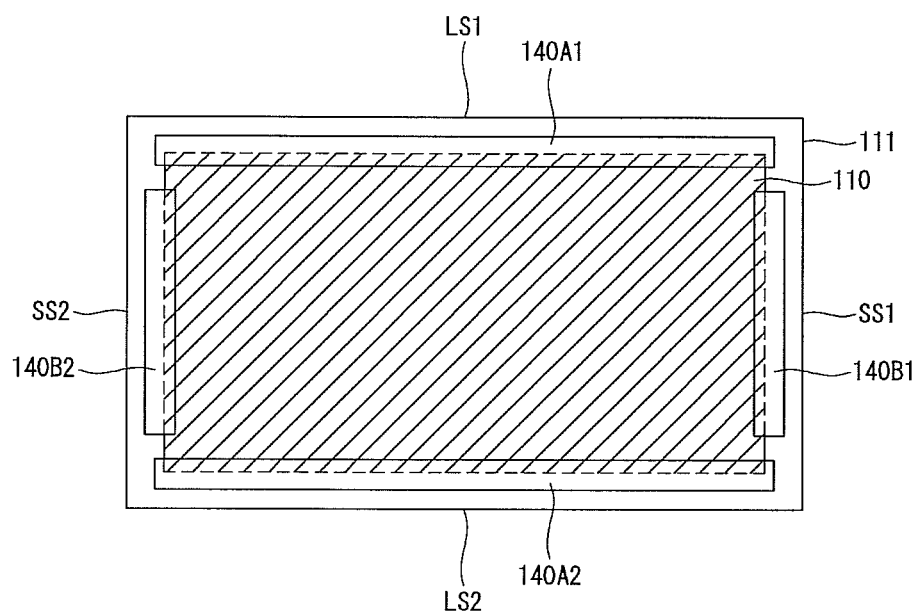

Alternatively, as shown in FIG. 26, the optical layer 110 may be fixed to the transverse brackets 140A1 and 140A2 and the longitudinal brackets 140B1 and 140B2. Even in this case, the widths A10 of the transverse brackets 140A1 and 140A2 may be greater than the widths A20 of the longitudinal brackets 140B1 and 140B2. Hence, the transverse brackets 140A1 and 140A2 longer than the longitudinal brackets 140B1 and 140B2 may mainly support the optical layer 110.

Figure 27:
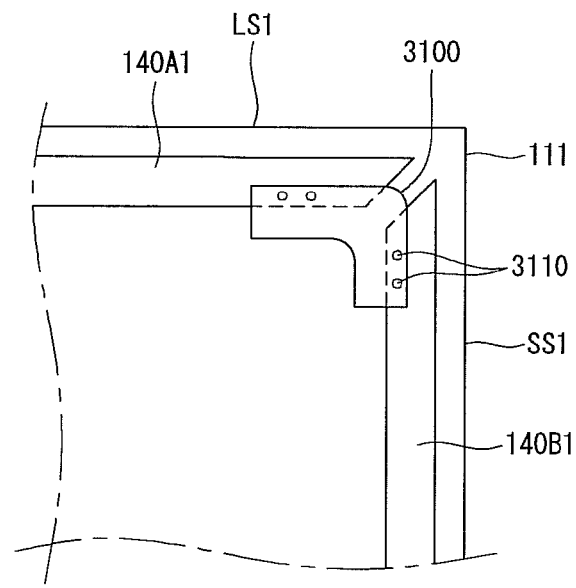

The transverse brackets 140A1 and 140A2 may be connected to the longitudinal brackets 140B1 and 140B2 using a predetermined connecting part. For example, as shown in FIG. 27, a connecting part 3100 may be positioned between the transverse brackets 140A1 and 140A2 and the longitudinal brackets 140B1 and 140B2 and may be connected to the transverse brackets 140A1 and 140A2 and the longitudinal brackets 140B1 and 140B2 using a predetermined coupling member 3110. Hence, the transverse brackets 140A1 and 140A2 may be connected to the longitudinal brackets 140B1 and 140B2.

Figure 28:
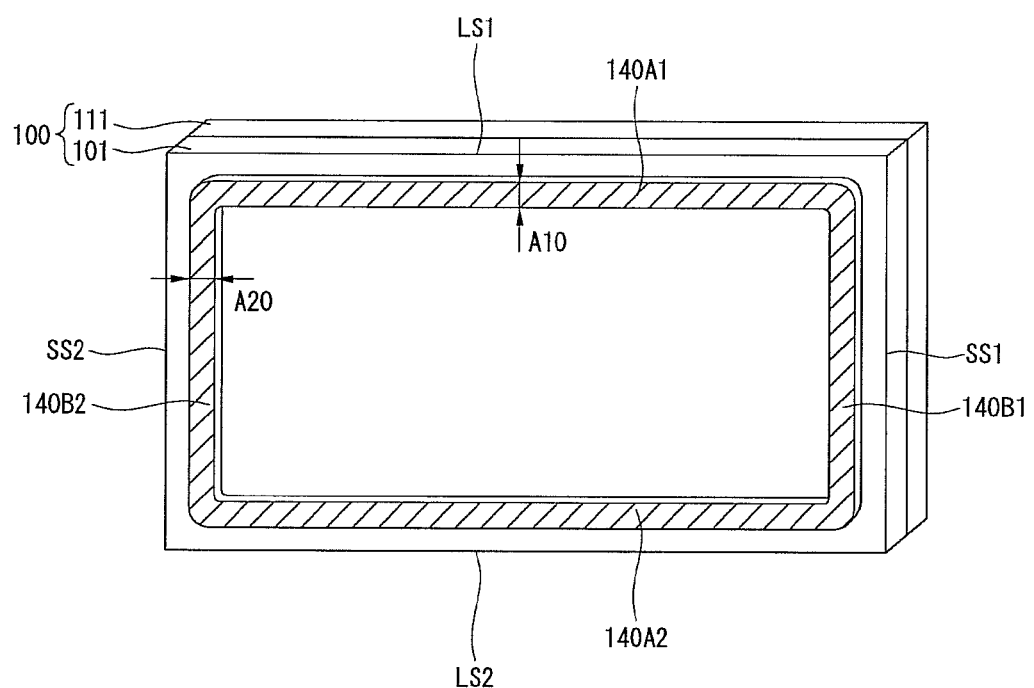

As shown in FIG. 28, the transverse brackets 140A1 and 140A2 and the longitudinal brackets 140B1 and 140B2 may form an integral body. In this instance, a portion of the bracket 140 positioned at the long sides LS1 and LS2 of the back substrate 111 may be referred to as a transverse bracket, and a portion of the bracket 140 positioned at the short sides SS1 and SS2 of the back substrate 111 may be referred to as a longitudinal bracket. Even in this case, the widths A10 of the transverse brackets 140A1 and 140A2 may be greater than the widths A20 of the longitudinal brackets 140B1 and 140B2.

Figure 29:
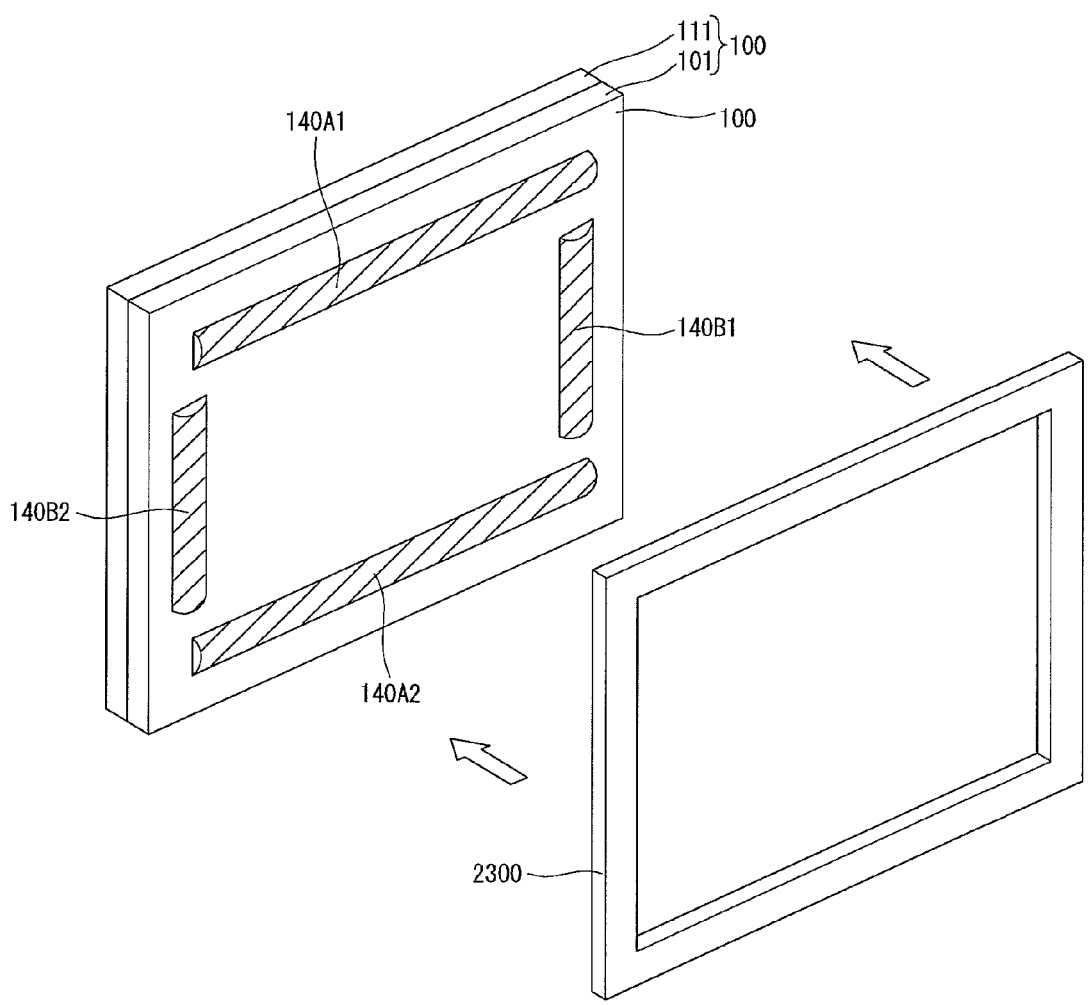

As shown in FIG. 29, the single auxiliary bracket 2300 may be connected to the transverse brackets 140A1 and 140A2 and the longitudinal brackets 140B1 and 140B2. In this instance, an empty space may be provided between the transverse brackets 140A1 and 140A2 and the longitudinal brackets 140B1 and 140B2 in a state where the single auxiliary bracket 2300 is connected to the transverse brackets 140A1 and 140A2 and the longitudinal brackets 140B1 and 140B2.

Figure 30:
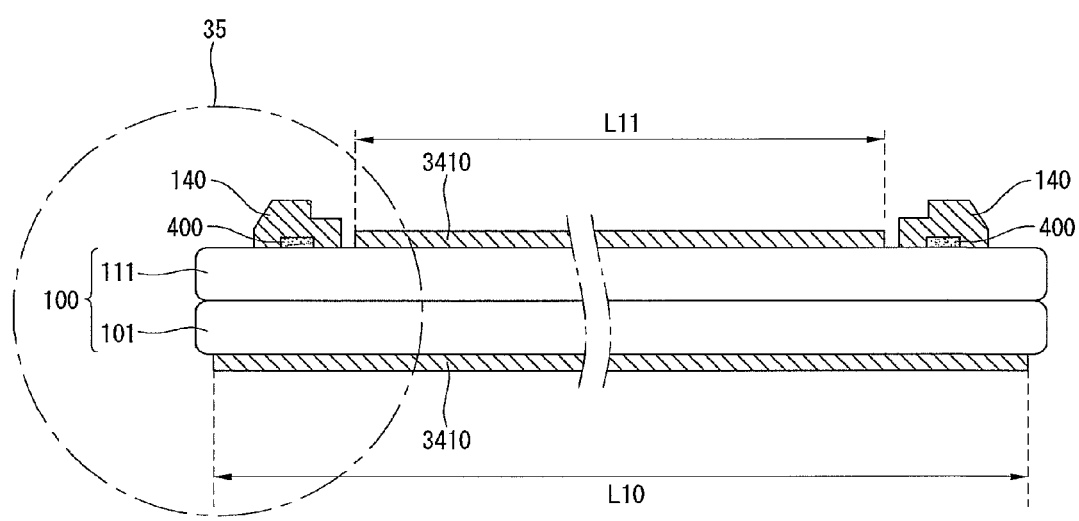

As shown in FIG. 30, a width L10 of the front polarizing film 3400 positioned on the front surface of the front substrate 101 may be different from a width L11 of the back polarizing film 3410 positioned on the back surface of the back substrate 111. The width L10 of the front polarizing film 3400 and the width L11 of the back polarizing film 3410 may be a width in the cross section of the display panel 100.

Preferably, the width L10 of the front polarizing film 3400 may be greater than the width L11 of the back polarizing film 3410. In other words, an end of at least one side of the front polarizing film 3400 may extend further than the back polarizing film 3410.

Figure 31:
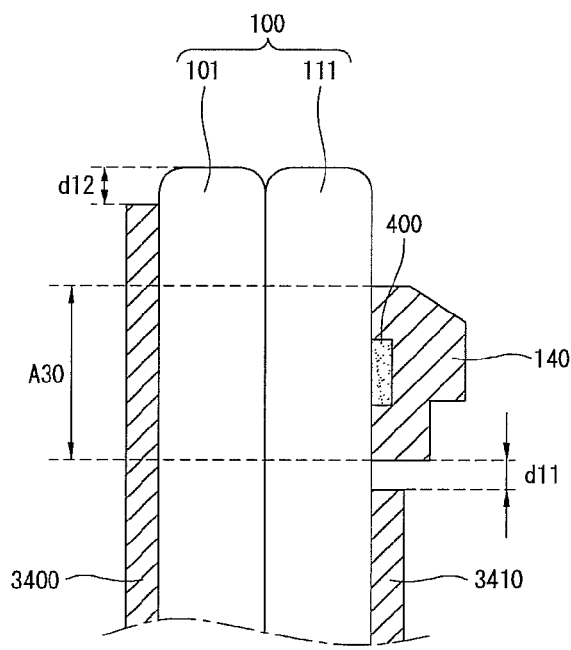

More specifically, as shown in FIG. 31, the front polarizing film 3400 may include a portion A30 overlapping the bracket 140. The bracket 140 may be separated from the back polarizing film 3410 by a predetermined distance d11 in a direction parallel to the longitudinal direction of the back substrate 111. In this instance, the bracket 140 may be directly attached to the back substrate 111. Hence, an adhesive strength between the bracket 140 and the back substrate 111 may be improved.

Further, the front polarizing film 3400 may be separated from an end of the front surface of the front substrate 101 by a predetermined distance d12. In this instance, a process for attaching the front polarizing film 3400 to the front substrate 101 may be easily performed, and the production yield may be improved.

Figure 32:
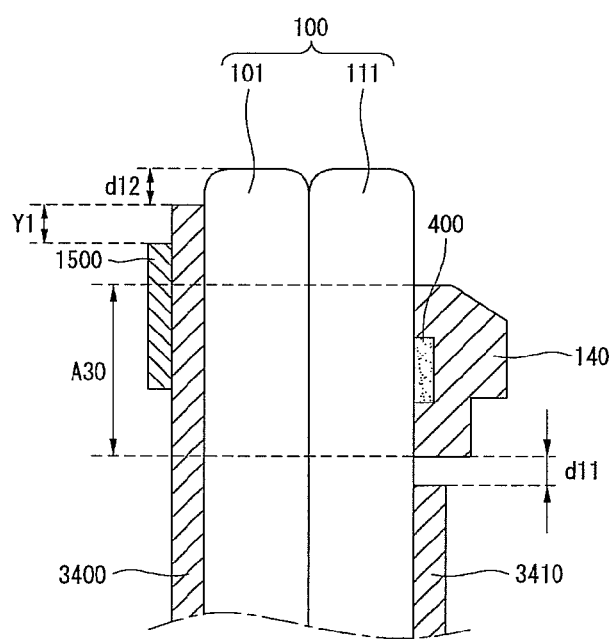

As shown in FIG. 32, the blocking member 1500 may overlap the front polarizing film 3400. For example, the blocking member 1500 may include a portion positioned on the front polarizing film 3400.

Further, the front polarizing film 3400 may include a portion Y1 extending further than the blocking member 1500 in an outside direction of the display panel 100. FIG. 32 shows that the blocking member 1500 is positioned on the front polarizing film 3400. However, the blocking member 1500 may be positioned between the front polarizing film 3400 and the front substrate 101. Even in this instance, the front polarizing film 3400 may include the portion Y1 extending further than the blocking member 1500 in the outside direction of the display panel 100.

Figure 33:
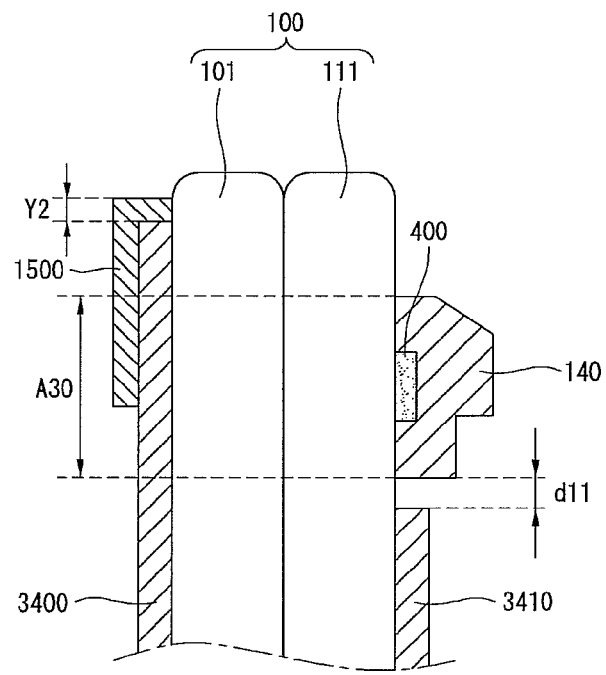

Alternatively, as shown in FIG. 33, the blocking member 1500 may include a portion Y2 extending further than the front polarizing film 3400 in the outside direction of the display panel 100. In this instance, the blocking member 1500 may contact both the front polarizing film 3400 and the front substrate 101.

FIG. 33 shows that the blocking member 1500 is positioned on the front polarizing film 3400. However, the blocking member 1500 may be positioned between the front polarizing film 3400 and the front substrate 101. Even in this case, the blocking member 1500 may include the portion Y2 extending further than the front polarizing film 3400 in the outside direction of the display panel 100.

Figure 34:
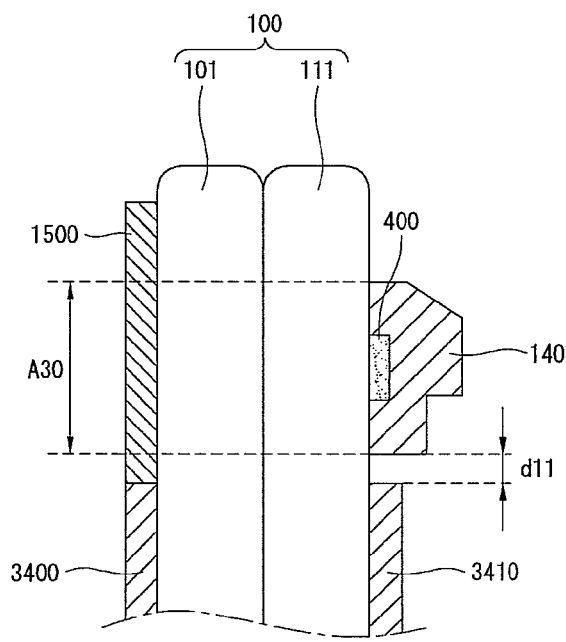

As shown in FIG. 34, the blocking member 1500 and the front polarizing film 3400 may be positioned on the same layer level. In this instance, the blocking member 1500 may be positioned outside the front polarizing film 3400.

Figure 35:
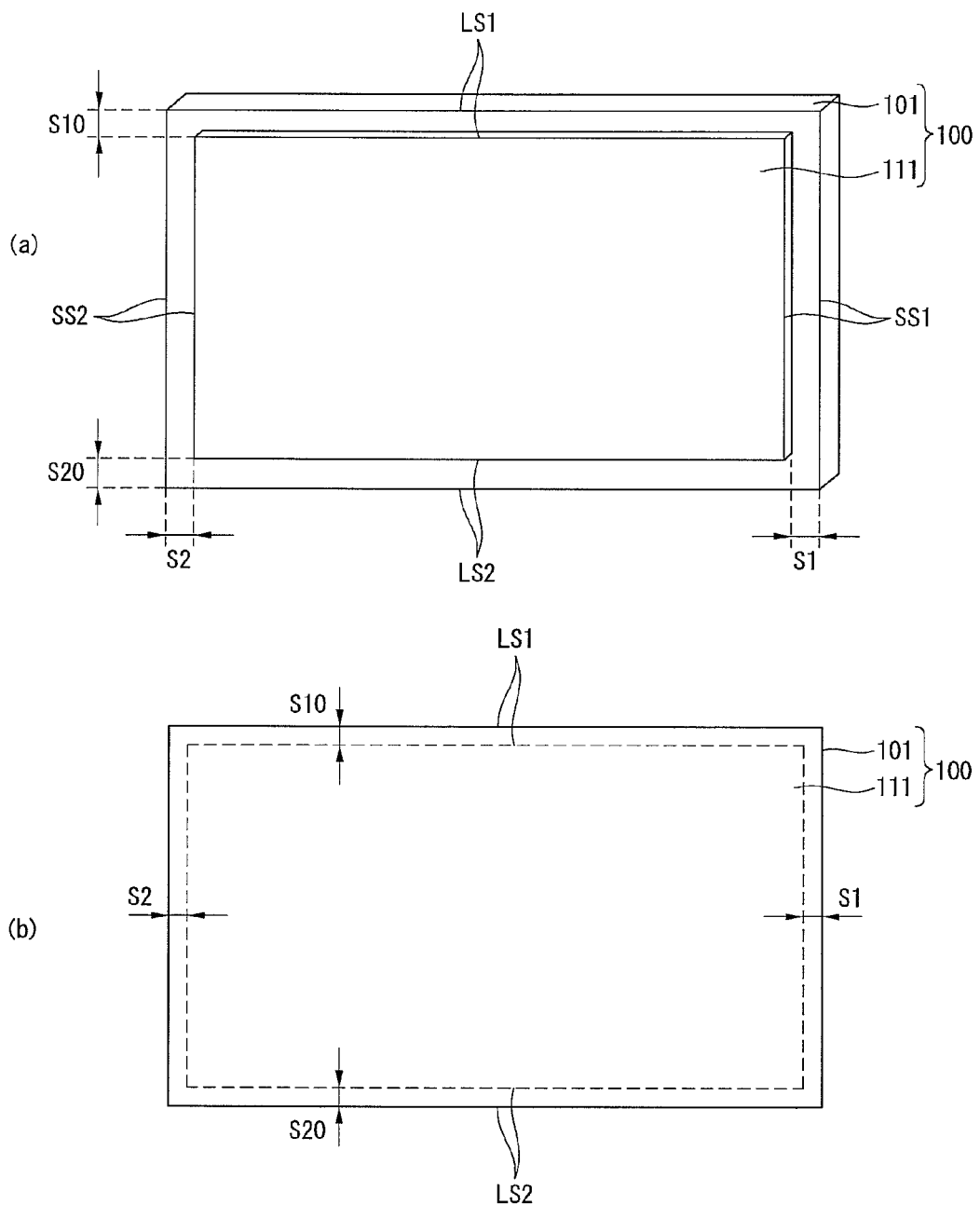

As shown in (a) and (b) of FIG. 35, the short sides SS1 and SS2 of the front substrate 101 may extend further than the short sides SS1 and SS2 of the back substrate 111, and the long sides LS1 and LS2 of the front substrate 101 may extend further than the long sides LS1 and LS2 of the back substrate 111.

For example, a first short side SS1 of the front substrate 101 may extend further than a first short side SS1 of the back substrate 111 corresponding to the first short side SS1 of the front substrate 101 by a first length S1. A second short side SS2 of the front substrate 101 may extend further than a second short side SS2 of the back substrate 111 corresponding to the second short side SS2 of the front substrate 101 by a second length S2.

The first length S1 may be substantially equal to the second length S2. Alternatively, the first length S1 may be different from the second length S2. In this instance, the structure of the first short side SS1 of the front substrate 101 may be different from the structure of the second short side SS2 of the front substrate 101.

For example, a sufficient space may be provided in the first short side SS1 of the back substrate 111, so as to mount a gate driver on the first short side SS1 of the back substrate 111 corresponding to the first short side SS1 of the front substrate 101. In this instance, the first length S1 may be less than the second length S2.

Further, a first long side LS1 of the front substrate 101 may extend further than a first long side LS1 of the back substrate 111 corresponding to the first long side LS1 of the front substrate 101 by a length S10. A second long side LS2 of the front substrate 101 may extend further than a second long side LS2 of the back substrate 111 corresponding to the second long side LS2 of the front substrate 101 by a length S20. The length S10 and the length S20 may be different from each other.

FIGS. 36 to 67 illustrate another configuration of the display device according to the embodiment of the invention. In the following description, the descriptions of the configuration and the structure described above are omitted. For example, the display device, in which the auxiliary bracket is omitted, is described below. However, the following description may be applied to the display device including the auxiliary bracket connected to the bracket.

Figure 36:
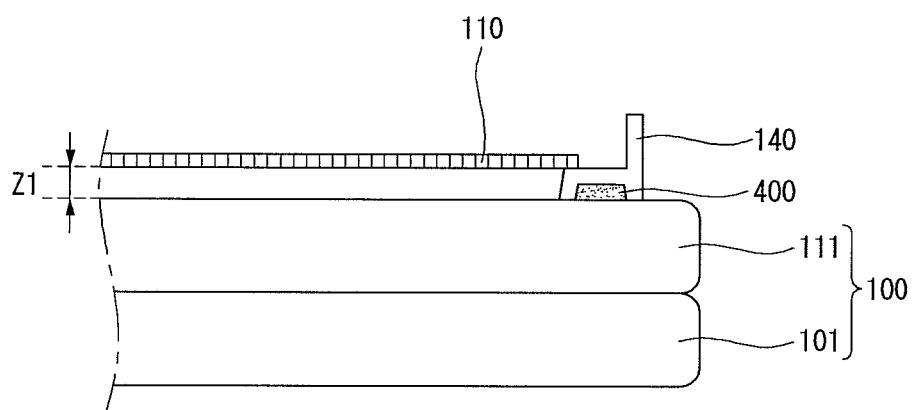
FIGS. 36 to 67 illustrate another configuration of a display device according to an example embodiment of the invention.

As shown in FIG. 36, the optical layer 110 may not be fixed to the bracket 140 and may be placed on one surface of the bracket 140. In this instance, the optical layer 110 may move on the bracket 140.

The shape of the bracket 140 shown in FIG. 36 is different from the shape of the bracket 140 described above. However, the bracket 140 shown in FIG. 4 may be applied to the structure illustrated in FIG. 36. In other words, the embodiment of the invention does not limit the shape of the bracket 140.

Because the structure illustrated in FIG. 36 may be implemented through the simple process for disposing the optical layer 110 on the bracket 140, the manufacturing process may be simplified. Further, if the optical layer 110 is designed so that its size corresponds to the size of the bracket 140, the movement of the optical layer 110 on the bracket 140 when the optical layer 110 is placed on the bracket 140 may be limited.

Figure 37:
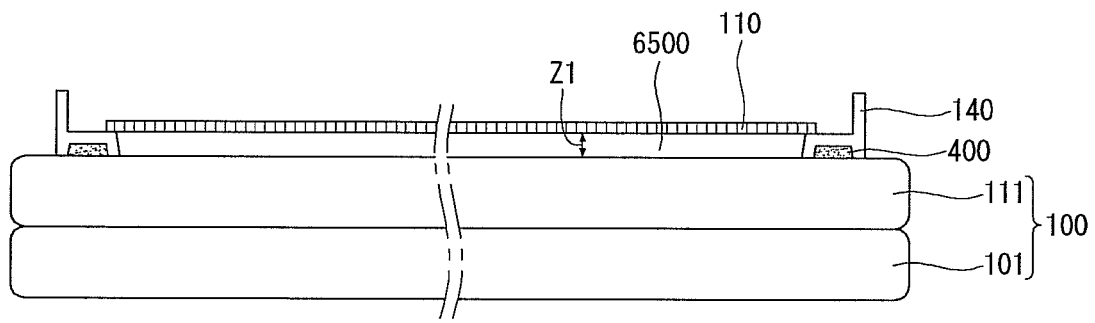

As above, when the optical layer 110 is placed on the bracket 140, the optical layer 110 may be separated from the back substrate 111 of the display panel 100 by a predetermined distance Z1. Hence, as shown in FIG. 37, an air gap 6500 may be formed between the back substrate 111 and the optical layer 110.

As above, when the air gap 6500 is formed between the back substrate 111 and the optical layer 110, the optical characteristics of the display device may be improved by the air gap 6500.

Figure 38:
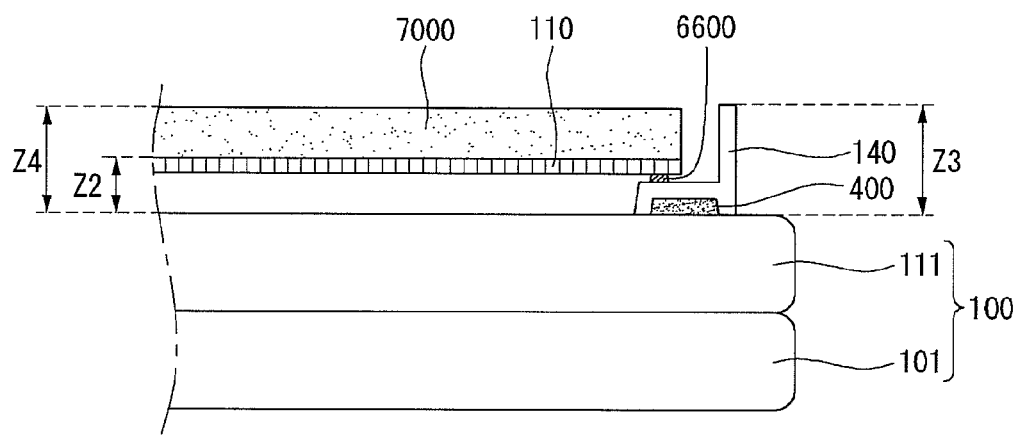

As shown in FIG. 38, a fixing part 6600 may be disposed on one surface of the bracket 140, and the optical layer 110 may be disposed on the fixing part 6600. The fixing part 6600 may have a shape protruding in the direction away from the display panel 100.

As above, when the optical layer 110 is disposed on the fixing part 6600, the size of a contact surface between the optical layer 110 and the fixing part 6600 may be relatively small. Therefore, a damage of the optical layer 110 may be prevented.

The fixing part 6600 contacting the optical layer 110 may be tender than the bracket 140, so as to suppress the movement of the optical layer 110 and to sufficiently prevent the damage of the optical layer 110. For example, the fixing part 6600 may contain polyurethane.

A light guide plate 7000 may be disposed in the rear of the optical layer 110. In this instance, the backlight unit may be not the direct type backlight unit but the edge type backlight unit. The backlight unit may include an edge type light source, the optical layer 110, the light guide plate 7000, and a frame. When the backlight unit includes the light guide plate 7000, the edge type light source may be disposed on the side of the light guide plate 7000.

A maximum height Z2 of the optical layer 110 may be less than a height Z3 of the bracket 140 as measured from the back surface of the back substrate 111, so as to prevent the movement of the optical layer 110.

When the light guide plate 7000 is disposed in the rear of the optical layer 110, a maximum height Z4 of the light guide plate 7000 may be less than the height Z3 of the bracket 140 as measured from the back surface of the back substrate 111, so as to prevent the movement of the light guide plate 7000.

The display device according to the embodiment of the invention may include an edge type light source module 7010 or a direct type light source module. In other words, when there are no comments, both the edge type light source module and the direct type light source module may be applied to the display device according to the embodiment of the invention.

As shown in FIG. 34, the back cover 130 may be disposed in the rear of the frame 1600.

Figure 39:
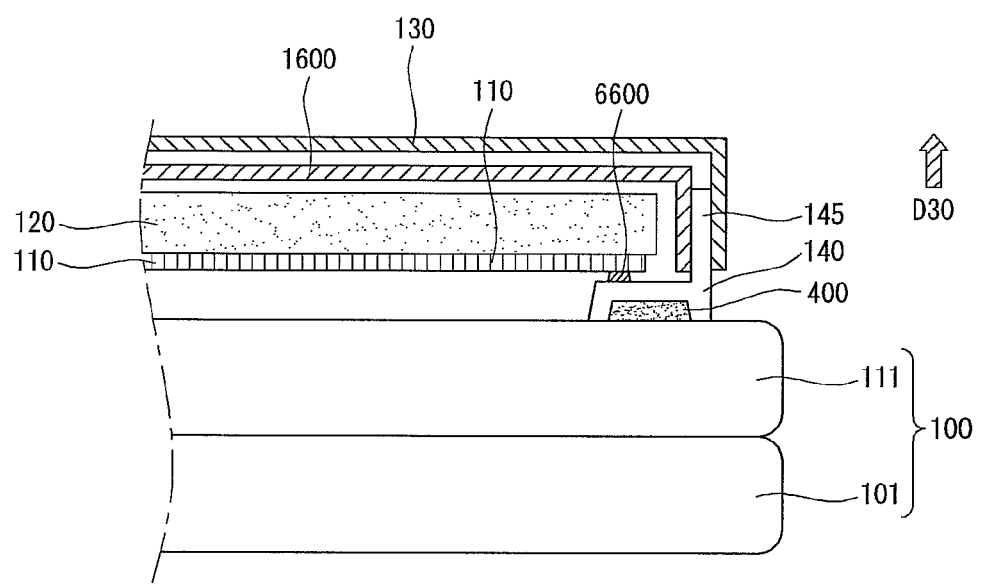

The back cover 130 may be fixed to the bracket 140. For example, as shown in FIG. 39, the back cover 130 may be fixed to the protrusion 145 of the bracket 140 using a predetermined fastening member (not shown). Preferably, the frame 1600 may be connected to one side of the protrusion 145 of the bracket 140, and the back cover 130 may be connected to the other side of the protrusion 145. In this instance, a portion of the frame 1600 and a portion of the back cover 130 may be positioned opposite each other with the bracket 140 interposed therebetween.

In other word, the bracket 140 has a recess (A groove) on a first surface where the adhesive for adhesive layer 400 is applied. And the bracket has a first protrusion 145 extending from a second surface. In this instance, the first and second surfaces being opposite surface.

And, the first protrusion 145 of the bracket 140 extending away from the rear panel 111 in a vertical direction (DRV) of the display panel.

Figure 40:
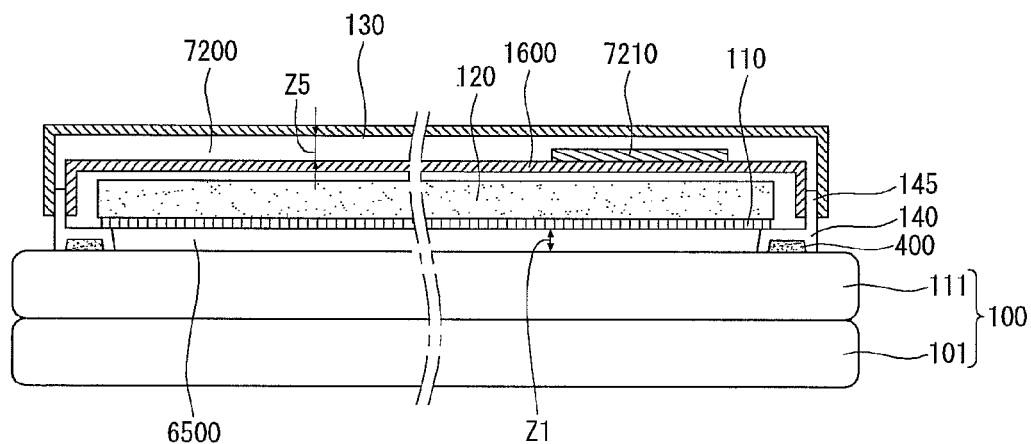

As shown in FIG. 40, a driving board 7210 for supplying a driving signal to the display panel 100 may be disposed between the frame 1600 and the back cover 130.

Further, an air gap 7200 may be formed between the frame 1600 and the back cover 130. The air gap 7200 may provide a space for disposing the driving board 7210 between the frame 1600 and the back cover 130.

In the embodiment disclosed herein, the air gap 6500 formed between the back substrate 111 and the optical layer 110 is referred to as a first air gap, and the air gap 7200 formed between the frame 1600 and the back cover 130 is referred to as a second air gap. A thickness Z5 of the second air gap 7200 may be greater than a thickness Z1 of the first air gap 6500.

Even in the case, the auxiliary bracket may be connected to the bracket 140. The back cover 130 may be fixed to the auxiliary bracket. Since the auxiliary bracket was described in detail above, a further description may be briefly made or may be entirely omitted.

Figure 41:
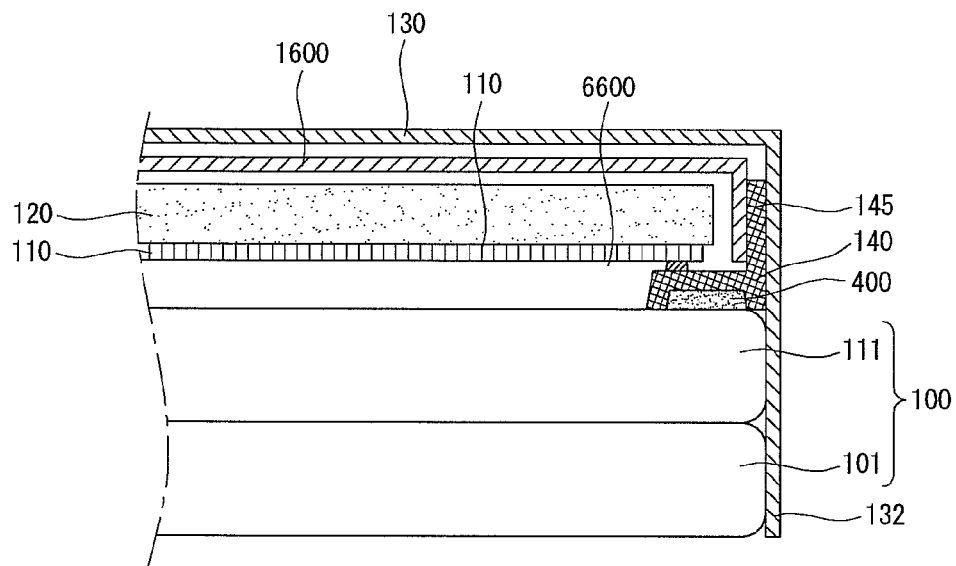

As shown in FIG. 41, the back cover 130 may extend to the side of the display panel 100. Namely, the back cover 130 may include a portion 132 positioned on the side of the display panel 110.

Figure 42:
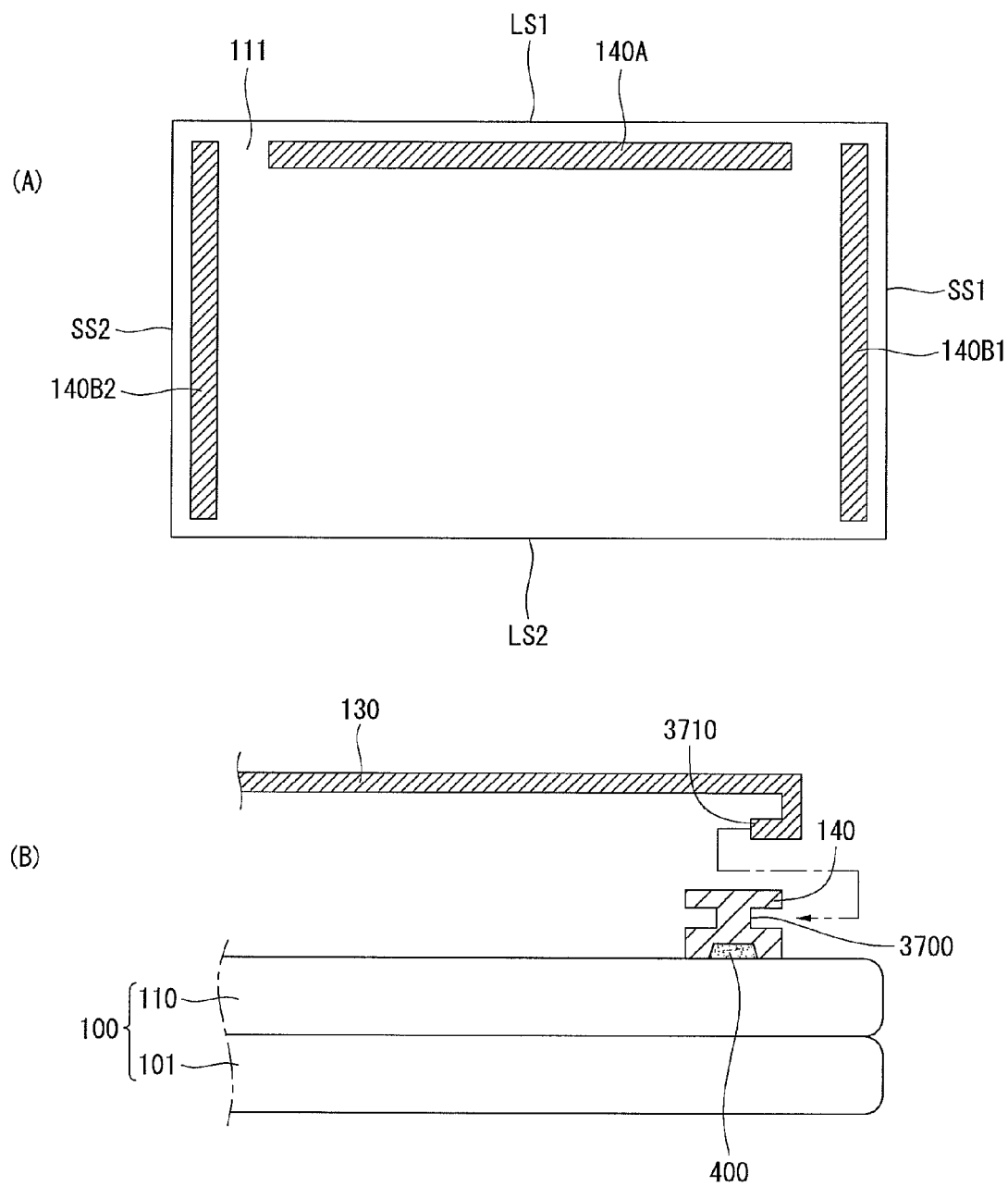

As shown in FIG. 42, a portion of the back cover 130 may be inserted into the bracket 140. For example, as shown in FIG. 42(B), the bracket 140 may include a groove 3700, and the back cover 130 may include a protrusion 3710 corresponding to the groove 3700. The groove 3700 of the bracket 140 may be referred to as a rail. In the following description, the groove 3700 of the bracket 140, which is depressed in the direction toward the middle of the display panel 100, may be referred to as an outer rail.

The protrusion 3710 of the back cover 130 may be inserted into the outer rail 3700 of the bracket 140. In this instance, the back cover 130 may include a portion contacting the bracket 140, but may not be fastened to the bracket 140. In other words, the back cover 130 may be connected to the bracket 140 but may not be fixed to the bracket 140.

For example, as shown in FIG. 42(A), the transverse bracket 140A may be disposed on the first long side LS1 of the back substrate 111, and the longitudinal brackets 140B1 and 140B2 may be respectively disposed on the first and second short sides SS1 and SS2 of the back substrate 111. In the embodiment disclosed herein, the first long side LS1 of the back substrate 111 may be referred to as a first area, the second long side LS2 of the back substrate 111 may be referred to as a second area, the first short side SS1 of the back substrate 111 may be referred to as a third area, and the second short side SS2 of the back substrate 111 may be referred to as a fourth area.

A portion of the back cover 130 may be inserted into the transverse bracket 140A, and a portion of the back cover 130 may be inserted into the longitudinal brackets 140B1 and 140B2. Namely, the back cover 130 may be connected to the bracket 140 in the first area of the display panel 100, and the back cover 130 may not be connected to the bracket 140 in the second area opposite the first area of the display panel 100. Further, the back cover 130 may be connected to the bracket 140 in the third area adjacent to the first and second areas of the display panel 100, and the back cover 130 may be connected to the bracket 140 in the fourth area opposite the third area. In this instance, an edge of the front surface of the front substrate 101 may be exposed in the first, third, and fourth areas of the display panel 100.

As above, when the back cover 130 and the bracket 140 are connected to each other by inserting the protrusion 3710 of the back cover 130 into the outer rail 3700 of the bracket 140, the back cover 130 may be connected to the bracket 140 in a sliding manner.

Figure 43:
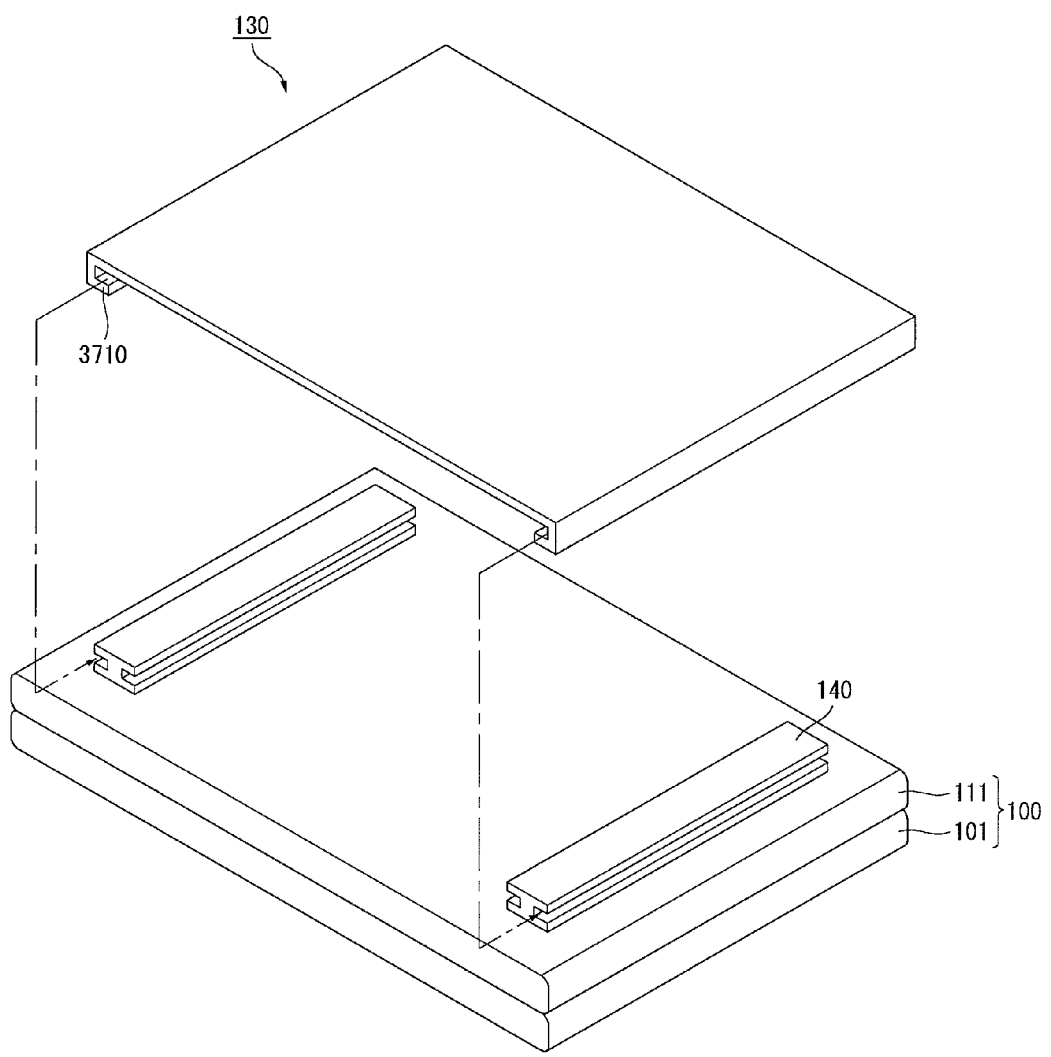

For example, as shown in FIG. 43, the back cover 130 may be connected to the bracket 140 by inserting the protrusion 3710 of the back cover 130 into the outer rail 3700 of the bracket 140 in the sliding manner.

Figure 44:
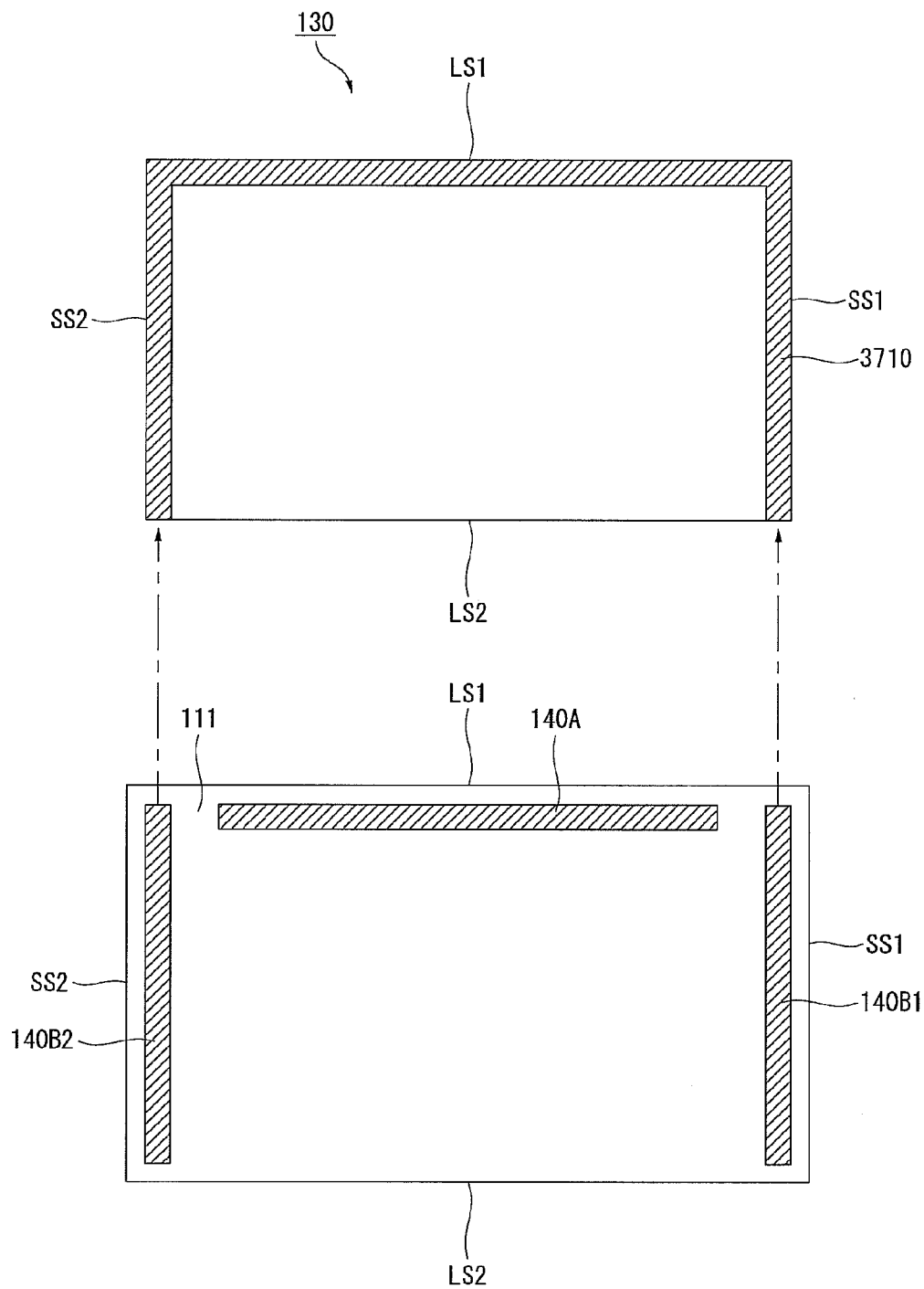

Alternatively, as shown in FIG. 44, the transverse bracket 140A may be disposed on the first long side LS1 of the back substrate 111, and the longitudinal brackets 140B1 and 140B2 may be respectively disposed on the first and second short sides SS1 and SS2 of the back substrate 111. Each of a first long side LS1, a first short side SS1, and a second short side SS2 of the back cover 130 may have a protrusion 3710.

The longitudinal brackets 140B1 and 140B2 may be connected to the protrusions 3710 of the first and second short sides SS1 and SS2 of the back cover 130 in the sliding manner, respectively. Further, the transverse bracket 140A may contact the protrusion 3710 of the first long side LS1 of the back cover 130.

In the structure illustrated in FIG. 44, the connection process of the back cover 130 may be further simplified. Further, because the back substrate 111 is connected to the bracket 140 without coupling the back cover 130 with the bracket 140 using a fastening member, time and the cost required to manufacture the display device may be reduced.

Further, because the back cover 130 is connected to the bracket 140 through the simple manner for inserting a portion of the back cover 130 into the bracket 140, the display panel 100 fixed to the bracket 140 may be prevented from being deformed even if the back cover 130 is deformed by a temperature, etc.

For example, because the back cover 130 is connected to the bracket 140 through the simple manner for inserting a portion of the back cover 130 into the bracket 140, the force generated by the deformation of the back cover 130 may not be transferred to the bracket 140. Thus, the molecular arrangement of the liquid crystal layer of the display panel 100 may be prevented from being deformed by an external force. Hence, a light leakage phenomenon may be prevented, and a reduction in the image quality of the display device may be prevented.

Although the case where a portion of the back cover 130 is connected to the bracket 140 in the sliding manner was described above, the back cover 130 may be connected to the bracket 140 using a predetermined structure positioned on the back cover 130.

Figure 45:
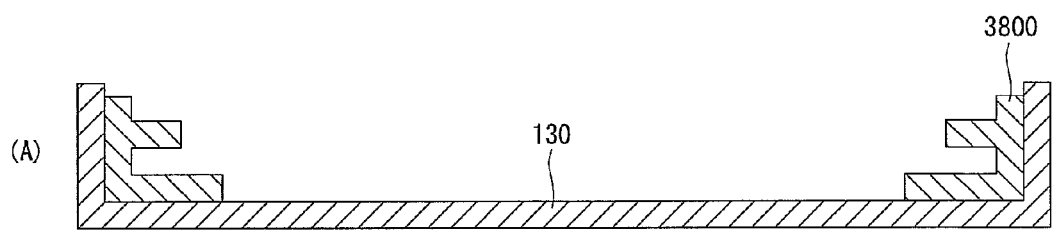
Figure 45:
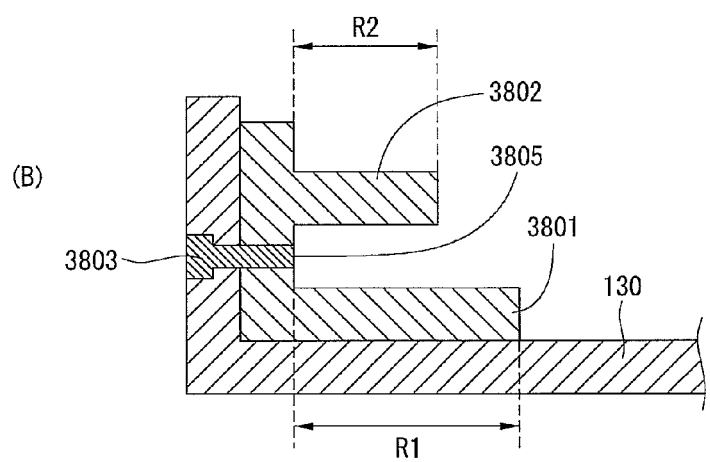

For example, as shown in FIG. 45, a fixing bracket 3800 corresponding to the bracket 140 may be disposed on the back cover 130.

As shown in FIG. 45(B), the fixing bracket 3800 may be fixed to the back cover 130 by a predetermined fastening member 3803.

The fixing bracket 3800 may include at least one protrusion. More specifically, the fixing bracket 3800 may include a first protrusion 3801 and a second protrusion 3802. A length R1 of the first protrusion 3801 contacting the back cover 130 may be longer than a length R2 of the second protrusion 3802 not contacting the back cover 130. Further, the fixing bracket 3800 may include a groove 3805. In the embodiment of the invention, the groove 3805 of the fixing bracket 3800 may be referred to as a fixing rail.

Figure 46:
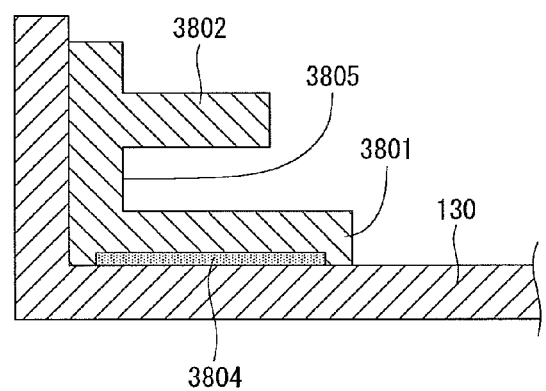

Alternatively, as shown in FIG. 46, an adhesive layer 3804 may be disposed between the fixing bracket 3800 and the back cover 130. In this instance, the fixing bracket 3800 may be attached to the back cover 130 by the adhesive layer 3804. For example, the adhesive layer 3804 may be disposed between the first protrusion 3801 having the relatively long length and the back cover 130.

Figure 47:
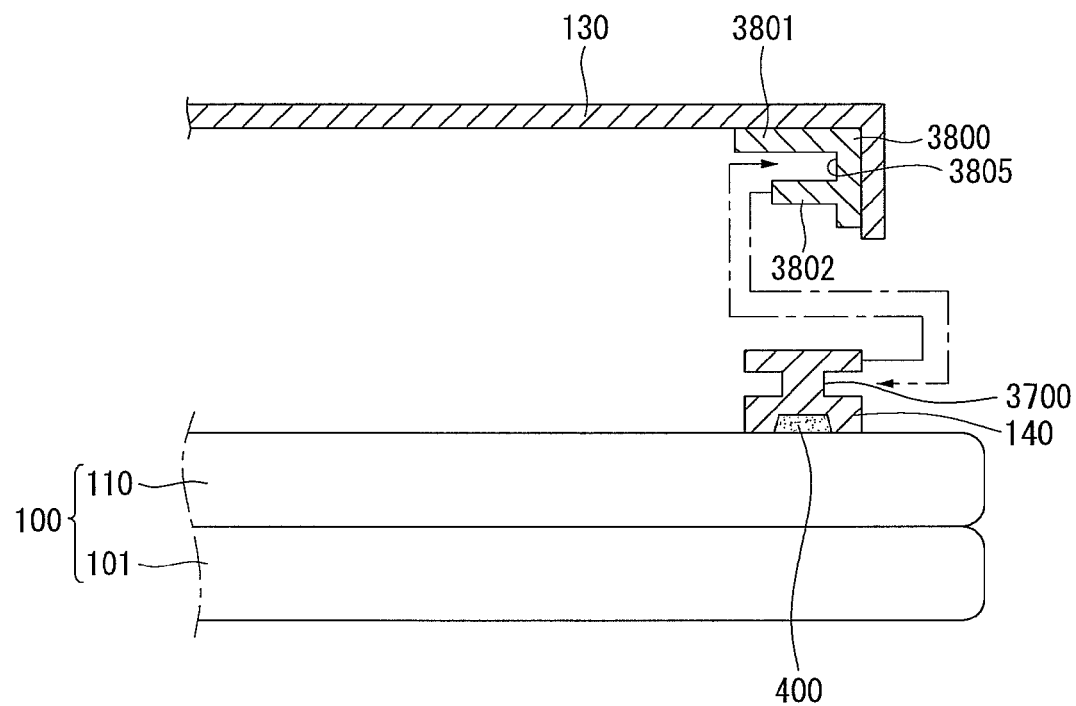
Figure 48:
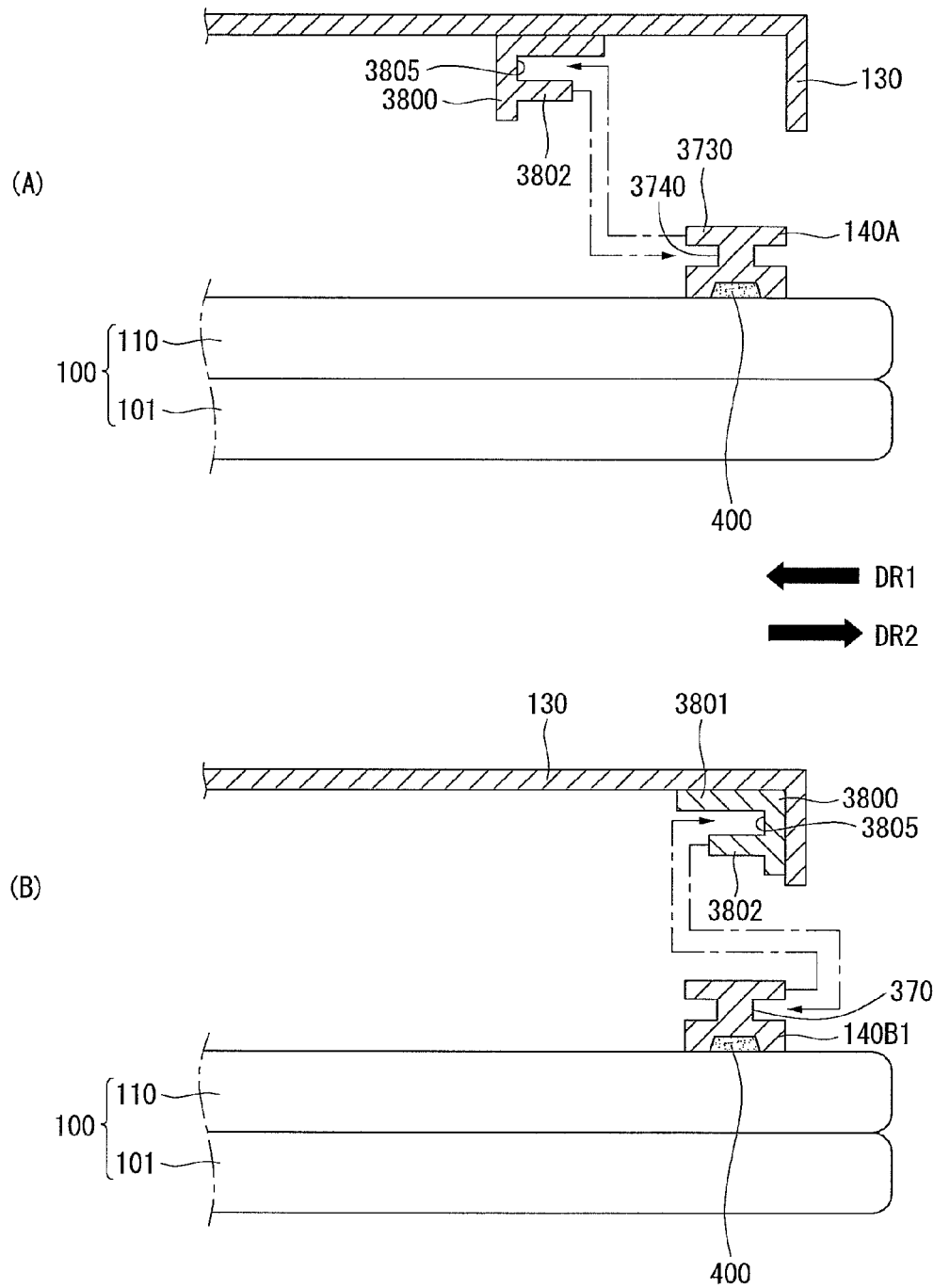
Figure 49:
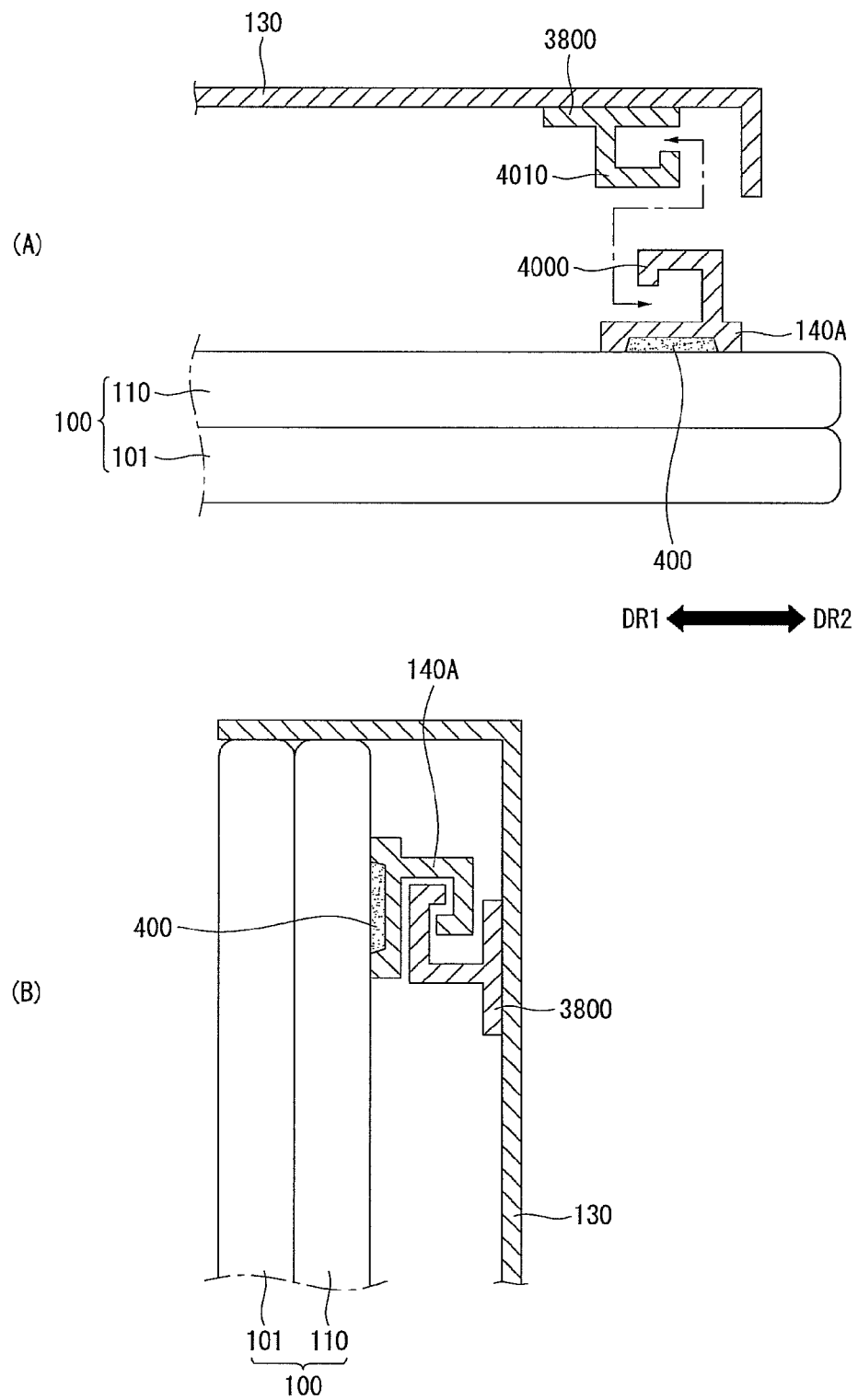

In the structure illustrated in FIG. 46, as shown in FIG. 47, the back cover 130 may be connected to the bracket 140 by inserting the second protrusion 3802 of the fixing bracket 3800 into the outer rail 3700 of the bracket 140 in the sliding manner. The outer rail 3700 may be depressed in the direction toward the middle of the display panel 100.

As above, the fixing bracket 3800 may include a portion contacting the bracket 140, but may not be fastened to the bracket 140.

Alternatively, the back cover 130 may be connected to the bracket 140 by inserting a protrusion 3720 of the bracket 140 into the fixing rail 3805 of the fixing bracket 3800.

The direction for connecting the fixing bracket 3800 to the bracket 140 may vary depending on their position.

For example, as shown in FIG. 48(A), the transverse bracket 140A disposed on the first long side LS1 of the back substrate 111 may include a groove 3740 depressed in the direction away from the middle of the display panel 100, i.e., a second direction DR2. The groove 3740 of the transverse bracket 140A may be referred to as an inner rail. Each of the longitudinal brackets 140B1 and 140B2 may include an inner rail 3740.

The fixing bracket 3800 disposed on the back cover 130 may be disposed so that the second protrusion 3802 protrudes in the direction away from the middle of the back cover 130, i.e., the second direction DR2.

The second protrusion 3802 of the fixing bracket 3800 may be inserted into the inner rail 3740. Alternatively, the back cover 130 may be connected to the transverse bracket 140A by inserting a protrusion 3730 of the bracket 140 into the fixing rail 3805 of the fixing bracket 3800.

In the structure illustrated in FIG. 48(A), the fixing bracket 3800 may support the bracket 140, so that the display panel 100 does not run down the first long side LS1 of the display panel 100, i.e., the display panel 100. Hence, the strong support force may be provided.

Alternatively, as shown in FIG. 48(B), each of the longitudinal brackets 140B1 and 140B2 disposed on the first and second short sides SS1 and SS2 of the back substrate 111 may include an outer rail 3700 depressed in the direction toward the middle of the display panel 100, i.e., a first direction DR1.

The fixing bracket 3800 disposed on the back cover 130 may be disposed so that the second protrusion 3802 protrudes in the direction toward the middle of the back cover 130, i.e., the first direction DR1.

The second protrusion 3802 of the fixing bracket 3800 may be inserted into the outer rail 3700.

The shape of the bracket 140 disposed on the first long side LS1 of the display panel 100 and the shape of the fixing bracket 3800 corresponding to the bracket 140 may be different from the shape of the bracket 140 disposed in other areas and the shape of the fixing bracket 3800 corresponding to the bracket 140, respectively.

For example, as shown in FIG. 49(A), the fixing bracket 3800 may include a protrusion 4010 protruding toward the second direction DR2, and the transverse bracket 140A may include a protrusion 4000 protruding toward the first direction DR1 opposite the second direction DR2.

In this instance, as shown in FIG. 49(B), the protrusion 4010 of the fixing bracket 3800 may be interlocked with the protrusion 4000 of the transverse bracket 140A, and thus the fixing bracket 3800 may be connected to the transverse bracket 140A.

As above, the shapes of the bracket 140 and the fixing bracket 3800 may be variously changed.

The display device according to the embodiment of the invention may further include a bottom bar for supporting the display panel 100 under the display panel 100.

Figure 50:
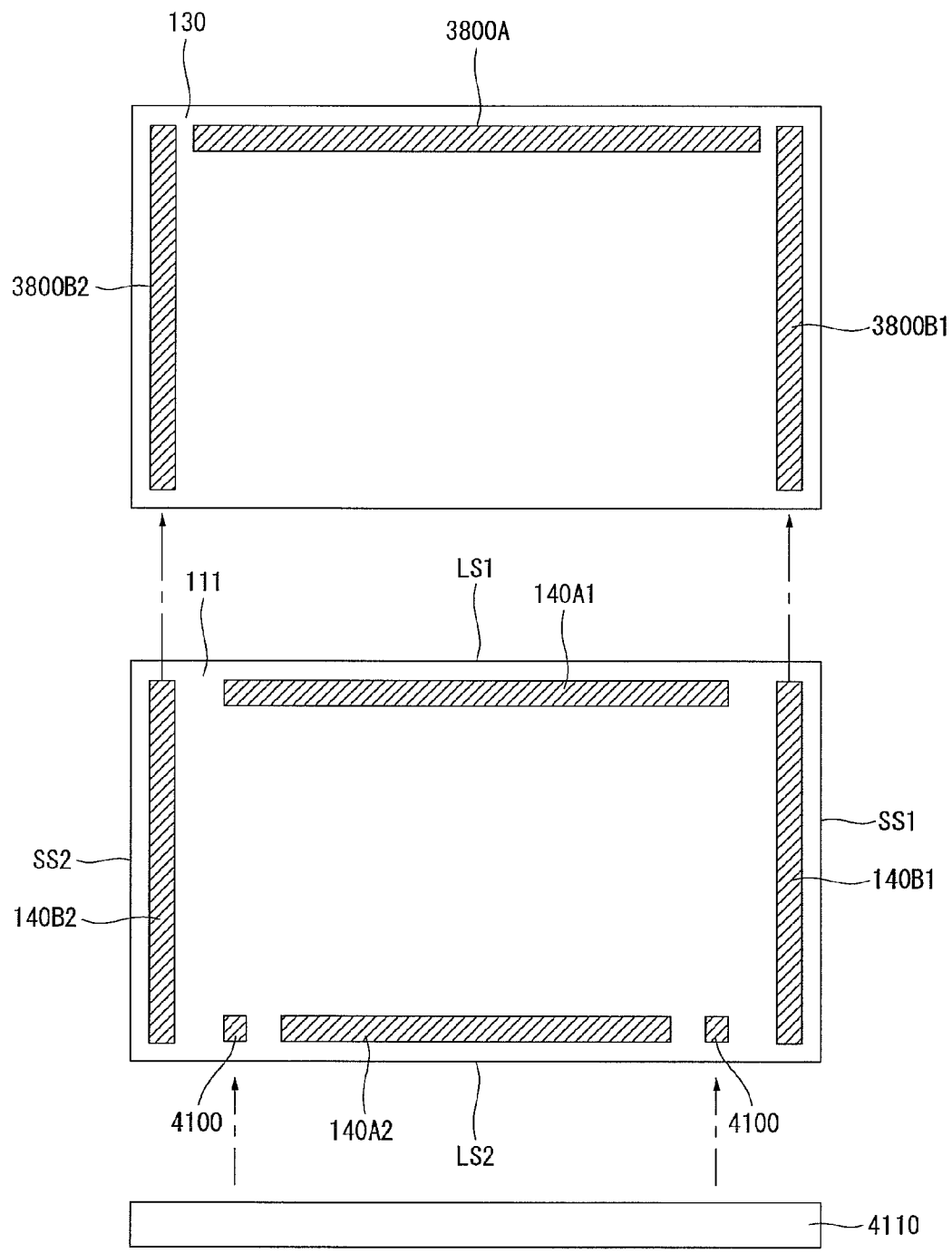

For example, as shown in FIG. 50, the bracket 140 and the fixing bracket 3800 may be connected to each other in the first area LS1 of the display panel 100 and may not be connected to each other in the second area LS2 opposite the first area LS1 of the display panel 100. Further, the bracket 140 and the fixing bracket 3800 may be connected to each other in the third area SS1 adjacent to the first and second areas LS1 and LS2 of the display panel 100 and may be connected to each other in the fourth area SS2 opposite the third area SS1 of the display panel 100.

A bottom bar 4110 for supporting the display panel 100 may be disposed under the second area LS2 of the display panel 100.

In the embodiment disclosed herein, the bracket 140 disposed in the first area LS1 of the display panel 100 is referred to as a first transverse bracket 140A1; the bracket 140 disposed in the second area LS2 of the display panel 100 is referred to as a second transverse bracket 140A2; the bracket 140 disposed in the third area SS1 of the display panel 100 is referred to as a first longitudinal bracket 140B1; and the bracket 140 disposed in the fourth area SS2 of the display panel 100 is referred to as a second longitudinal bracket 140B2.

Further, the fixing bracket 3800 disposed in a first area LS1 of the back cover 130 is referred to as a first fixing bracket 3800A1; the fixing bracket 3800 disposed in a third area SS1 of the back cover 130 is referred to as a third fixing bracket 3800B1; and the fixing bracket 3800 disposed in a fourth area SS2 of the back cover 130 is referred to as a fourth fixing bracket 3800B2.

The fixing bracket 3800 may not be disposed in a second area LS2 opposite the first area LS1 of the back cover 130. This is to secure an entrance for connecting the fixing bracket 3800 disposed on the back cover 130 in the sliding manner to the bracket 140 disposed on the back substrate 111.

Figure 51:
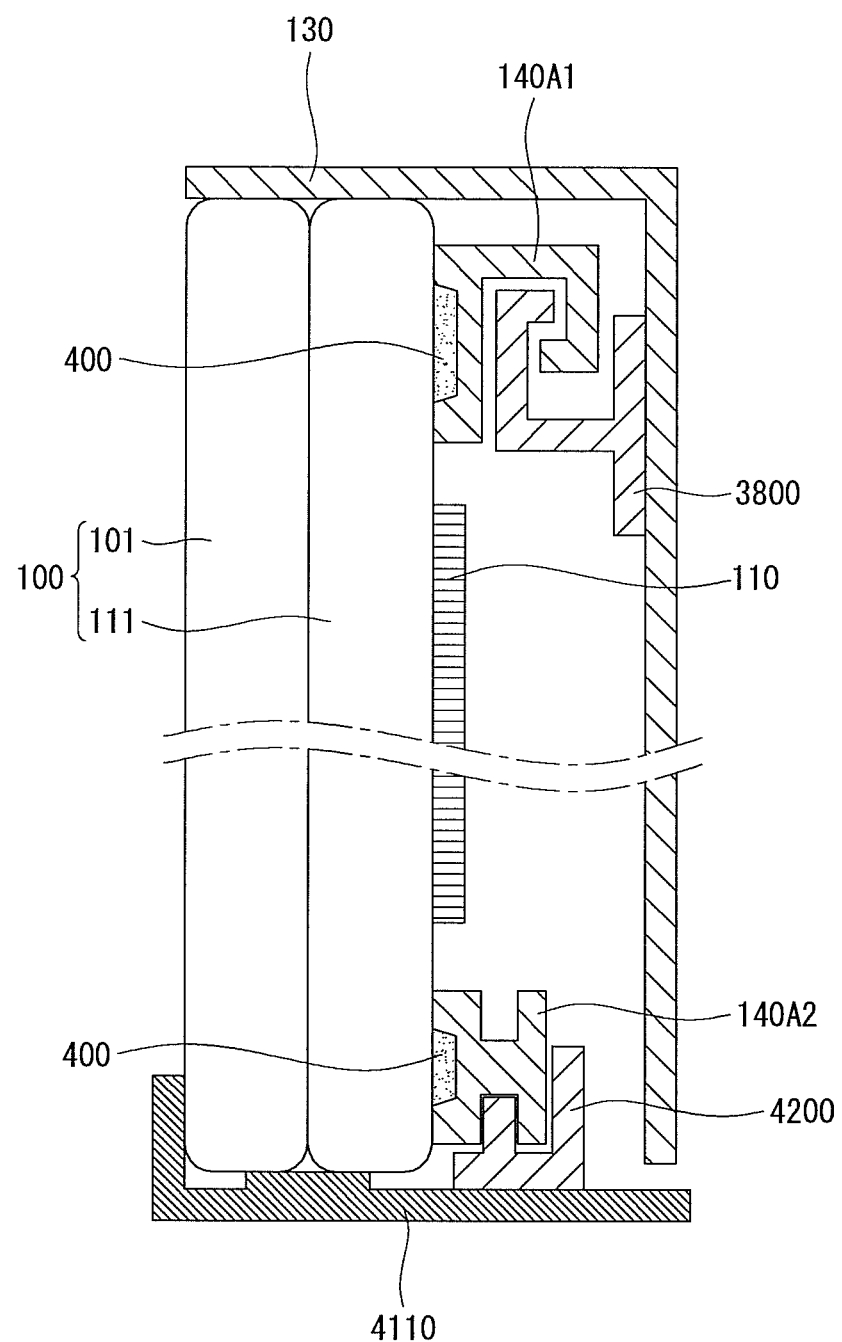

As above, as shown in FIG. 51, after the fixing bracket 3800 disposed on the back cover 130 in the sliding manner is connected to the bracket 140 disposed on the back substrate 111, the bottom bar 4110 may be disposed in the second area LS2 of the back cover 130. Hence, the bottom bar 4110 may support the display panel 100.

As shown in FIG. 51, a bottom bracket 4200 for supporting the second transverse bracket 140A2 disposed in the second area LS2 of the back substrate 111 may be disposed on the bottom bar 4110 for supporting the display panel 100. Namely, the bottom bracket 4200 corresponding to the second transverse bracket 140A2 may be disposed on the bottom bar 4110.

The bottom bracket 4200 may be fixed to the bottom bar 4110 using a predetermined fastening member or an adhesive layer. The bottom bracket 4200 may not be fastened to the back cover 130.

Further, as shown in FIG. 50, a fastening bracket 4100 different from the bracket 140 may be attached to the second area LS2 of the back substrate 111.

Figure 52:
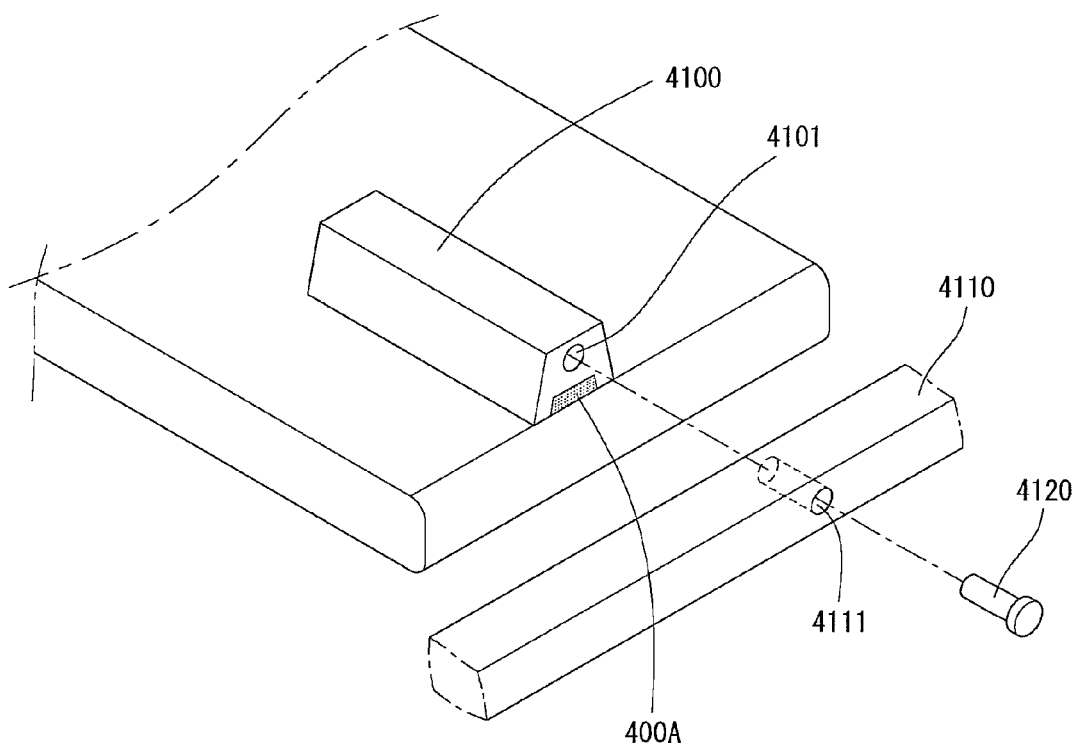

As shown in FIG. 52, the fastening bracket 4100 may be connected to the bottom bar 4110. For example, the fastening bracket 4100 may be fastened to the bottom bar 4110 using a predetermined fastening member 4120. For this, the fastening bracket 4100 may include a groove 4101, and the bottom bar 4100 may include a hole 4111. Hence, the fastening member 4120 may pass through the hole 4111 of the bottom bar 4100 and then may be fixed to the groove 4101 of the fastening bracket 4100. Further, an adhesive layer 400A may be disposed between the fastening bracket 4100 and the back substrate 111.

Figure 53:
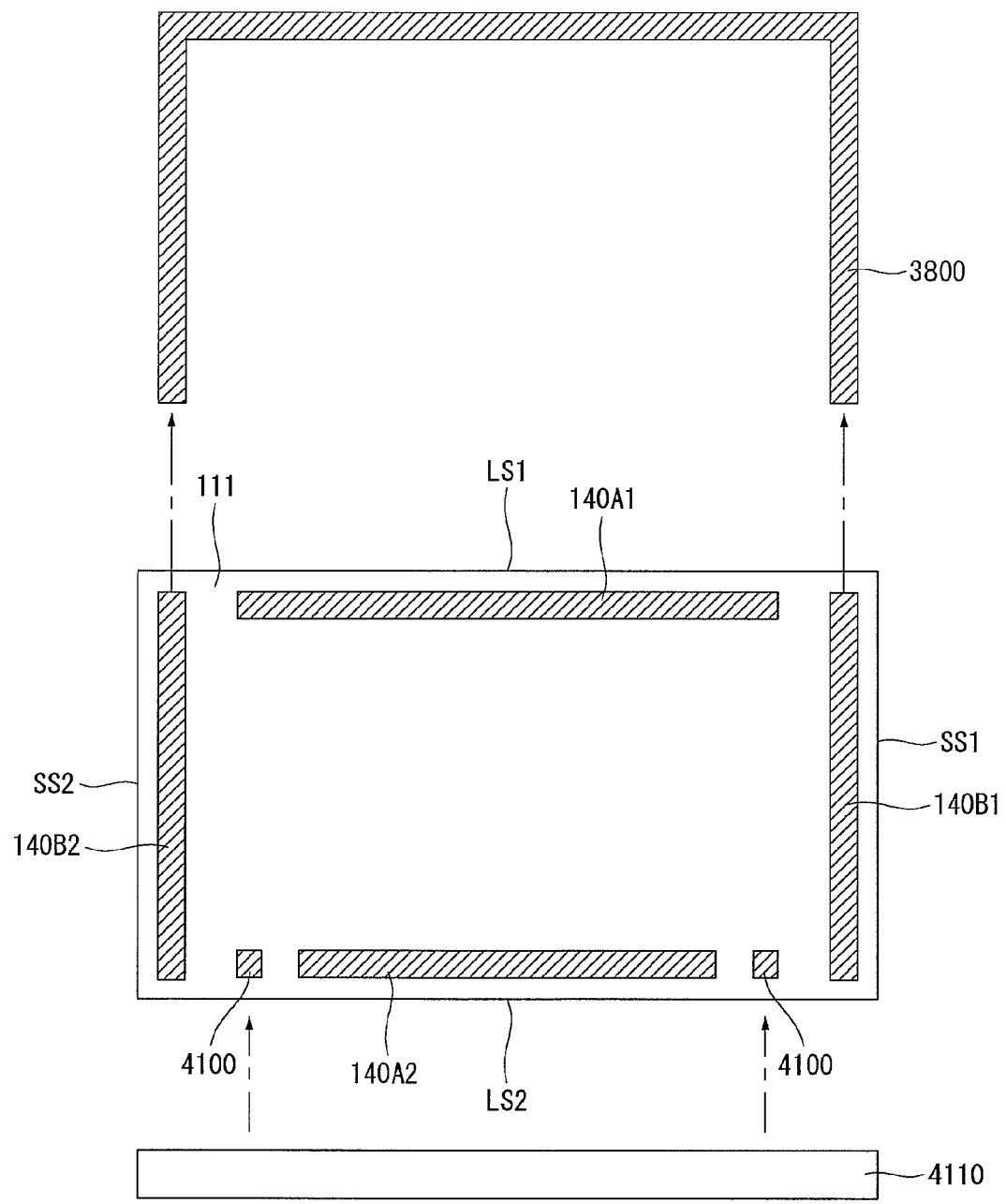

As shown in FIG. 53, the fixing bracket 3800 corresponding to the first transverse bracket 140A1, the first longitudinal bracket 140B1, and the second longitudinal bracket 140B2, which are attached to the back substrate 111, may be integrally formed. Hence, the fixing bracket 3800 may have ⊏-shape.

In the embodiment disclosed herein, the adhesive layer 400 may be used to attach the bracket 140 to the back surface of the back substrate 111. Alternatively, a Velcro fastener may be used to attach the bracket 140 to the back surface of the back substrate 111.

Figure 54:
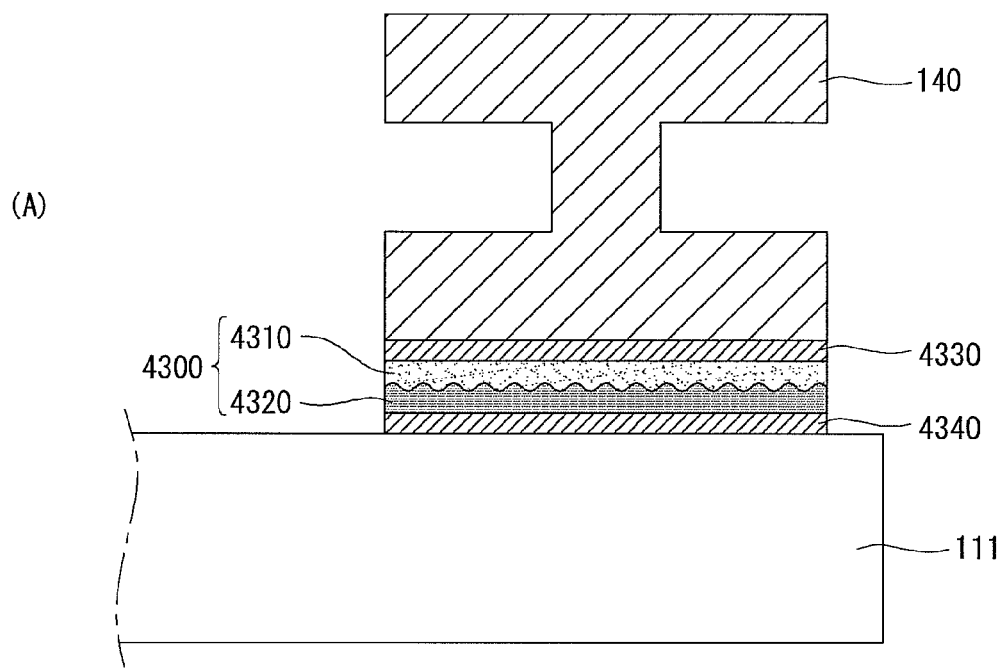
Figure 54:
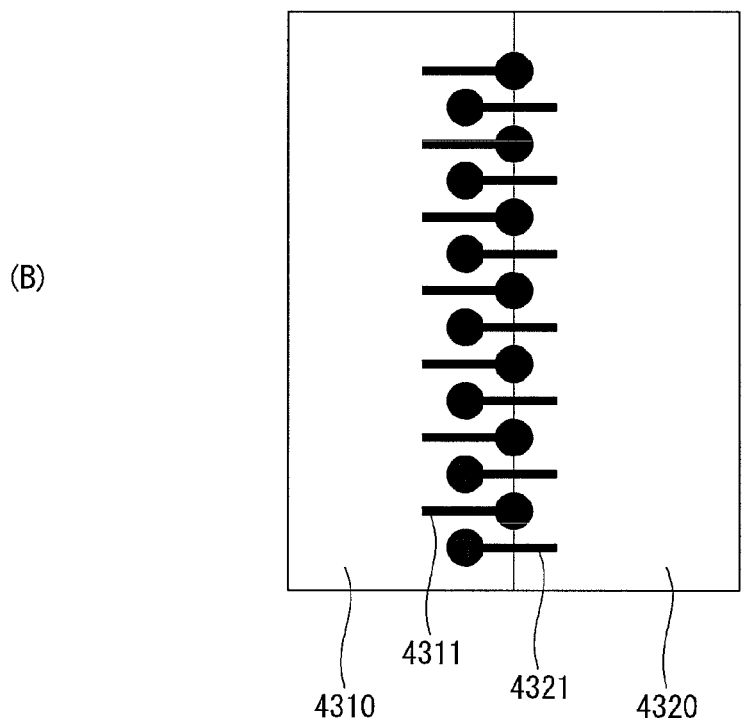

For example, as shown in FIG. 54, a Velcro fastener 4300 may be positioned between the bracket 140 and the back surface of the back substrate 111.

More specifically, the Velcro fastener 4300 may include a first Velcro part 4310 including a plurality of projections and a second Velcro part 4320. A first adhesive layer 4330 may be disposed between the first Velcro part 4310 and the bracket 140 to attach the first Velcro part 4310 to the bracket 140. A second adhesive layer 4340 may be disposed between the second Velcro part 4320 and the bracket 140 to attach the second Velcro part 4320 to the bracket 140.

Figure 55:
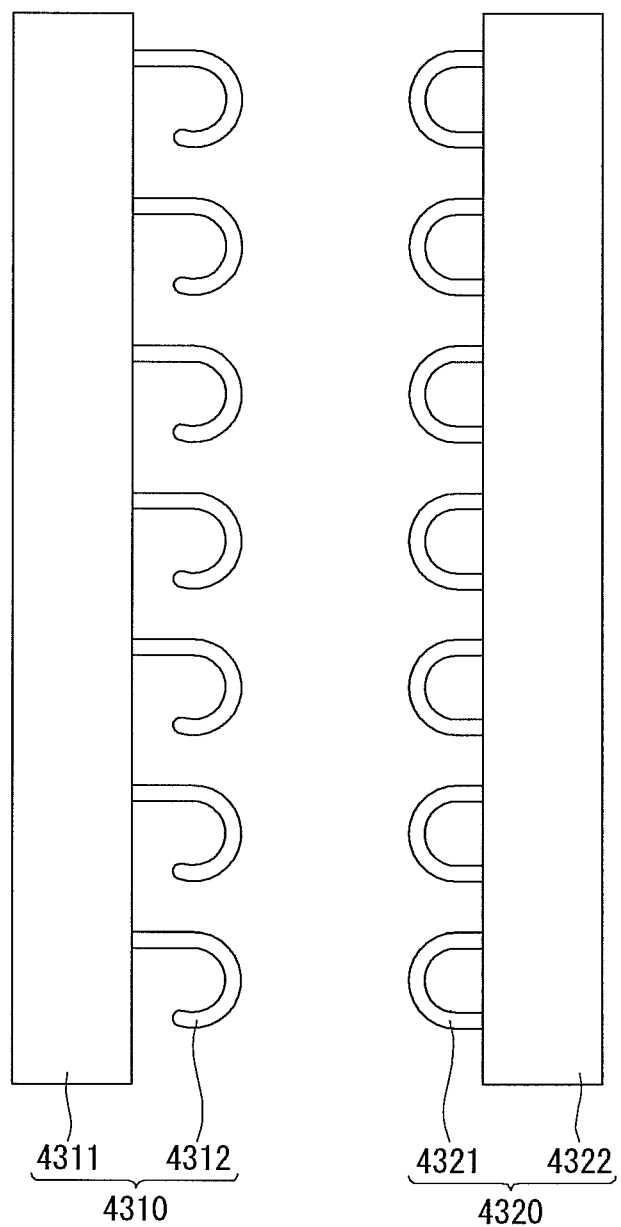

As shown in FIG. 55, the first Velcro part 4310 may include a plurality of first layers 4311 and a plurality of first projections 4312 respectively formed on the first layers 4311. The second Velcro part 4320 may include a second layer 4321 and a plurality of second projections 4322 formed on the second layer 4321. The plurality of first projections 4312 and the plurality of second projections 4322 may be interlocked and connected with each other. For example, each of the first projections 4312 may have a hook shape, and each of the second projections 4322 may have a ring shape.

In this instance, even if the external force generated by the deformation of the back cover 130 is applied to the bracket 140, the external force may be cancelled in the Velcro fastener 4300. Hence, the external force may be not transferred to the display panel 100. Hence, the leakage phenomenon may be prevented.

The shapes of the fixing brackets 3800 may be variously changed.

Both the edge type backlight unit and the direct type backlight unit may be applied to the display device according to the embodiment of the invention.

In the embodiment of the invention, the edge type backlight unit may be classified into a bottom edge type backlight unit including a bottom edge type emitting package and a side edge type backlight unit including a side edge type emitting package.

Figure 56:
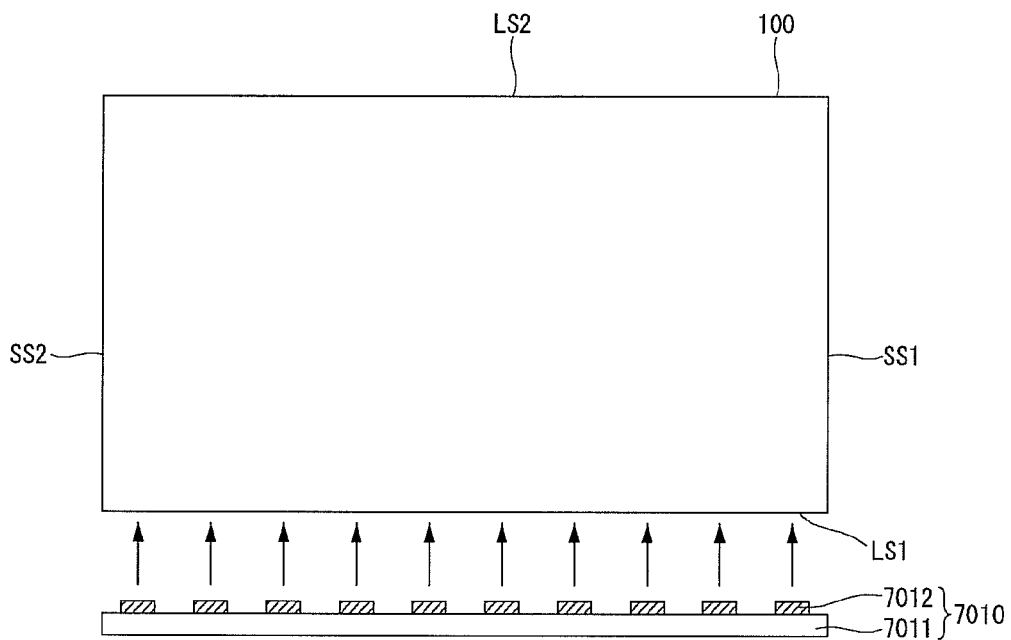

As shown in FIG. 56, a bottom edge type emitting package 7010 may emit light to a light guide plate (not shown) positioned on the long side LS of the display panel 100. For example, the bottom edge type emitting package 7010 may be positioned on the second long side LS2 corresponding to the lower side among the first and second long sides LS1 and LS2 of the display panel 100.

Figure 57:
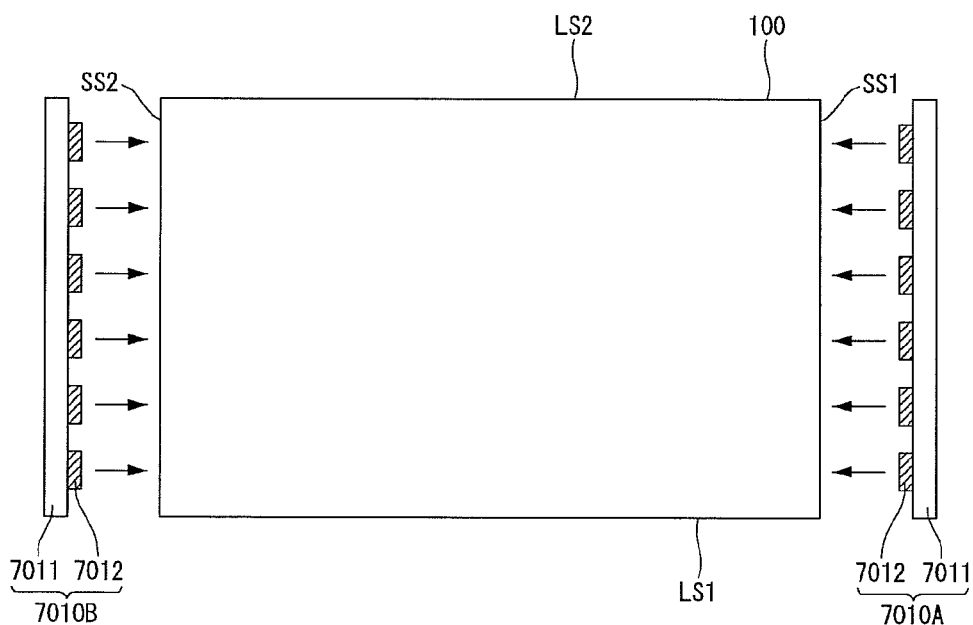

As shown in FIG. 57, a side edge type emitting package 7010 may emit light to a light guide plate (not shown) positioned on the short side SS of the display panel 100. For example, a first side edge type emitting package 7010A may be positioned on the first short side SS1 of the display panel 100, and a second side edge type emitting package 7010B may be positioned on the second short side SS2 of the display panel 100.

The edge type backlight unit, which will be described below, may correspond to both the bottom edge type backlight unit and the side edge type backlight unit.

Figure 58:
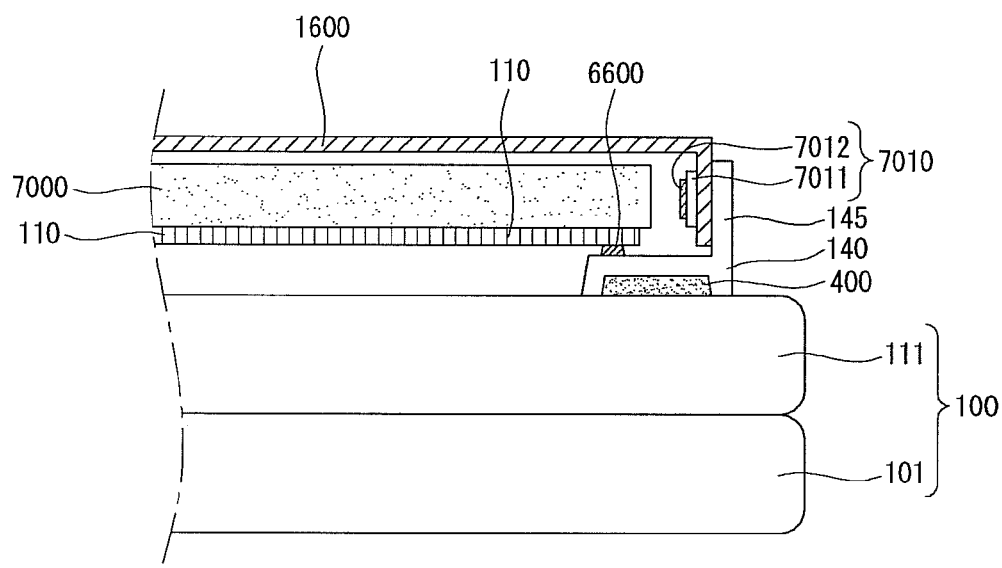

For example, as shown in FIG. 58, the bracket 140 may include a protrusion 145 protruding in a direction D30 away from the display panel 100, and the frame 1600 may be connected to the protrusion 145. A light guide plate 7000 may be disposed between the frame 1600 and the optical layer 110, and the edge type emitting package 7010 may be disposed on the side of the light guide plate 7000. The edge type emitting package 7010 may include a substrate 7011 and a light source 7012, for example, LEDs positioned on the substrate 7011.

Figure 59:
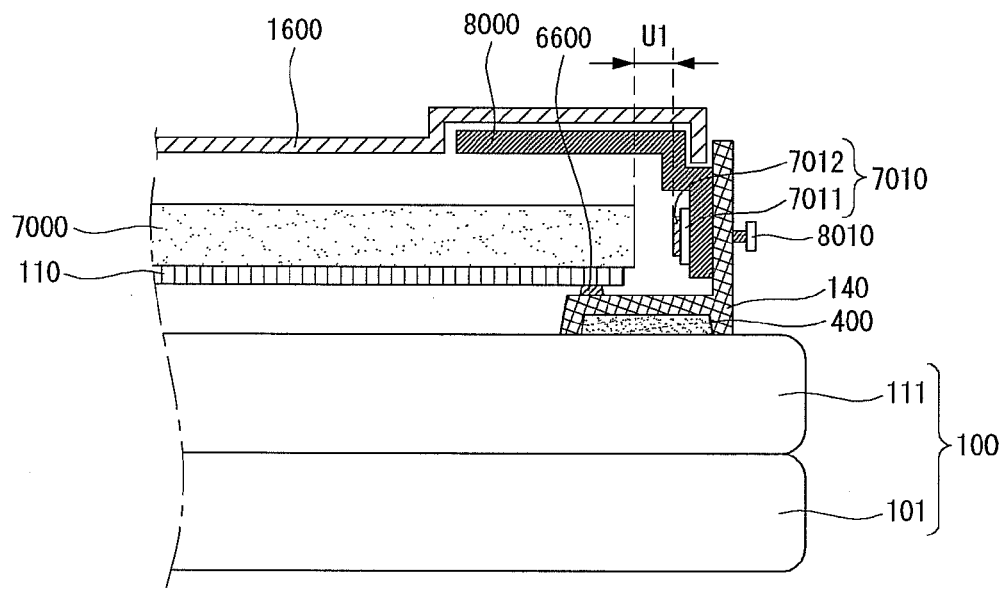

Alternatively, as shown in FIG. 59, the light guide plate 7000 may be separated from the edge type emitting package 7010 by a predetermined distance U1. More specifically, the light guide plate 7000 may be separated from the light source 7012 of the edge type emitting package 7010 by the predetermined distance U1.

In this instance, the edge type emitting package 7010 may be prevented from being damaged by the light guide plate 7000. Further, when the air gap moves before light provided by the edge type emitting package 7010 is emitted to the light guide plate 7000, the light may be dispersed more widely. Hence, light characteristic of the display device may be improved.

Further, an auxiliary frame 8000 may be disposed between the frame 1600 and the bracket 140. For example, the auxiliary frame 8000 may be connected to the bracket 140 using a predetermined fastening member 8010, and the frame 1600 may be disposed on the auxiliary frame 8000.

In the structure illustrated in FIG. 59, the edge type emitting package 7010 including the substrate 7011 and the light source 7012 disposed on the substrate 7011 may be disposed on the auxiliary frame 8000. In this instance, heat generated in the edge type emitting package 7010 may be efficiently emitted through the auxiliary frame 8000. Hence, the stability of the edge type emitting package 7010 may be improved.

Although not shown, a heat transfer layer may be formed between the auxiliary frame 8000 and the frame 1600. The heat transfer layer may be an adhesive layer including metal particles.

Figure 60:
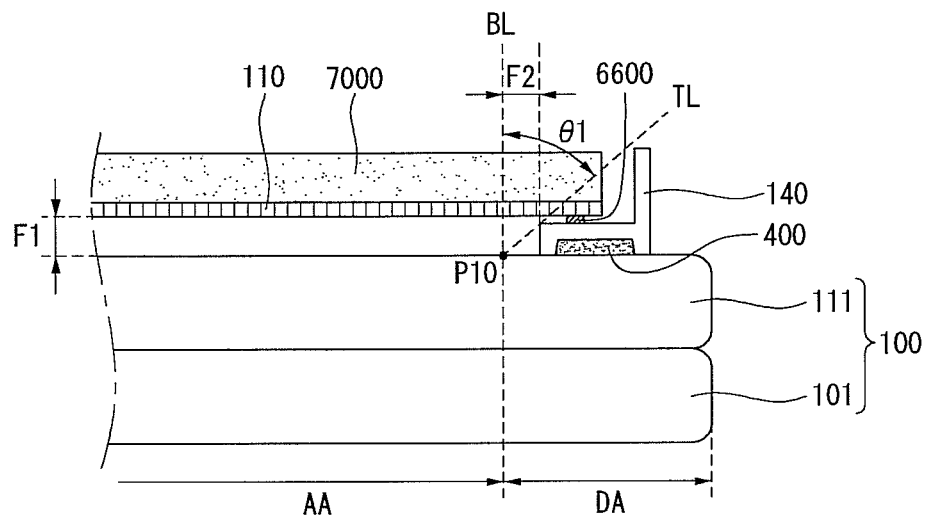

As shown in FIG. 60, the bracket 140 may be positioned in a dummy area DA outside an active area AA of the display panel 100. Hence, the bracket 140 may not overlap the display panel 100 in the width direction of the display panel 100. Namely, the bracket 140 is separated from an end P10 of the active area AA of the display panel 100 by a predetermined distance F2. As above, the screen distortion may be prevented by disposing the bracket 140 at a position separated from the active area AA of the display panel 100 by the predetermined distance F2.

If the user views the image displayed on the display panel in the direction oblique to the screen of the display panel, the image in a boundary between the active area AA and the dummy area DA may be distorted. However, when the bracket 140 is disposed at a position separated from the active area AA of the display panel 100 by the predetermined distance F2 as in the embodiment of the invention, the screen distortion may be prevented.

A distance F1 between the back substrate 111 and the optical layer 110 may vary depending on the distance F2 between the end P10 of the active area AA of the display panel 100 and the bracket 140.

As shown in FIG. 60, the distance F2 between a position P10 where a boundary line BL between the active area AA and the dummy area DA meets the back substrate 111 of the display panel 100 (i.e., the end P10 of the active area AA of the display panel 100) and the bracket 140 may be equal to or less than the distance F1 between the back substrate 111 and the optical layer 110. In this instance, the size of the dummy area DA, on which the image is not displayed, may be prevented from excessively increasing.

Further, when a normal line TL, which starts at the end P10 of the active area AA of the display panel 100 and meets the bracket 140, is drawn in FIG. 60, an angle θ1 between the normal line TL and the boundary line BL may be set to about 15° to 30°, so as to more efficiently prevent the screen distortion in the boundary between the active area AA and the dummy area DA and to prevent an excessive increase in the size of the dummy area DA The display panel 100 may be divided into the active area AA and the dummy area DA by the seal part (not shown) between the front substrate 101 and the back substrate 111. For example, the area outside the seal part may be assigned as the dummy area DA, and the area inside the seal part may be assigned as the active area AA. More specifically, the display panel 100 may be divided into the active area AA and the dummy area DA based on the inner surface of the cross section of the seal part, i.e., the surface contacting the liquid crystal layer. Other methods may be used to divide the display panel 100 into the active area AA and the dummy area DA.

Figure 61:
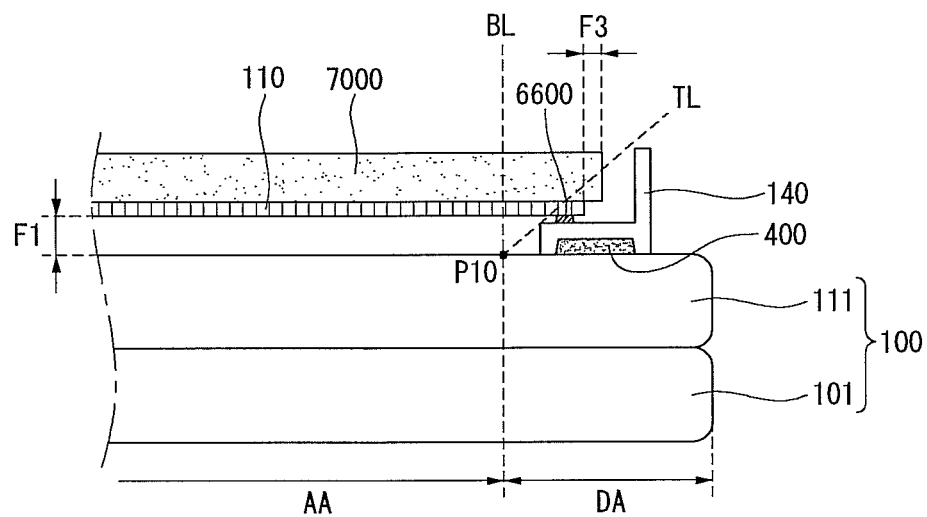

As shown in FIG. 61, in the case of the edge type backlight unit, the light guide plate 7000 on the optical layer 110 may protrude further than the optical layer 110 by a predetermined distance F3 in the outer direction of the display panel 100.

Figure 62:
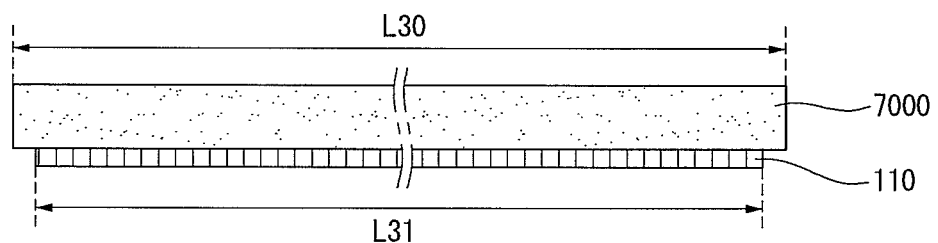

In this instance, as shown in FIG. 62, a total length L30 of the light guide plate 7000 may be longer than a total length L31 of the optical layer 110.

As above, when the total length L30 of the light guide plate 7000 is longer than the total length L31 of the optical layer 110, the length of the optical layer 110 may be reduced while preventing the screen distortion in the boundary between the active area AA and the dummy area DA. Hence, the manufacturing cost may be reduced.

As shown in FIG. 61, because the optical layer 110 is disposed under the light guide plate 7000, the normal line TL, which passes through the end P10 of the active area AA of the display panel 100 and meets the bracket 140, may pass through both the optical layer 110 and the light guide plate 7000 even if the length of the optical layer 110 is short.

Figure 63:
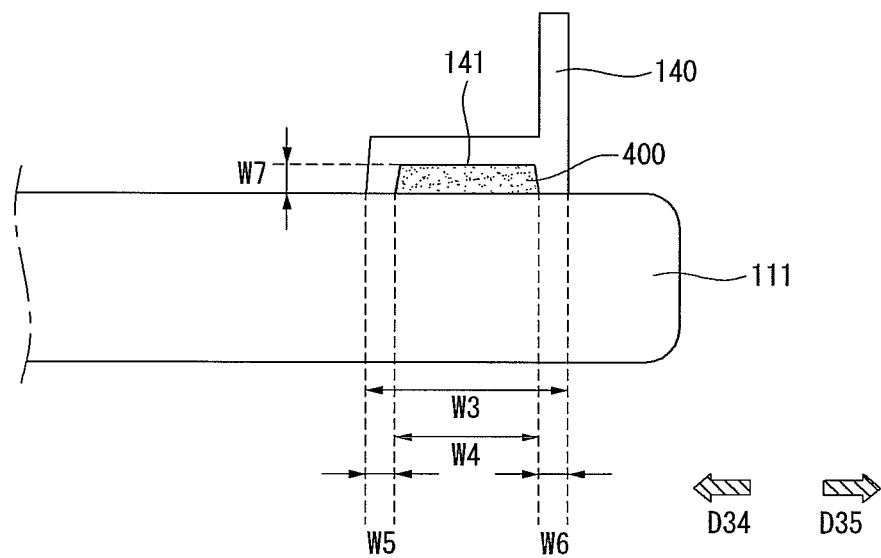

As shown in FIG. 63, a width W3 of the bracket 140 may be greater than a width W4 of the adhesive layer 400. In this instance, the bracket 140 may include a groove 141, and the adhesive layer 400 may be formed in the groove 141 of the bracket 140.

A distance W5 (hereinafter, referred to as a first distance W5) between one end of the groove 141 and one end of the bracket 140 in the direction D34 toward the middle of the display panel 100 may be less than a width W4 of the groove 141 based on the groove 141 of the cross section of the bracket 140.

Further, a distance W6 (hereinafter, referred to as a second distance W6) between another end of the groove 141 and another end of the bracket 140 in the direction D35 away from the middle of the display panel 100 may be less than the width W4 of the groove 141 based on the groove 141 of the cross section of the bracket 140.

In this instance, because the size of the groove 141 of the bracket 140 may increase, the adhesive strength between the bracket 140 and the back substrate 111 may be improved.

Further, a sum (W5+W6) of the first distance W5 and the second distance W6 may be less than the width W4 of the groove 141. In this instance, because the size of the groove 141 of the bracket 140 may further increase, the adhesive strength between the bracket 140 and the back substrate 111 may be further improved.

The first distance W5 may be equal to or less than the second distance W6. In this instance, the distance between the end P10 of the active area AA of the display panel 100 and the bracket 140 may increase while maintaining the strength of the bracket 140. Hence, the screen distortion may be further prevented.

A width W4 of the adhesive layer 400 may be greater than a thickness W7 of the adhesive layer 400. In this instance, the adhesive strength between the bracket 140 and the back substrate 111 may be improved.

The adhesive layer 400 may be formed using an adhesive formed of an UV adhesive or polyurethane.

An example of forming the adhesive layer 400 using the UV adhesive is described below.

Figure 64:
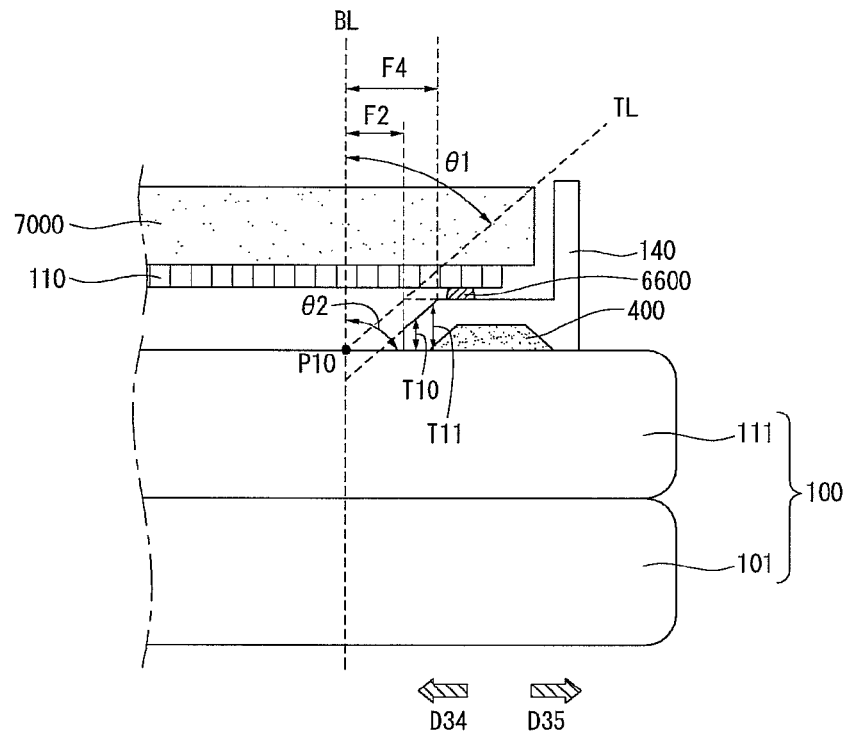

As shown in FIG. 64, one surface of the bracket 140 may have the shape of an oblique line. For example, the side surface of the cross section of the bracket 140 in the direction D34 toward the middle of the display panel 100 may have the shape of the oblique line when viewed from the back substrate 111.

In this instance, the distance F2 between the end P10 of the active area AA of the display panel 100 and the bracket 140 in an area where the bracket 140 is adjacent to the back substrate 111 may be less than the distance F2 in an area where the bracket 140 is adjacent to the optical layer 110. Namely, the distance F2 may decrease as it goes from the back substrate 111 to the optical layer 110. Thus, because the block of light resulting from the bracket 140 may be reduced, the screen distortion may be reduced.

Further, while the normal line TL shown in FIG. 60 contacts the bracket 140, the normal line TL shown in FIG. 64 does not contact the bracket 140. In this instance, as shown in FIG. 64, a height of the cross section of the bracket 140 may gradually decrease as the bracket 140 goes to the middle direction D34 of the display panel 100. More specifically, the height of the cross section of the bracket 140 may gradually decrease from T11 to T10 as the bracket 140 goes to the middle direction D34 of the display panel 100.

Figure 65:
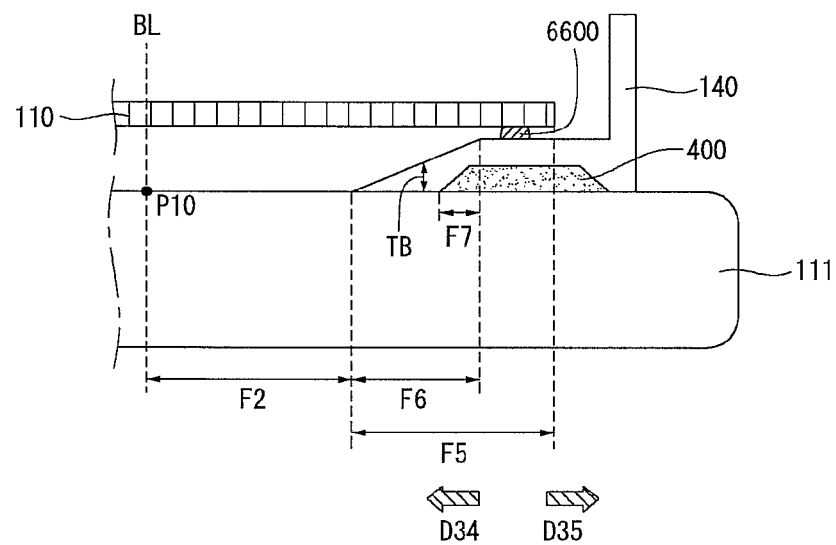

As shown in FIG. 65, the adhesive layer 400 may overlap the optical layer 110 in the width direction of the display panel 100. A reason why the adhesive layer 400 may overlap the optical layer 110 is because one side of the bracket 140 may have the shape of the oblique line and the bracket 140 may move close to the middle of the display panel 100.

As shown in FIG. 65, a first portion F5 of the bracket 140 overlapping the optical layer 110 in the width direction of the display panel 100 may include a second portion F6, whose a height $T_B$ gradually decreases as it goes in the middle direction D34 of the display panel 100. The second portion F6 may overlap a portion F7 of the adhesive layer 400 in the width direction of the display panel 100. A width of the second portion F6 may be less than the shortest distance F2 between the end P10 of the active area of the display panel 100 and the bracket 140, so as to reduce the screen distortion and to prevent an excessive increase in the size of the dummy area DA.

Figure 66:
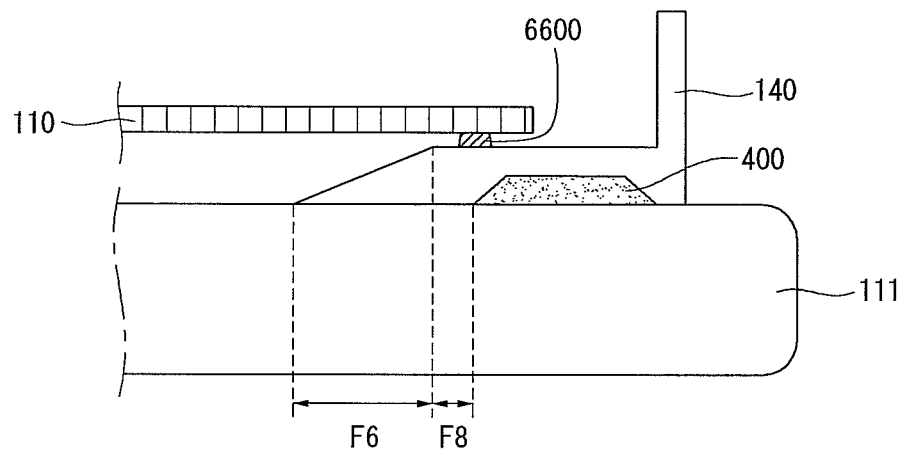

Alternatively, as shown in FIG. 66, the second portion F6 of the bracket 140 does not overlap the adhesive layer 400 in the width direction of the display panel 100 and may be separated from the adhesive layer 400 by a predetermined distance F8.

Figure 67:
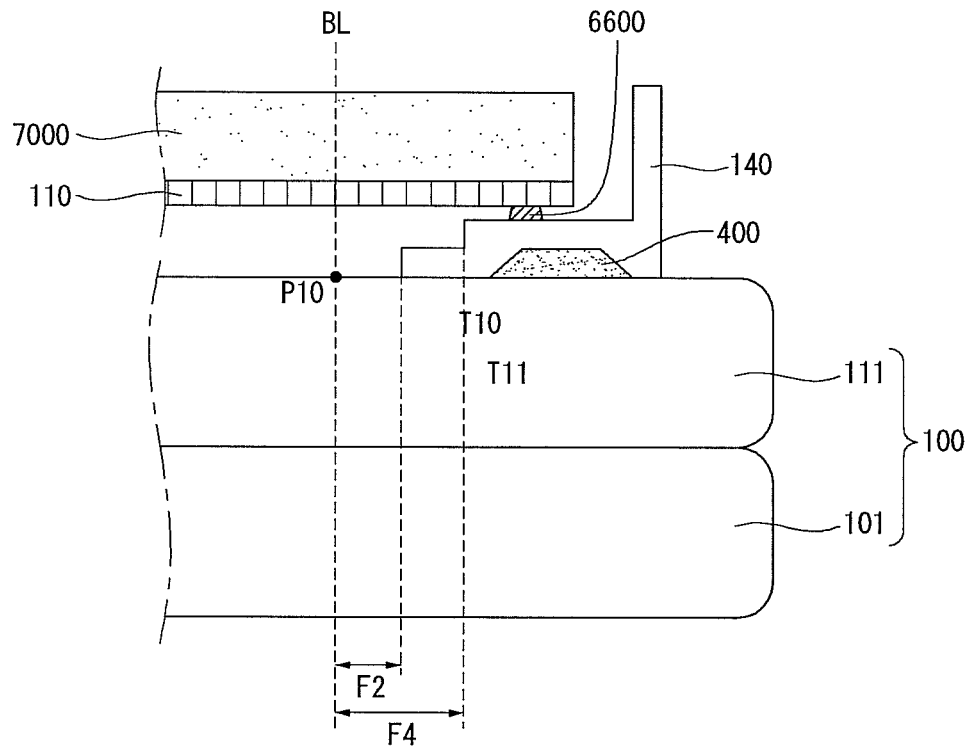

Alternatively, as shown in FIG. 67, one side of the bracket 140 may have a step shape.

Figure 68:
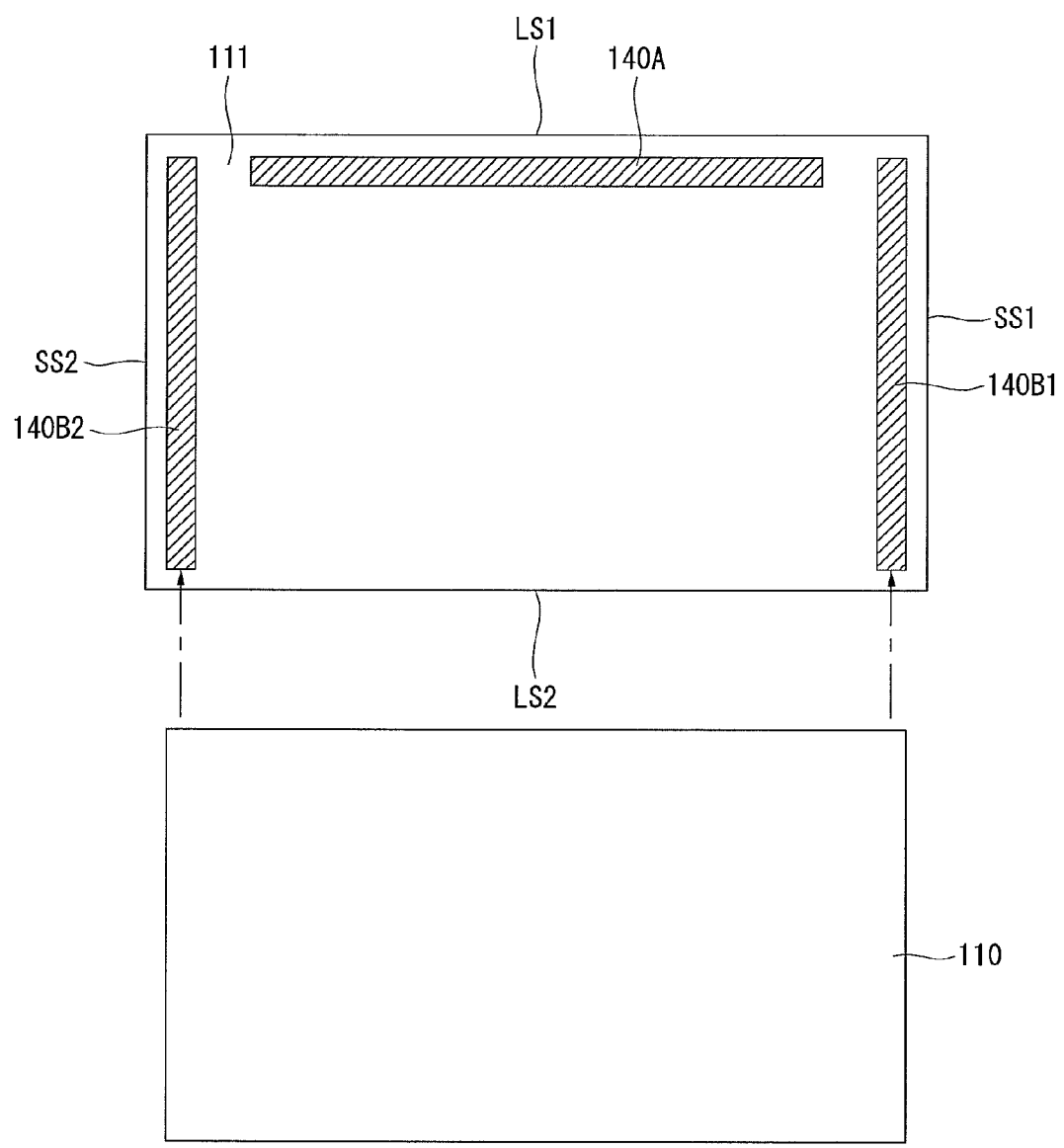
FIGS. 68 to 119 illustrate another configuration of a display device according to an example embodiment of the invention.
Figure 119:
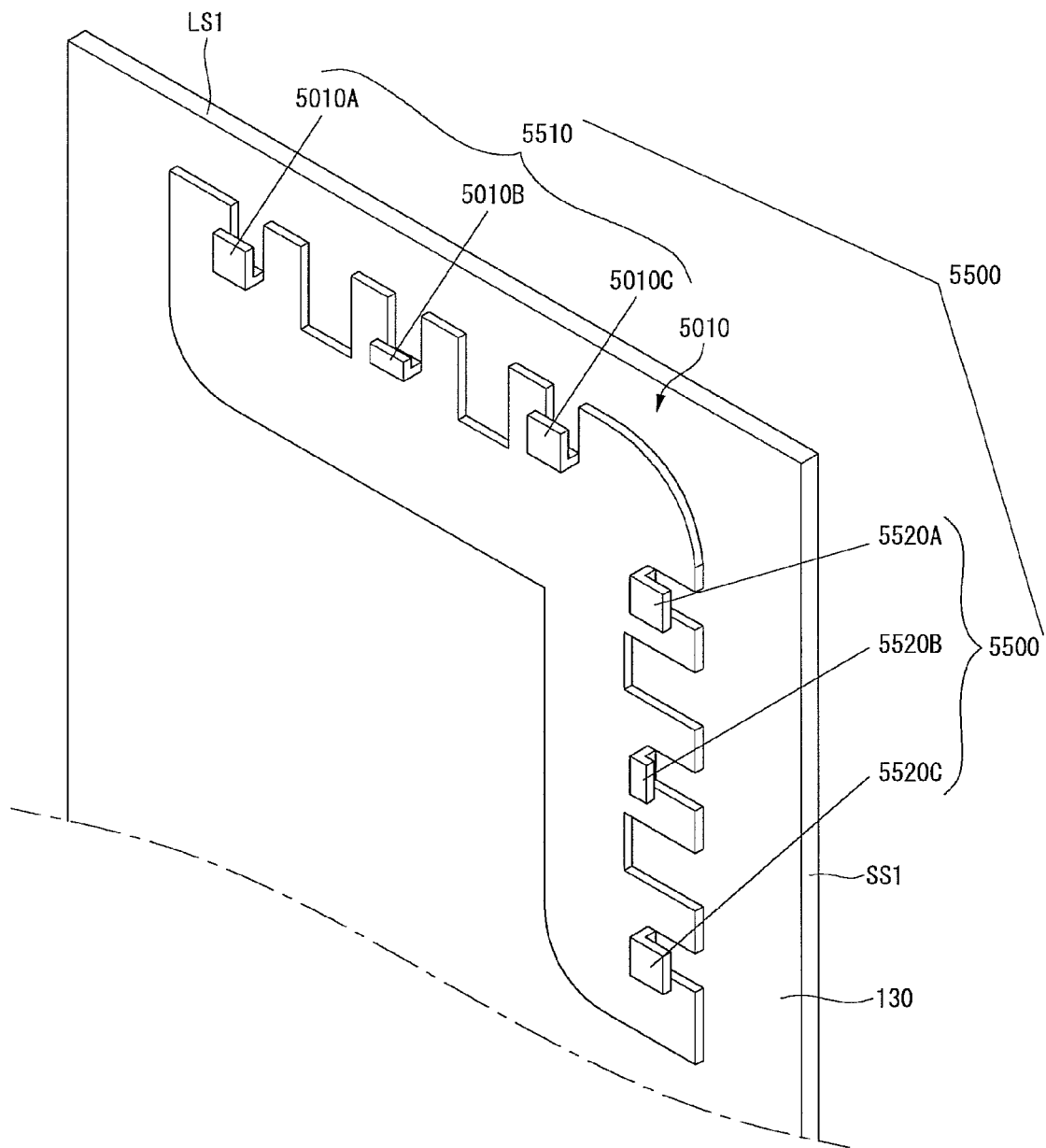

FIGS. 68 to 119 illustrate another configuration of a display device according to an example embodiment of the invention. In the following description, the descriptions of the configuration and the structure described above are omitted.

The optical layer 110 may be disposed on the bracket 140. More specifically, similar to the back cover 130, the optical layer 110 may be connected to the bracket 140 in the sliding manner.

For example, as shown in FIG. 68, the optical layer 110 may be connected to the first and second longitudinal brackets 140B1 and 140B2, which are respectively disposed in the third and fourth areas SS1 and SS2 of the back substrate 111, in the sliding manner. In this instance, the optical layer 110 may be firmly fixed to the bracket 140, and time required to manufacture the display device may be reduced.

Figure 69:
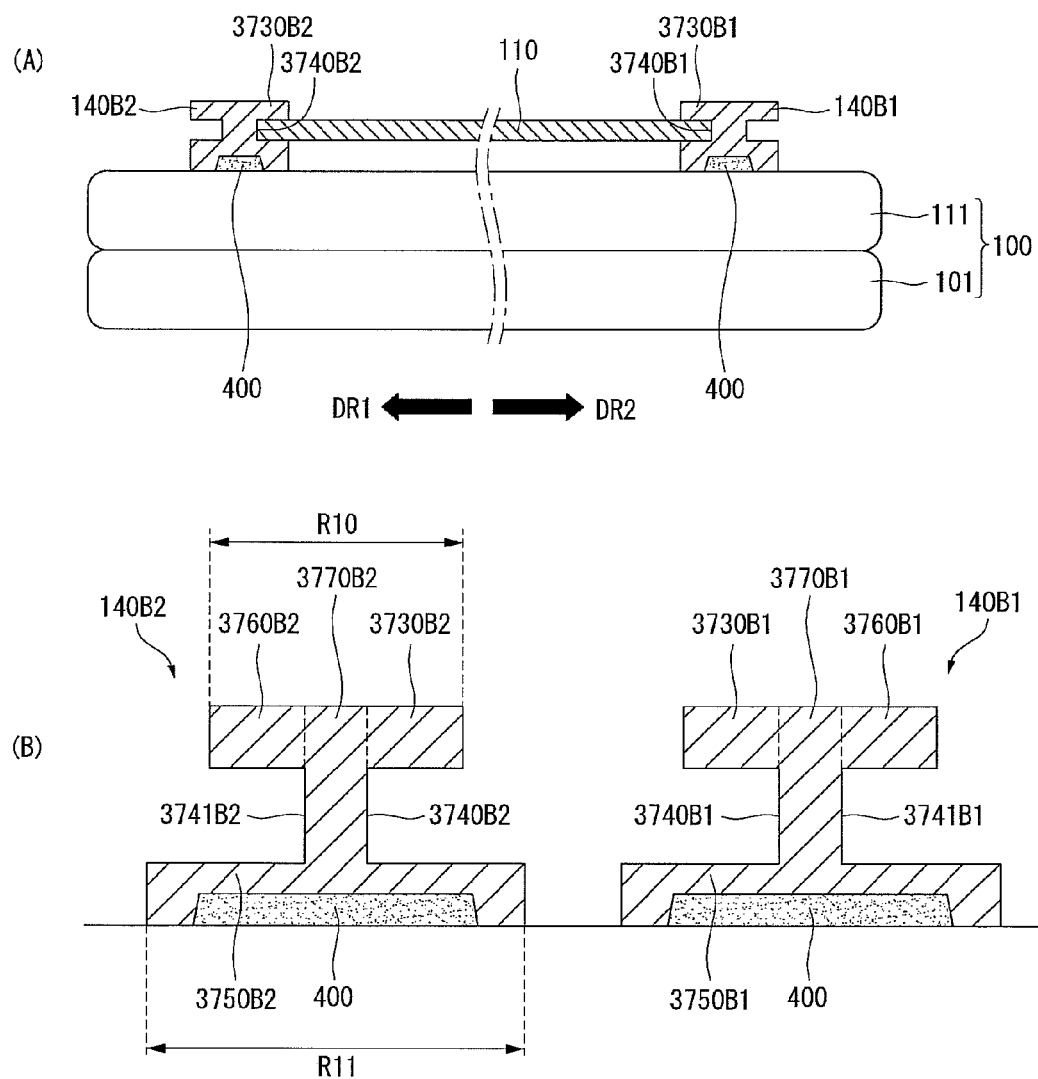

FIG. 69(A) shows that the optical layer 110 is inserted into the bracket 140 in the sliding manner. As above, when the optical layer 110 is connected to the bracket 140 in the sliding manner, the optical layer 110 may be separated from the back substrate 111 by a predetermined distance.

The bracket 140 may include a rail so that the optical layer 110 is connected to the bracket 140 in the sliding manner. Preferably, the bracket 140 may include an inner rail depressed in the direction away from the middle of the display panel 100, and the optical layer 110 may include a portion inserted into the inner rail. Further, the bracket 140 may include an outer rail depressed in the direction toward the middle of the display panel 100.

For example, as shown in FIG. 69(B), the first longitudinal bracket 140B1 may include a first longitudinal inner rail 3740B1 depressed in the direction (i.e., a second direction DR2) away from the second longitudinal bracket 140B2. The second longitudinal bracket 140B2 may include a second longitudinal inner rail 3740B2 depressed in the direction (i.e., a first direction DR1) away from the first longitudinal bracket 140B1.

The optical layer 110 may include a portion inserted into the first longitudinal inner rail 3740B1 and a portion inserted into the second longitudinal inner rail 3740B2.

More specifically, the first longitudinal bracket 140B1 may include a first base 3750B1 positioned on the back substrate 111, a first pillar 3770B1 positioned on the first base 3750B1, and a first head 3730B1 protruding in the direction from the first pillar 3770B1 toward the second longitudinal bracket 140B2. The second longitudinal bracket 140B2 may include a second base 3750B2 positioned on the back substrate 111, a second pillar 3770B2 positioned on the second base 3750B2, and a second head 3730B2 protruding in the direction from the second pillar 3770B2 toward the first longitudinal bracket 140B1.

The first longitudinal inner rail 3740B1 may be positioned between the first base 3750B1 and the first head 3730B1. The second longitudinal inner rail 3740B2 may be positioned between the second base 3750B2 and the second head 3730B2.

To secure the structural stability of the bracket 140, a width R11 of the first base 3750B1 may be greater than a width R10 of the first head 3730B1, and a width R11 of the second base 3750B2 may be greater than a width R10 of the second head 3730B2.

The first longitudinal bracket 140B1 may further include a third head 3760B1 protruding from the first pillar 3770B1 in the direction (i.e., the second direction DR2) away from the second longitudinal bracket 140B2. The second longitudinal bracket 140B2 may further include a fourth head 3760B2 protruding from the second pillar 3770B2 in the direction (i.e., the first direction DR) away from the first longitudinal bracket 140B1.

The first longitudinal bracket 140B1 may include a first longitudinal outer rail 3741B1 depressed between the first base 3750B1 and the third head 3760B1 in the direction toward the second longitudinal bracket 140B2. The second longitudinal bracket 140B2 may include a second longitudinal outer rail 3741B2 depressed between the second base 3750B2 and the fourth head 3760B2 in the direction toward the first longitudinal bracket 140B1.

Figure 70:
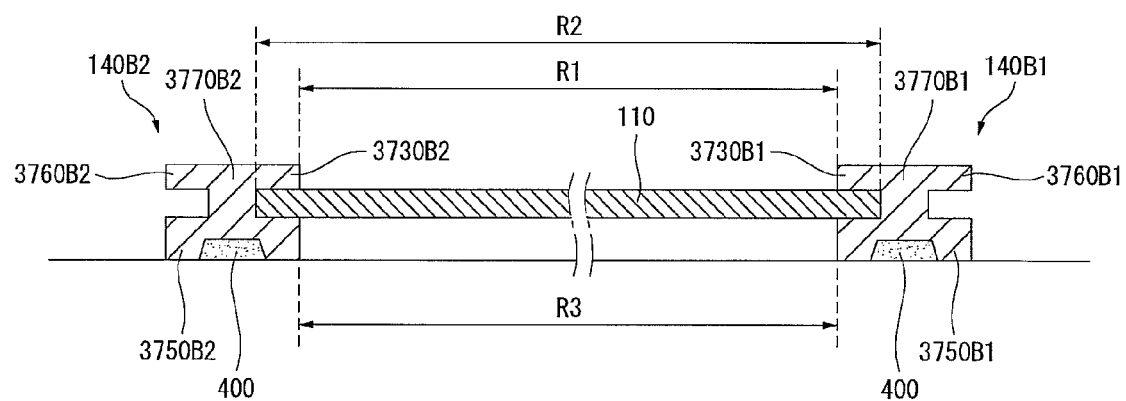

In this instance, as shown in FIG. 70, because the optical layer 110 includes a portion inserted into the first longitudinal inner rail 3740B1 and a portion inserted into the second longitudinal inner rail 3740B2, a distance R1 between the first head 3730B1 and the second head 3730B2 may be less than the width R2 of the optical layer 110. Further, a distance R3 between the first base 3750B1 and the second base 3750B2 may be less than the width R2 of the optical layer 110.

Because the width R11 of each of the first base 3750B1 and the second base 3750B2 is greater than the width R10 of each of the first head 3730B1 and the second head 3730B2, the distance R3 between the first base 3750B1 and the second base 3750B2 may be less than the distance R1 between the first head 3730B1 and the second head 3730B2.

Figure 71:
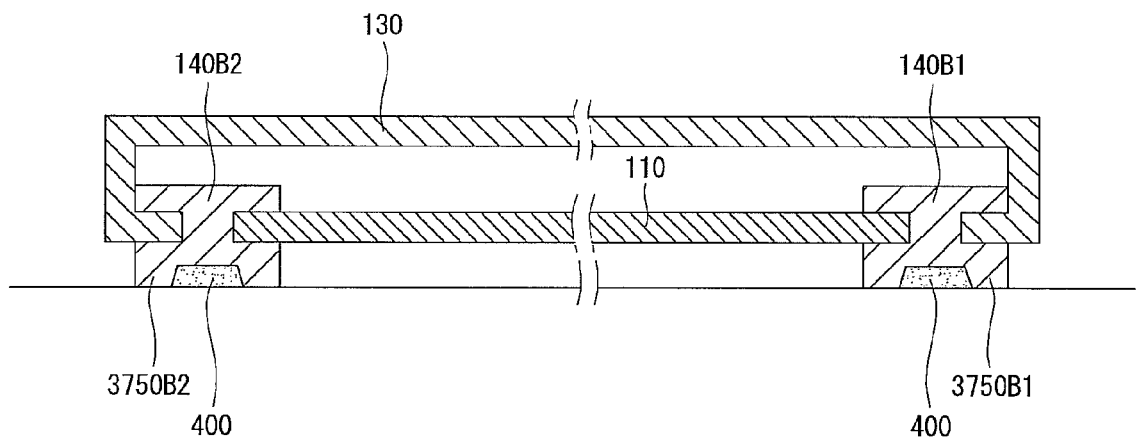

The back cover 130 may be connected to the bracket 140 in the sliding manner. For example, as shown in FIG. 71, the back cover 130 may include a portion inserted into the first longitudinal outer rail 3741B1 and a portion inserted into the second longitudinal outer rail 3741B2.

The display device according to the embodiment of the invention may further include a side cover 4400 connected to the back cover 130. The side cover 4400 may include a portion positioned on the side of the display panel 100. The side cover 4400 may prevent a foreign material from being penetrated into the display panel 100 and may prevent the side of the display panel 100 from being damaged by an impact applied from the outside.

Figure 72:
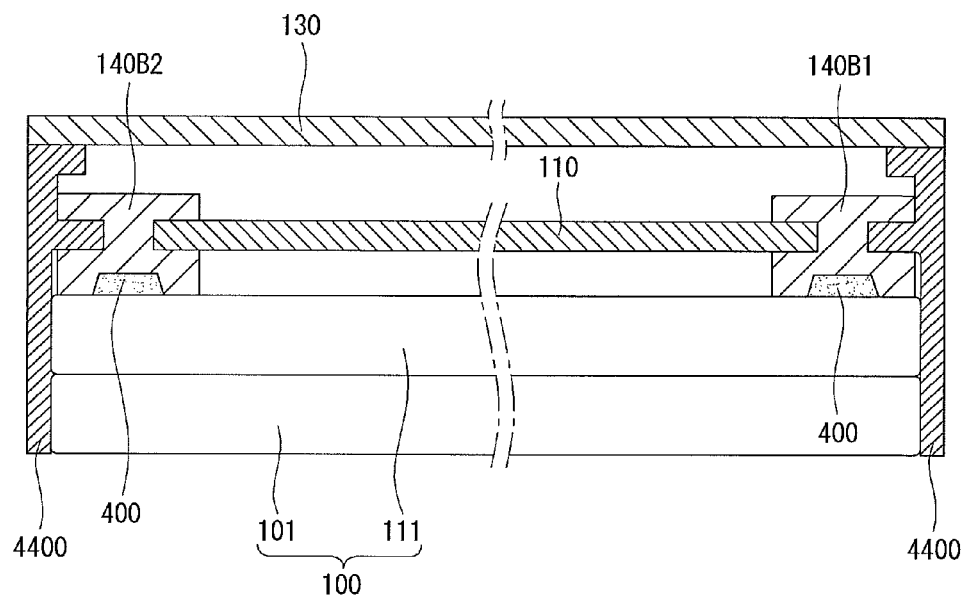

As shown in FIG. 72, the side cover 4400 may include a portion inserted into the first longitudinal outer rail 3741B1 and a portion inserted into the second longitudinal outer rail 3741B2. In this instance, the side cover 4400 may be connected to the bracket 140 in the sliding manner.

Figure 73:
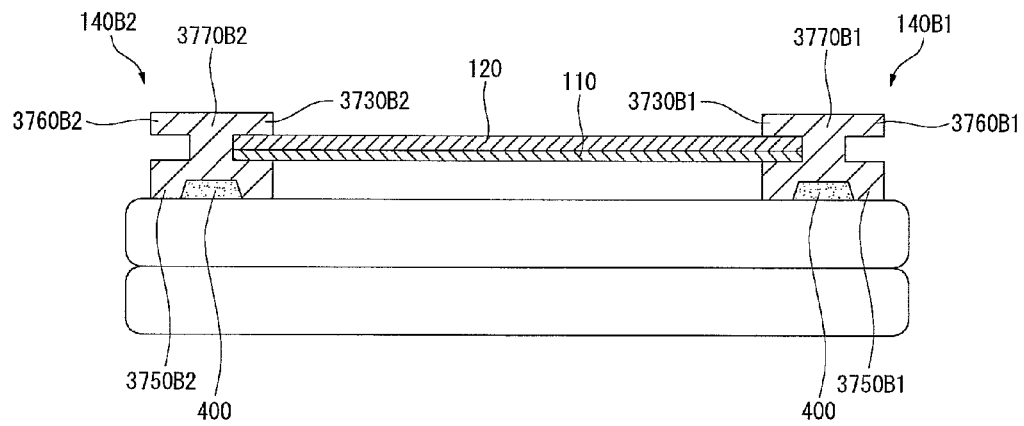

As shown in FIG. 73, the backlight unit 120 may include a portion positioned on the bracket 140.

For example, the backlight unit 120 may include a portion inserted into the first longitudinal inner rail 3740B1 and a portion inserted into the second longitudinal inner rail 3740B2. In this instance, the backlight unit 120 may be connected to the bracket 140 in the sliding manner.

Figure 74:
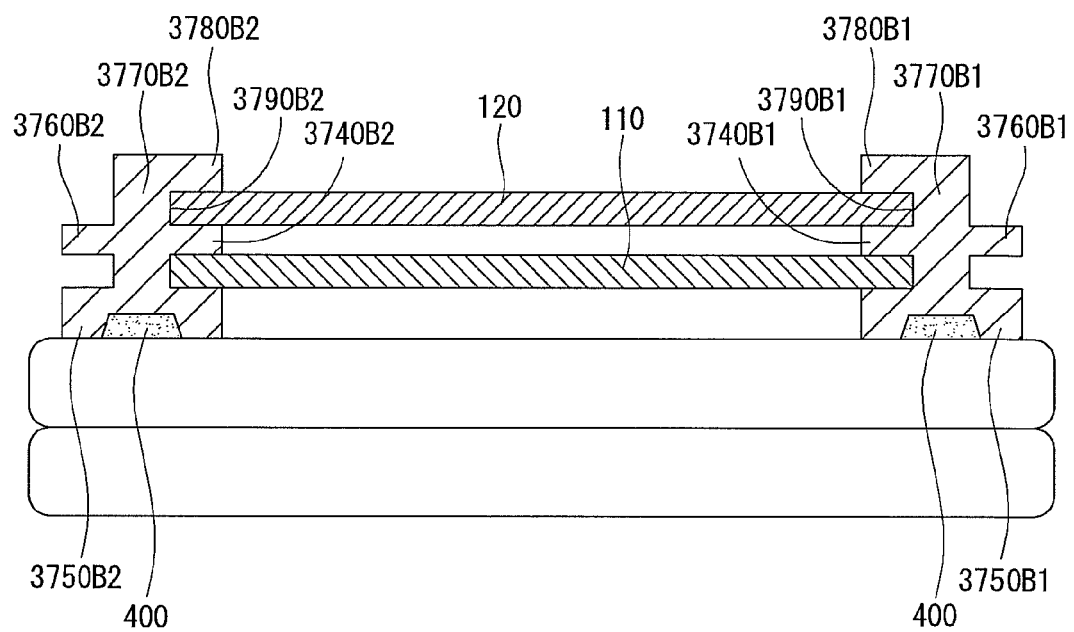

As shown in FIG. 74, the first longitudinal bracket 140B1 may include a fifth head 3780B1 protruding from the first pillar 3770B1 in the direction toward the second longitudinal bracket 140B2. The second longitudinal bracket 140B2 may include a sixth head 3780B2 protruding from the second pillar 3770B2 in the direction toward the first longitudinal bracket 140B1.

The first longitudinal bracket 140B1 may include a third longitudinal inner rail 3790B1 depressed between the fifth head 3780B1 and the first head 3730B1. The second longitudinal bracket 140B2 may include a fourth longitudinal inner rail 3790B2 depressed between the sixth head 3780B2 and the second head 3730B2.

In this instance, the optical layer 110 may include a portion inserted into the first longitudinal inner rail 3740B1 and a portion inserted into the second longitudinal inner rail 3740B2, and the backlight unit 120 may include a portion inserted into the third longitudinal inner rail 3790B1 and a portion inserted into the fourth longitudinal inner rail 3790B2.

The side cover 4400 may include a portion between the back substrate 111 and the bracket 140. In the following description, the descriptions of the configuration and the structure described above are omitted. For example, the optical layer 110 and/or the backlight unit 120 may be connected to the bracket 140 in the sliding manner.

Figure 75:
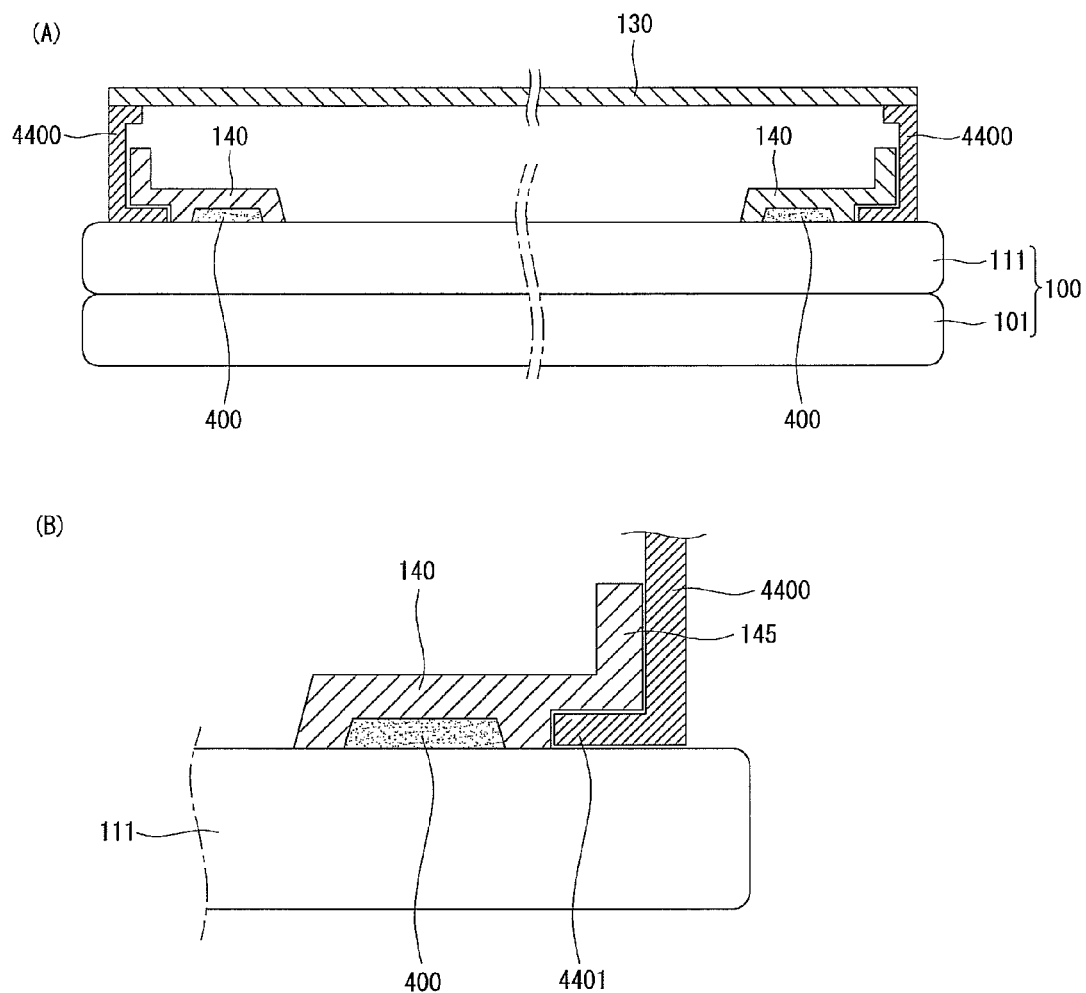

As shown in FIG. 75(A), the side cover 4400 may be connected to the back cover 130, and a portion of the side cover 4400 may be positioned between the back substrate 111 and the bracket 140.

In this instance, as shown in FIG. 75(B), the side cover 4400 may be connected to the bracket 140, which is attached to the back substrate 111 using the adhesive layer 400.

In other words, the side cover 4400 may be connected to the back cover 130 and may include a portion contacting the back substrate 111 and/or the bracket 140. In this instance, the side cover 4400 is not fastened to the bracket 140 and may be inserted into a space provided between the back substrate 111 and the bracket 140. Hence, the force applied to the back cover 130 may be prevented from being transferred to the bracket 140 through the side cover 4400. As a result, the light leakage phenomenon may be prevented.

Figure 76:
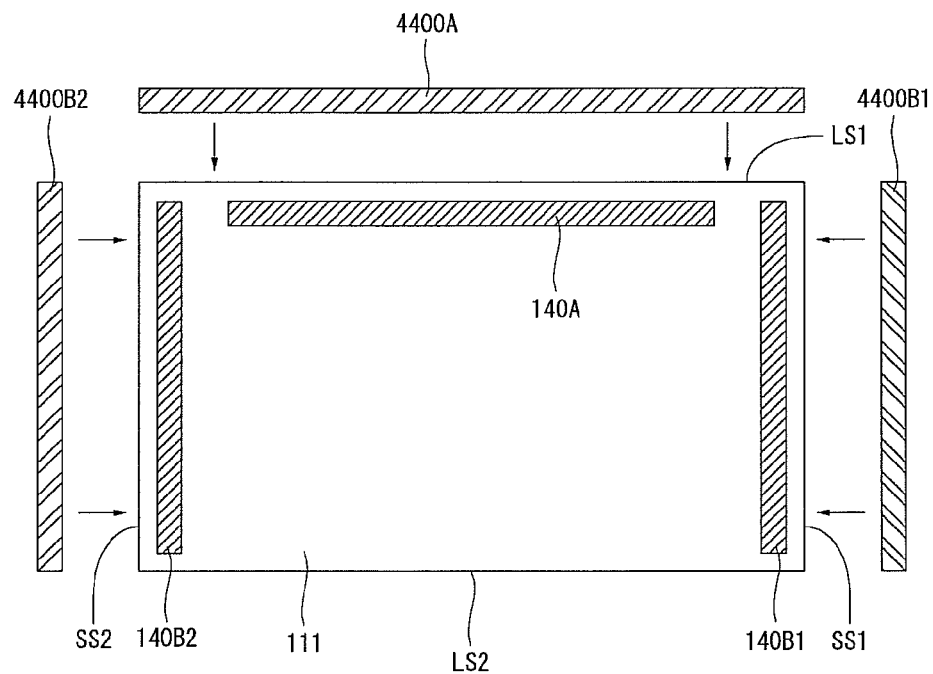

As shown in FIG. 76, the side cover 4400 according to the embodiment of the invention may include a transverse side cover 4400A corresponding to the transverse bracket 140A disposed in the first area LS1 of the back substrate 111. Namely, a portion of the transverse side cover 4400A may be disposed between the transverse bracket 140A and the back substrate 111. The side cover 4400 according to the embodiment of the invention may further include a first longitudinal side cover 4400B1 corresponding to the first longitudinal bracket 140B1 disposed in the third area SS1 of the back substrate 111 and a second longitudinal side cover 4400B2 corresponding to the second longitudinal bracket 140B2 disposed in the fourth area SS2 of the back substrate 111. In this instance, the side cover 4400 may be firmly connected to the bracket 140, and the light leakage phenomenon may be reduced. Further, time required in the manufacturing process may be reduced.

Figure 77:
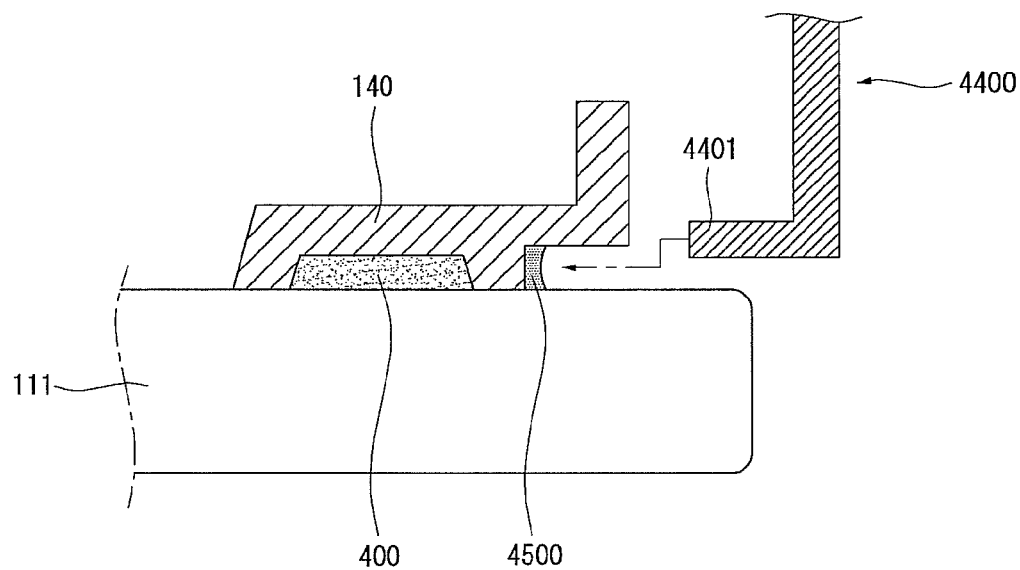

As shown in FIG. 77, a gasket 4500 may be disposed between a first portion 4401 of the side cover 4400, which is positioned between the back substrate 111 and the bracket 140, and the bracket 140 or between the first portion 4401 of the side cover 4400 and the back substrate 111. The gasket 4500 may prevent the first portion 4401 of the side cover 4400 from colliding with the back substrate 111 or the bracket 140, thereby improving the structural reliability.

The gasket 4500 may be replaced by an elastic part having elasticity. Alternatively, the gasket 4500 may be replaced by an adhesive material.

Figure 78:
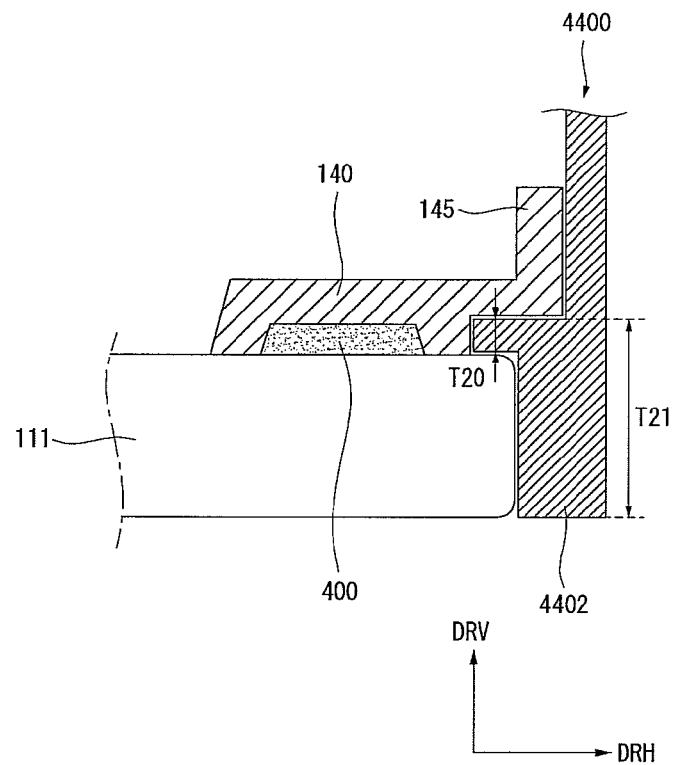

As shown in FIG. 78, the side cover 4400 may include a second portion 4402 positioned on the side of the back substrate 111, in addition to the first portion 4401 positioned between the back substrate 111 and the bracket 140.

A width T20 of the first portion 4401 positioned between the back substrate 111 and the bracket 140 may be less than a width T21 of the second portion 4402 positioned on the side of the back substrate 111 as measured in a width direction DRV of the back substrate 111.

A length of an overlap portion between the side cover 4400 and the bracket 140 may be different from a length of an overlap portion between the side cover 4400 and the back substrate 111 as measured in the width direction DRV of the back substrate 111.

Figure 79:
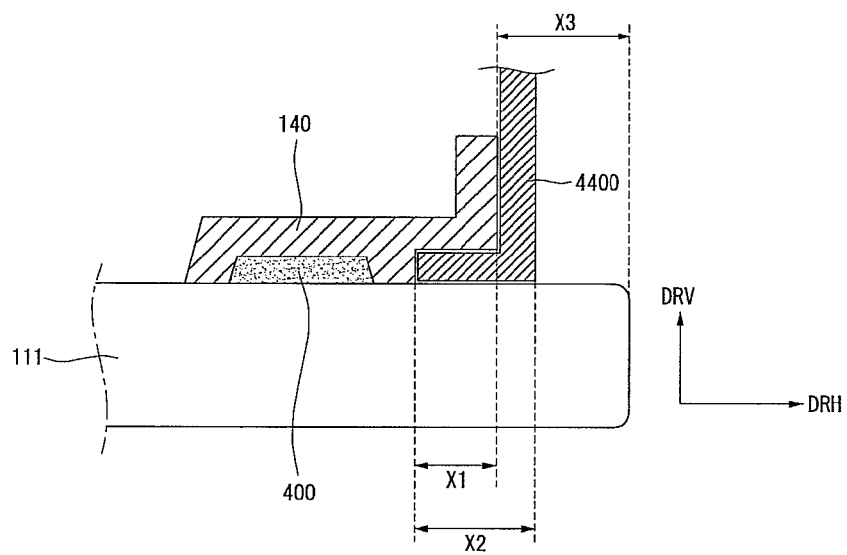

For example, as shown in FIG. 79, a length X1 of an overlap portion between the side cover 4400 and the bracket 140 may be less than a length X2 of an overlap portion between the side cover 4400 and the back substrate 111 as measured in the width direction DRV of the back substrate 111. In this instance, the back substrate 111 may extend further than the bracket 140 by a predetermined length X3 in an outside direction DRH of the display panel 100.

Further, the back substrate 111 may extend further than the side cover 4400 in the outside direction DRH of the display panel 100. In this instance, when the user in the front of the display panel 100 views the display panel 100, the side cover 4400 may be hidden by the display panel 100. Further, the edge and the side of the front surface of the front substrate 101 may be exposed.

Figure 80:
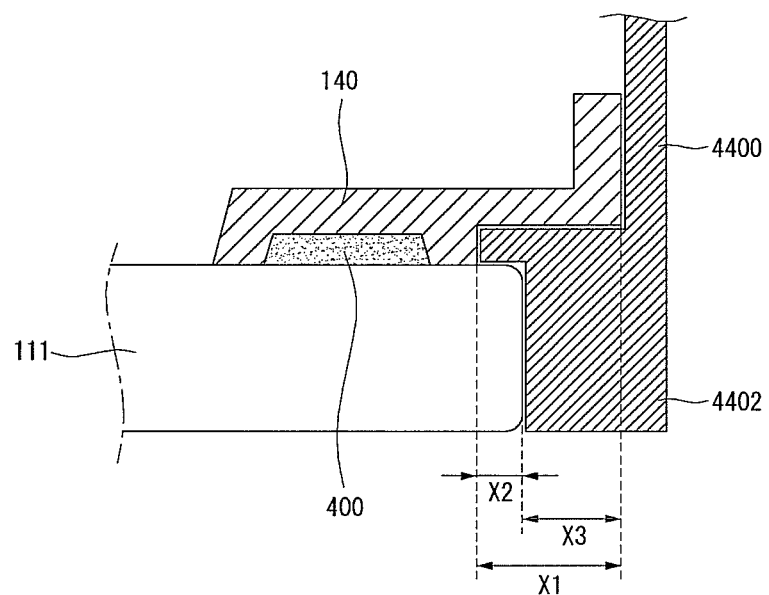

Alternatively, as shown in FIG. 80, a length X1 of an overlap portion between the side cover 4400 and the bracket 140 may be longer than a length X2 of an overlap portion between the side cover 4400 and the back substrate 111 as measured in the width direction DRV of the back substrate 111.

In this instance, the bracket 140 may extend further than the back substrate 111 by a predetermined length X3 in the outside direction DRH of the display panel 100. Further, the side cover 4400 may include a portion positioned on the side of the back substrate 111.

Figure 81:
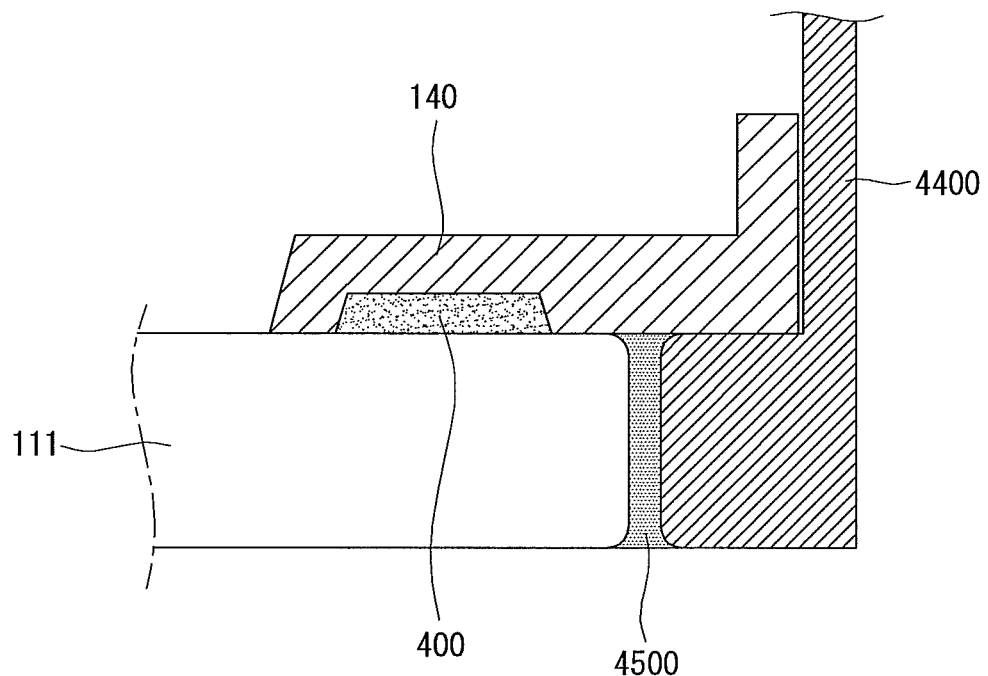

Alternatively, as shown in FIG. 81, the side cover 4400 may include a portion contacting the bracket 140 and a portion positioned on the side of the back substrate 111. In this instance, it may be preferable that a gasket 4500 is disposed between the back substrate 111 and the side cover 4400.

Figure 82:
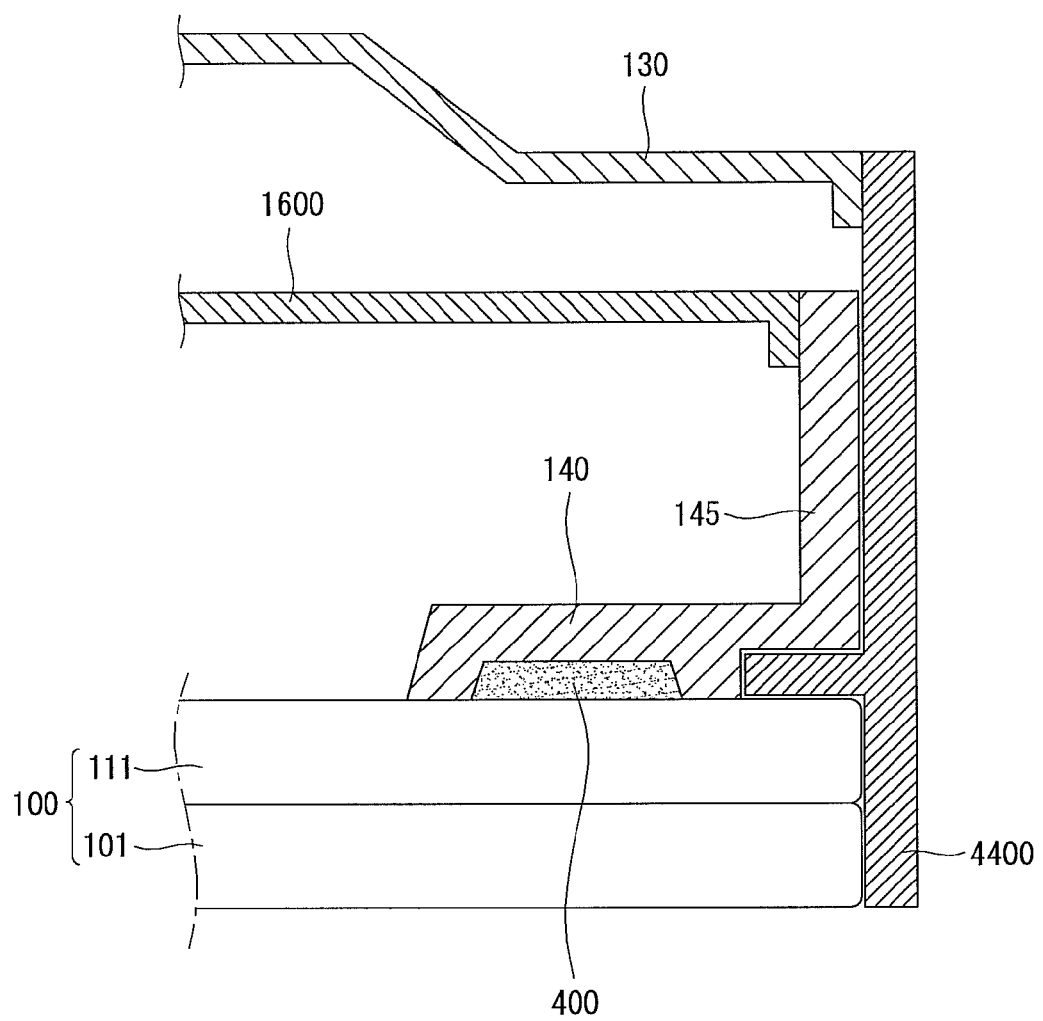

As shown in FIG. 82, even when the side cover 4400 includes a portion disposed between the bracket 140 and the back substrate 111, a frame 1600 may be disposed between the back cover 130 and the bracket 140. The frame 1600 may be connected to the bracket 140, and the back cover 130 may be connected to the side cover 4400. Further, the frame 1600 may be connected to the bracket 140 without using a fastening member such as a screw.

Figure 83:
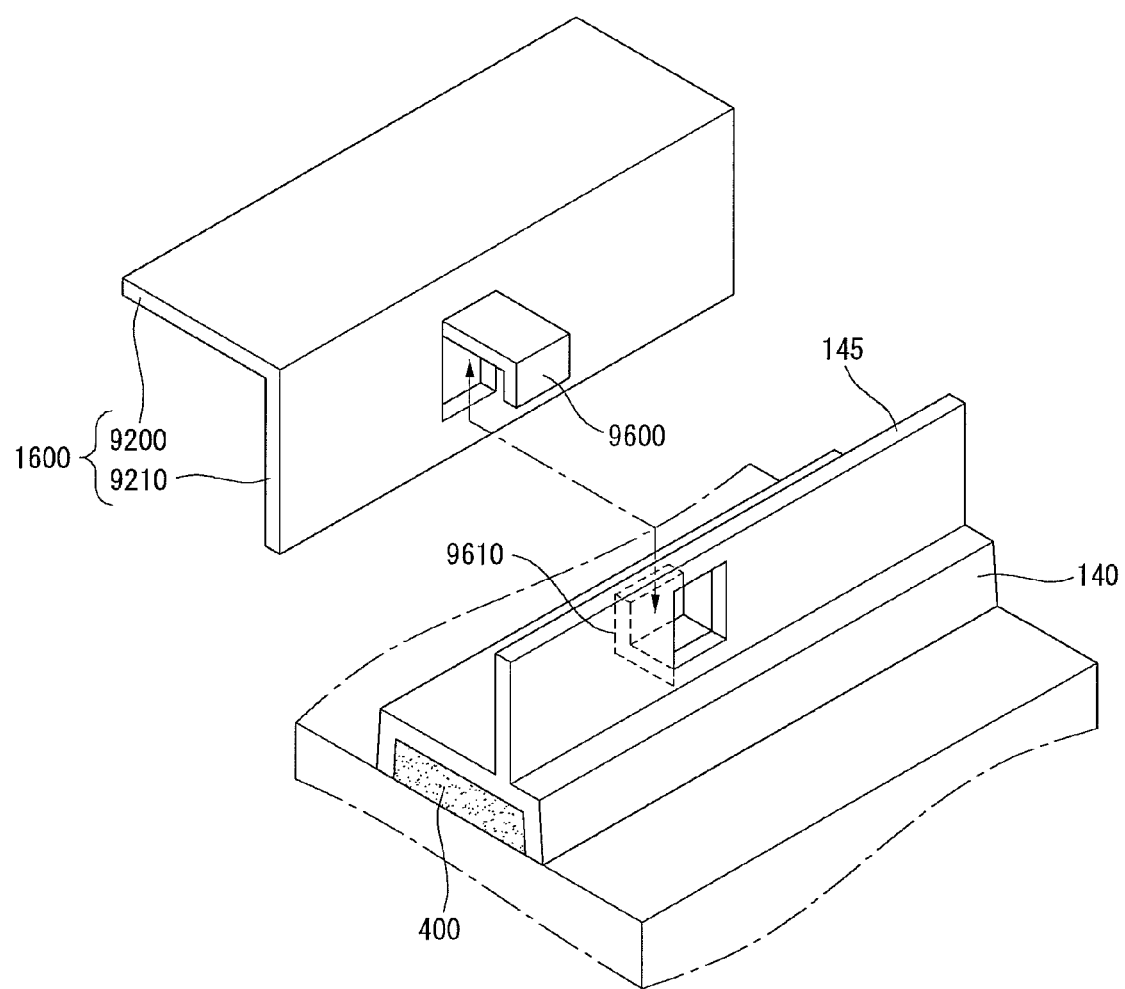

For example, as shown in FIG. 83, the bracket 140 may include a protrusion 145 protruding in the direction away from the display panel 100, and the frame 1600 may be connected to the protrusion 145.

The frame 1600 may include a body 9200 parallel to the display panel 100 and a connection part 9210, which is positioned parallel to the protrusion 145 of the bracket 140 at an end of the body 9200. The connection part 9210 of the frame 1600 may contact the protrusion 145 of the bracket 140.

A first hook 9600 protruding to the protrusion 145 of the bracket 140 may be formed on the connection part 9210 of the frame 1600. A second hook 9610 protruding to the connection part 9210 may be formed on the protrusion 145 of the bracket 140. The sheet metal processing may be performed on a portion of the connection part 9210 to form the first hook 9600. The sheet metal processing may be performed on a portion of the protrusion 145 to form the second hook 9610.

Figure 84:
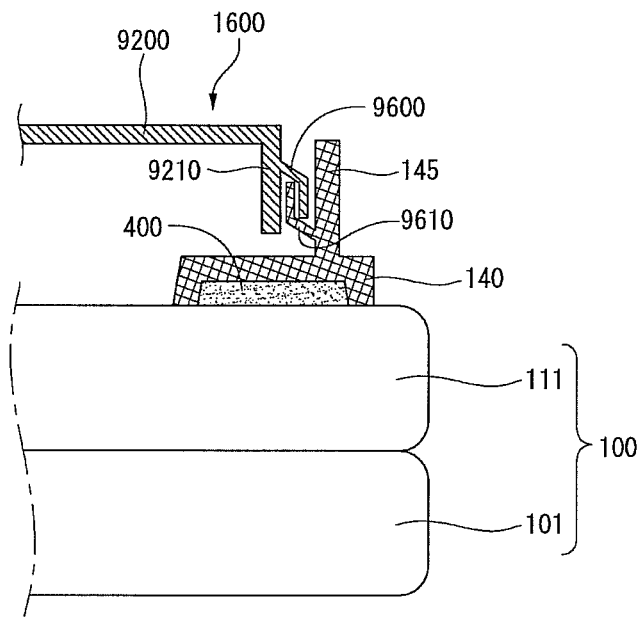

As shown in FIG. 84, when the first hook 9600 is interlocked with the second hook 9610, the frame 1600 and the bracket 140 may be connected to each other. In this instance, because the frame 1600 is not fixed to the bracket 140, the light leakage phenomenon may be reduced even if the frame 1600 is deformed.

Figure 85:
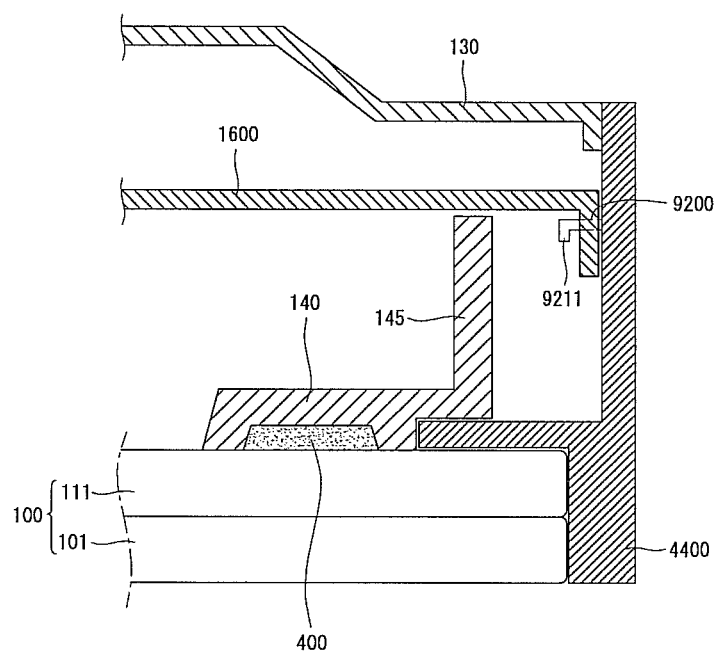
Figure 86:
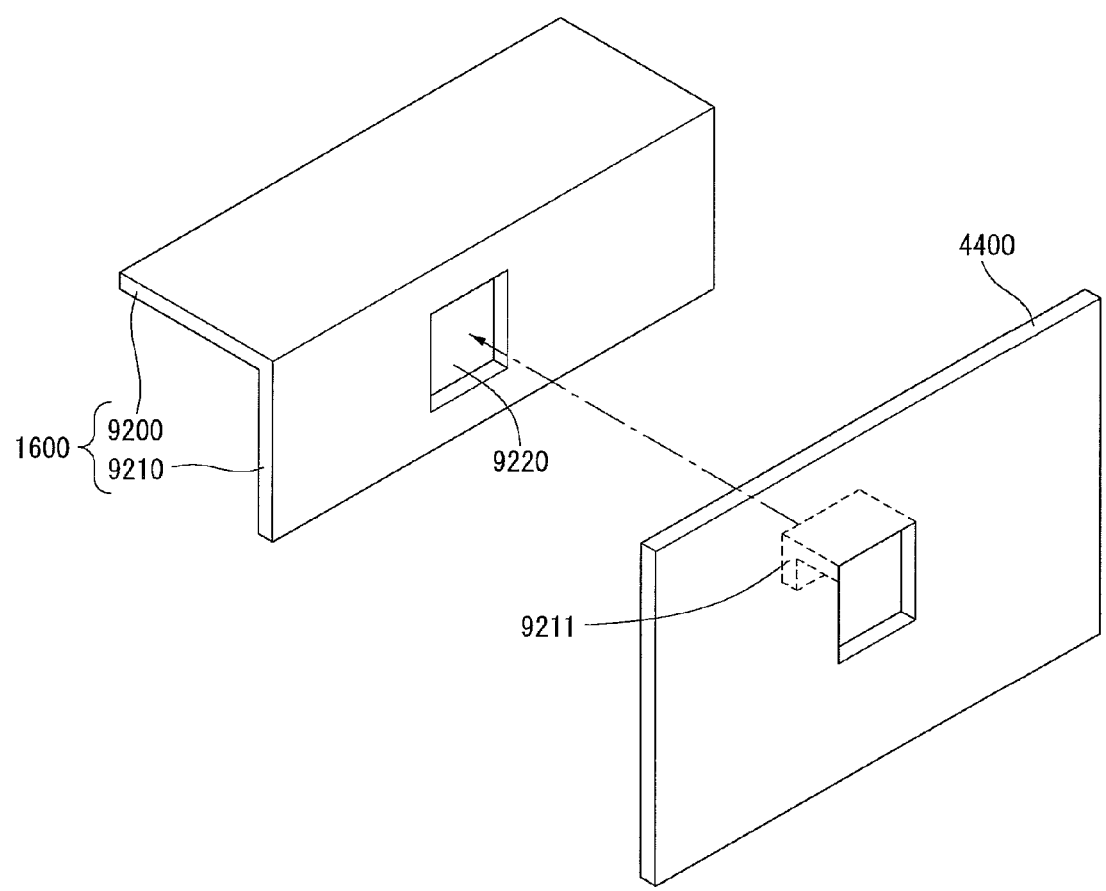

Alternatively, as shown in FIGS. 85 and 86, the side cover 4400 may include a hook 9211 protruding in the direction toward the middle of the display panel 100, and the connection part 9210 of the frame 1600 may include a hole 9220 corresponding to the hook 9211. When the hook 9211 is inserted into the hole 9220, the frame 1600 and the bracket 140 may be connected to each other.

In the structure illustrated in FIGS. 85 and 86, time required to connect the frame 1600 to the bracket 140 may be reduced.

FIGS. 85 and 86 show the frame 1600 including the hole 9220 corresponding to the hook 9211. However, the frame 1600 may include a groove corresponding to the hook 9211. In this instance, the frame 1600 may include a portion positioned between the bracket 140 and the side cover 4400. For example, the connection part 9210 of the frame 1600 may include a portion positioned between the bracket 140 and the side cover 4400.

Figure 87:
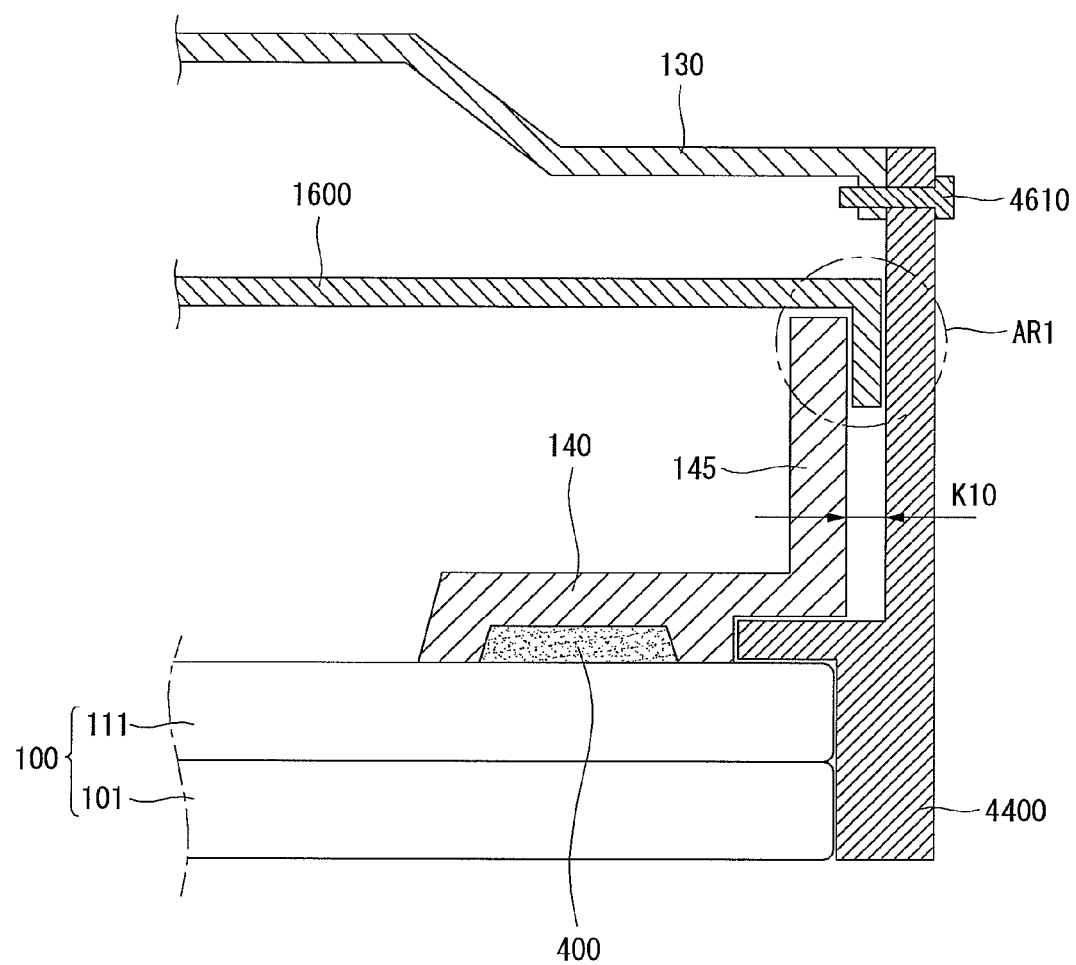

Alternatively, as shown in FIG. 87, when a distance K10 between the bracket 140 and the side cover 4400 is sufficiently small, a portion of the frame 11600 may be inserted between the bracket 140 and the side cover 4400. For example, the connection part 9210 of the frame 1600 may be inserted between the bracket 140 and the side cover 4400 as indicated by a circle AR1 shown in FIG. 87.

In this instance, because the frame 1600 is firmly connected to a space between the bracket 140 and the side cover 4400, a fastening member such as a screw or the hook 9211 and the hole 9220 shown in FIG. 80 may be omitted.

The side cover 4400 may be connected to the back cover 130 using a predetermined fastening member 9610. Alternatively, another structure may be used to connect the side cover 4400 to the back cover 130.

Figure 88:
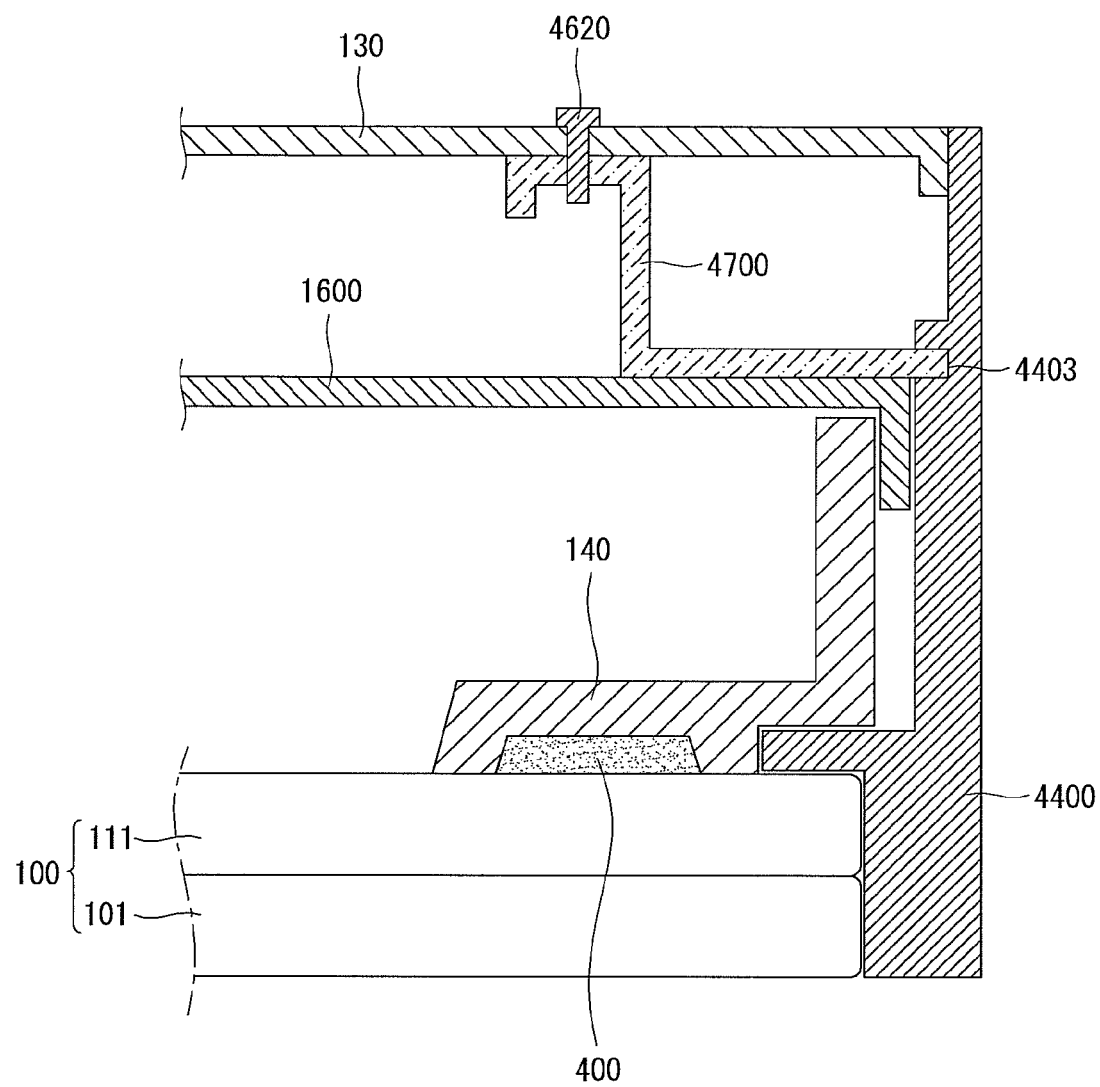

For example, as shown in FIG. 88, a structure 4700 connected to the back cover 130 and the side cover 4400 may be disposed between the back cover 130 and the side cover 4400. The structure 4700 may be referred to as a connection cover. The structure 4700 may be fastened to the back cover 130 using a predetermined fastening member 4620.

A portion of the structure 4700 may be inserted into a grove 4403 of the side cover 4400.

Figure 89:
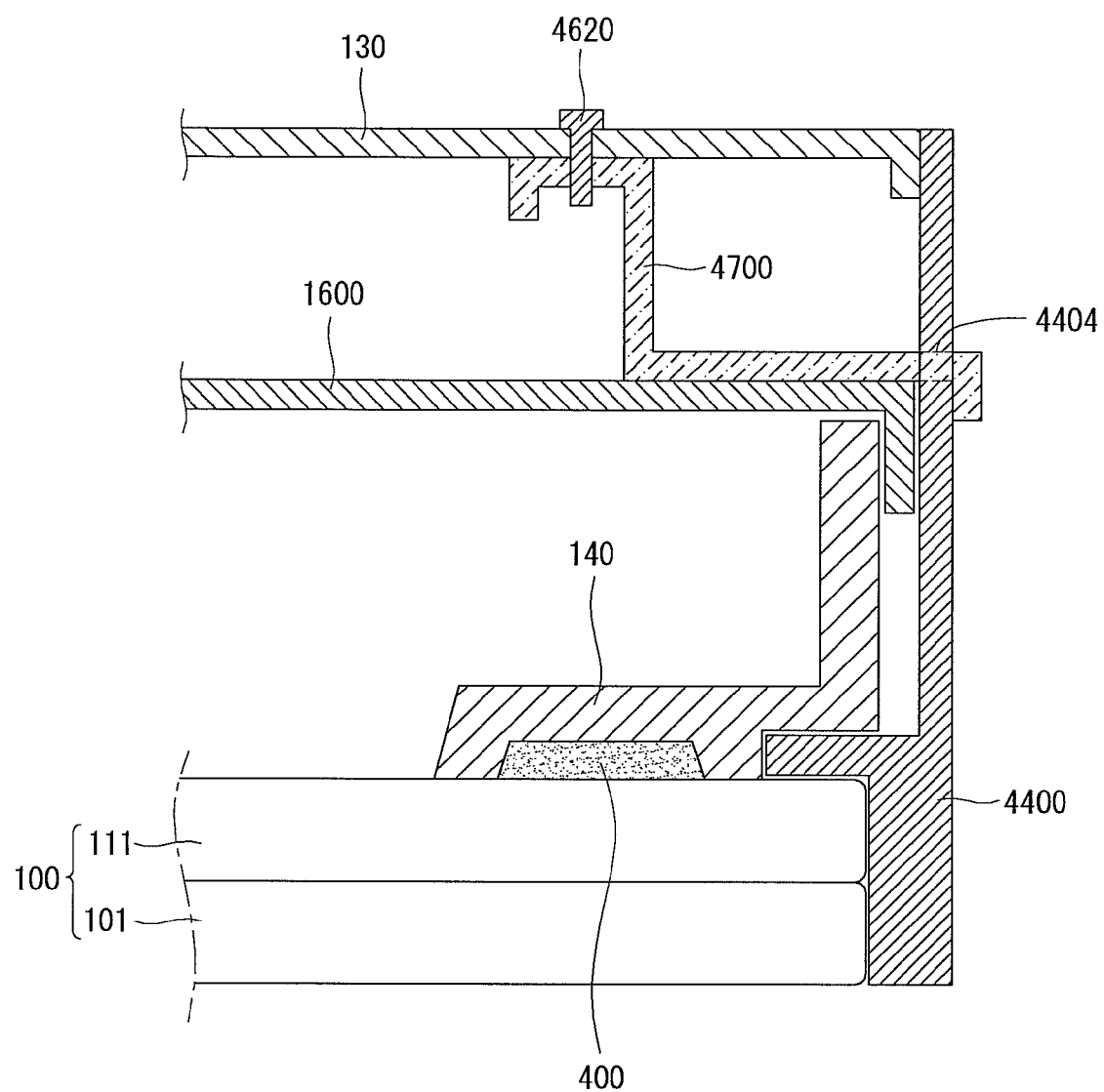

Alternatively, as shown in FIG. 89, a portion of the structure 4700 may pass through a hole 4404 of the side cover 4400 and may be inserted into the hole 4404. In this instance, even if the back cover 130 is deformed, the deformation of the back cover 130 may be prevented from being transferred to the side cover 4400. Therefore, the leakage phenomenon may be reduced.

An auxiliary bracket 4800 may be connected to the bracket 140. The optical layer 110 may be disposed between the bracket 140 and the auxiliary bracket 4800 or may be disposed on the auxiliary bracket 4800. This is described in detail below. In the following description, the descriptions of the configuration and the structure described above are omitted.

Figure 90:
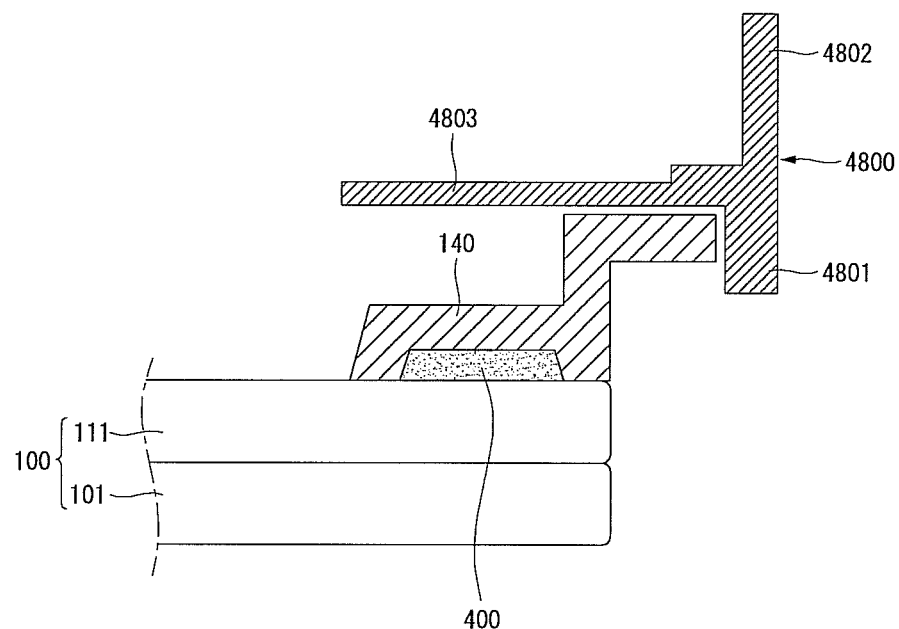

As shown in FIG. 90, the auxiliary bracket 4800 disposed on the bracket 140 may include a portion 4803 positioned parallel to the display panel 100. In the embodiment disclosed herein, the portion 4803 of the auxiliary bracket 4800 is referred to as a horizontal part 4803.

Further, the auxiliary bracket 4800 may include a protrusion 4801 protruding from the horizontal part 4803 in the direction crossing the display panel 100 (for example, in the direction toward the display panel 100) and a protrusion 4802 protruding from the horizontal part 4803 in the direction crossing the display panel 100 (for example, in the direction toward the back cover 130). In the embodiment disclosed herein, the protrusion 4801 of the auxiliary bracket 4800 is referred to as a first vertical part 4801, and the protrusion 4802 of the auxiliary bracket 4800 is referred to as a second vertical part 4802.

The auxiliary bracket 4800 may be attached to the bracket 140 or may be fastened to the bracket 140 using a fastening member (not shown).

The bracket 140 further includes a second protrusion extending from the first protrusion 145. In this instance, the first protrusion 1001 of the bracket extending away from the rear panel 111 in the vertical direction DRV of the display panel and the second protrusion extend from an end of the first protrusion in the horizontal direction DRH of the display panel such that the first and second protrusions form an inverted L-shape.

Figure 91:
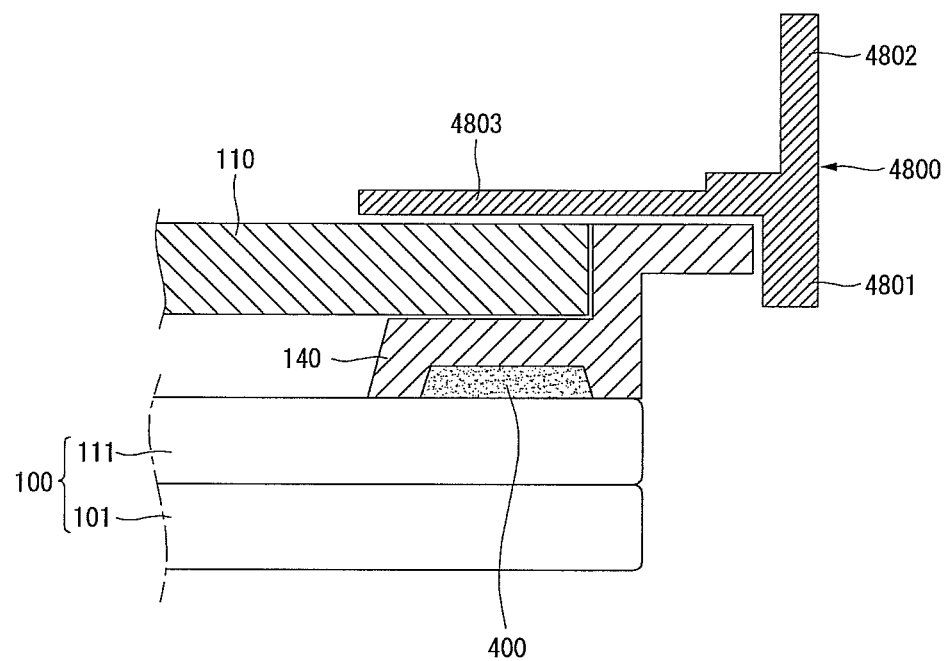

In this instance, as shown in FIG. 91, the optical layer 110 may include a portion positioned between the bracket 140 and the auxiliary bracket 4800. For example, a portion of the optical layer 110 may be positioned between the horizontal part 4803 of the auxiliary bracket 4800 and the bracket 140.

Figure 92:
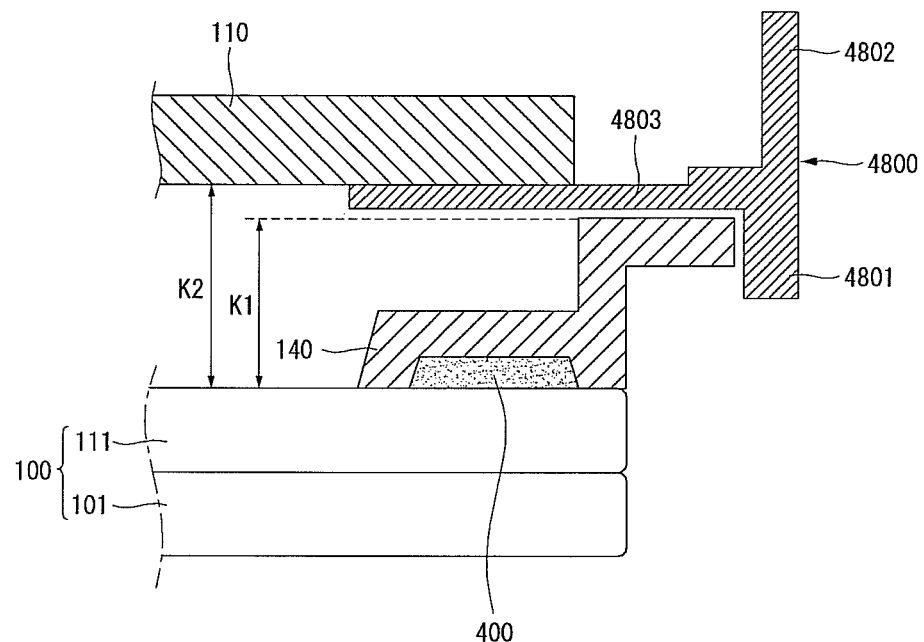

Alternatively, as shown in FIG. 92, the optical layer 110 may be disposed on the auxiliary bracket 4800. In this instance, a distance K2 between the back substrate 111 and the optical layer 110 may be greater than a distance K1 between the back substrate 111 and the horizontal part 4803 of the auxiliary bracket 4800. Further, the optical layer 110 may not contact the bracket 140.

In the structure illustrated in FIG. 92, the frame 1600 may be connected to the auxiliary bracket 4800.

Figure 93:
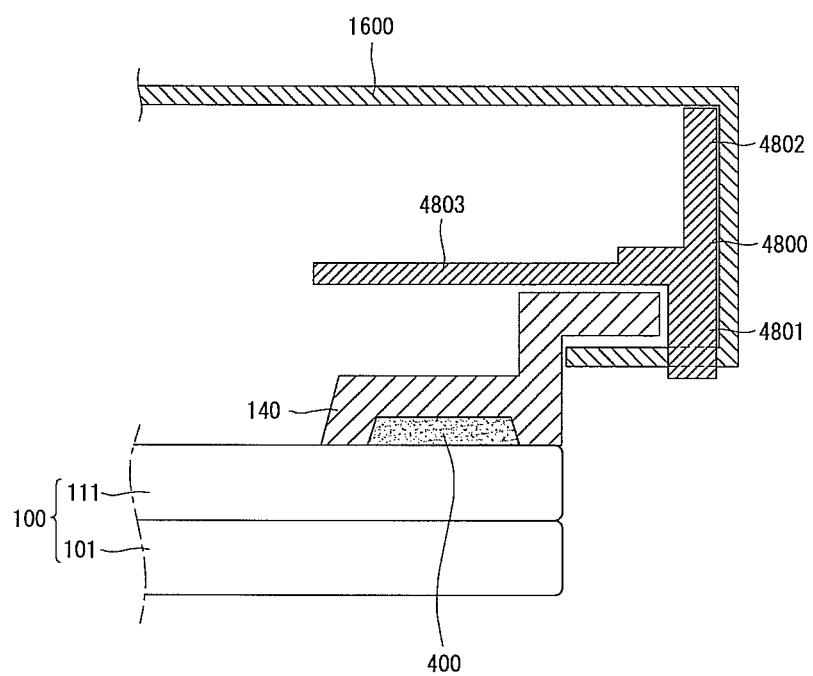

For example, as shown in FIG. 93, the frame 1600 between the optical layer 110 and the back cover 130 may include a portion contacting the auxiliary bracket 4800.

Figure 94:
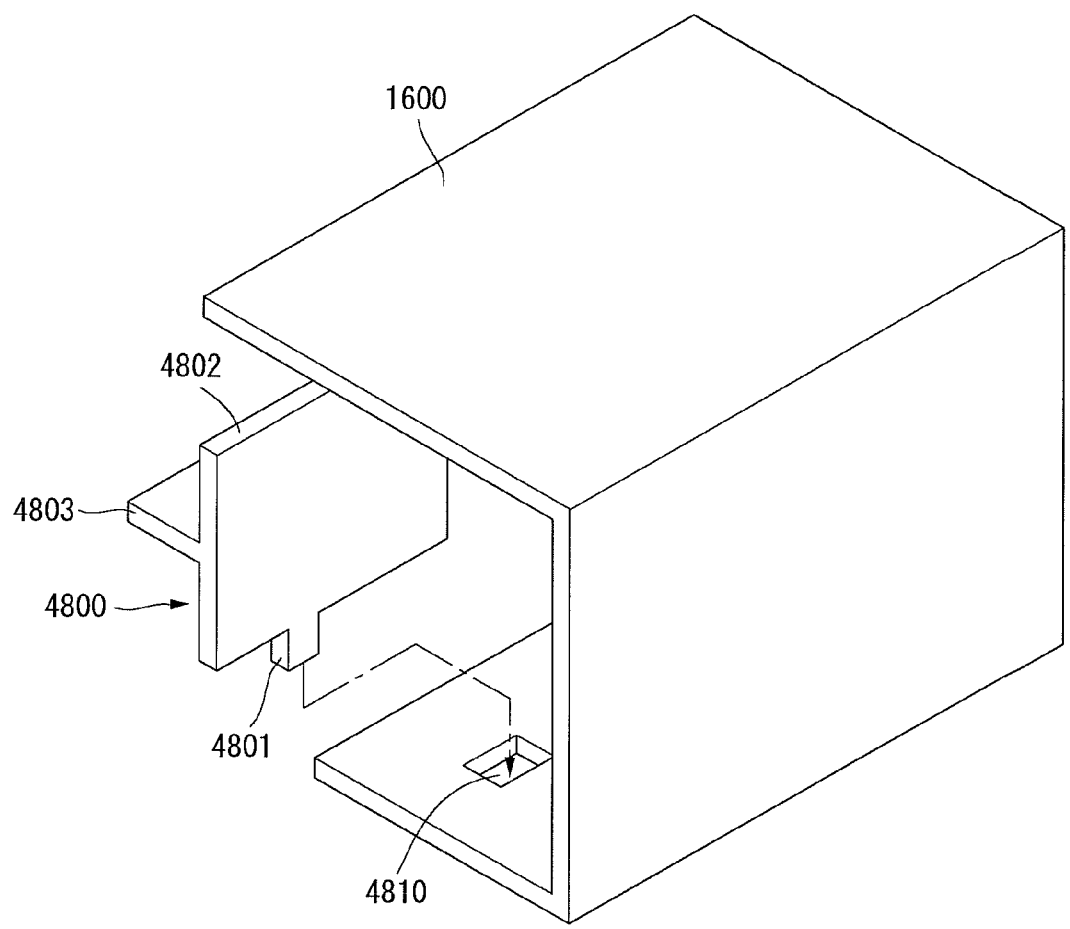

For this, as shown in FIG. 94, the frame 1600 may include a hole 4810 corresponding to the first vertical part 4801 of the auxiliary bracket 4800. The first vertical part 4801 may be inserted into the hole 4810 of the frame 1600. Hence, the frame 1600 and the auxiliary bracket 4800 may be connected to each other. In this instance, because the deformation of the frame 1600 is prevented from being transferred to the auxiliary bracket 4800, the leakage phenomenon may be reduced.

The frame 1600 may be supported by the second vertical part 4802 of the auxiliary bracket 4800. Hence, a sufficient space for disposing the optical layer 110, the backlight unit 120, etc. may be provided between the frame 1600 and the display panel 100.

Alternatively, the auxiliary bracket 4800 may be omitted, and the frame 1600 may be connected to the bracket 140.

Figure 95:
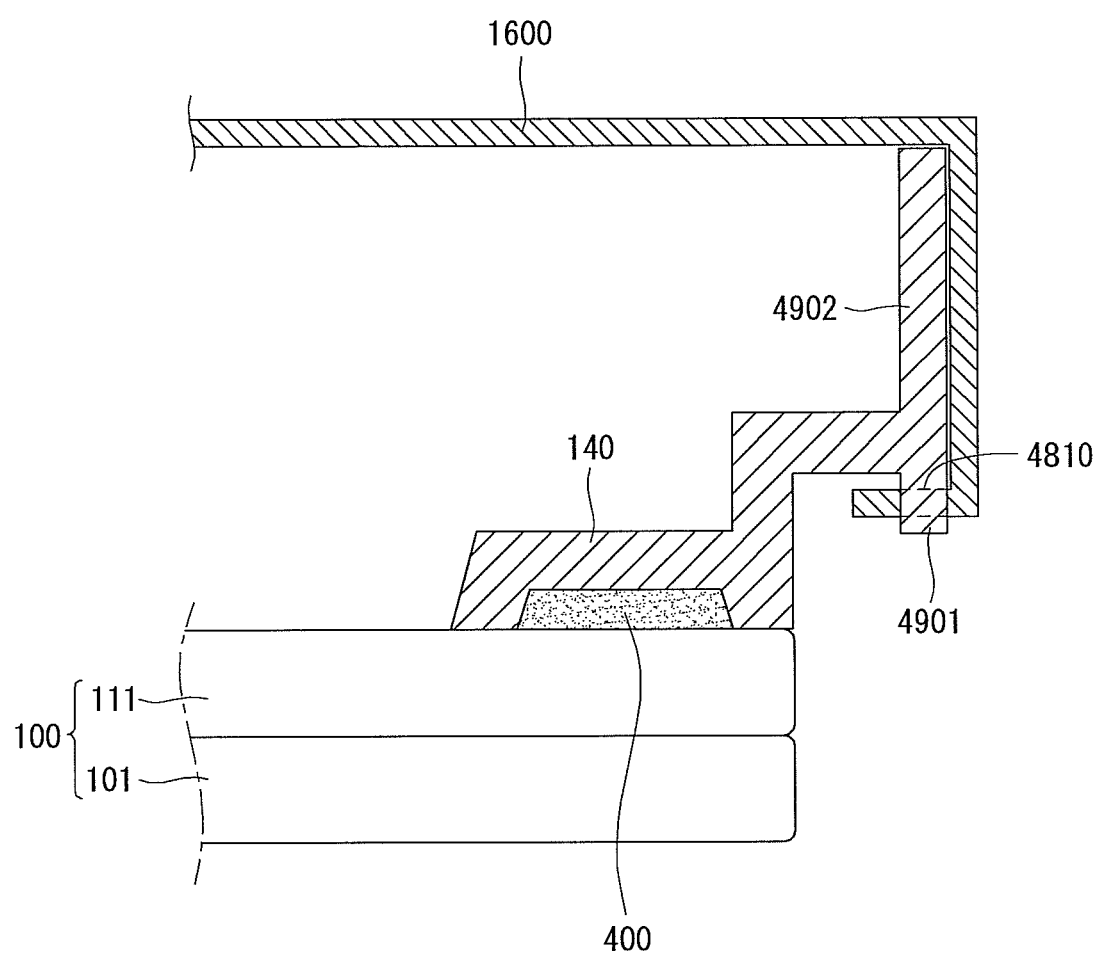

For example, as shown, in FIG. 95, the bracket 140 may include a 10th vertical part 4901 protruding in the direction toward the display panel 100 and a 11th vertical part 4902 protruding in the direction toward the frame 1600.

The frame 1600 may be supported by the 11th vertical part 4902, and the 10th vertical part 4901 of the bracket 140 may be inserted into a hole 4810 of the frame 1600.

The display device according to the embodiment of the invention may include a connection frame 5000 for connecting the frame 1600 to the auxiliary bracket 4800 or the frame 1600 to the bracket 140. The connection frame 5000 may connect the bracket 140 to the auxiliary bracket 4800. The connection frame 5000 may be fastened to the frame 1600 using a predetermined fastening member 4630.

As shown in FIG. 95, the connection frame 5000 may be supported by the second vertical part 4802 of the auxiliary bracket 4800. The connection frame 5000 may include a hole 4811 corresponding to the first vertical part 4801 of the auxiliary bracket 4800.

Figure 96:
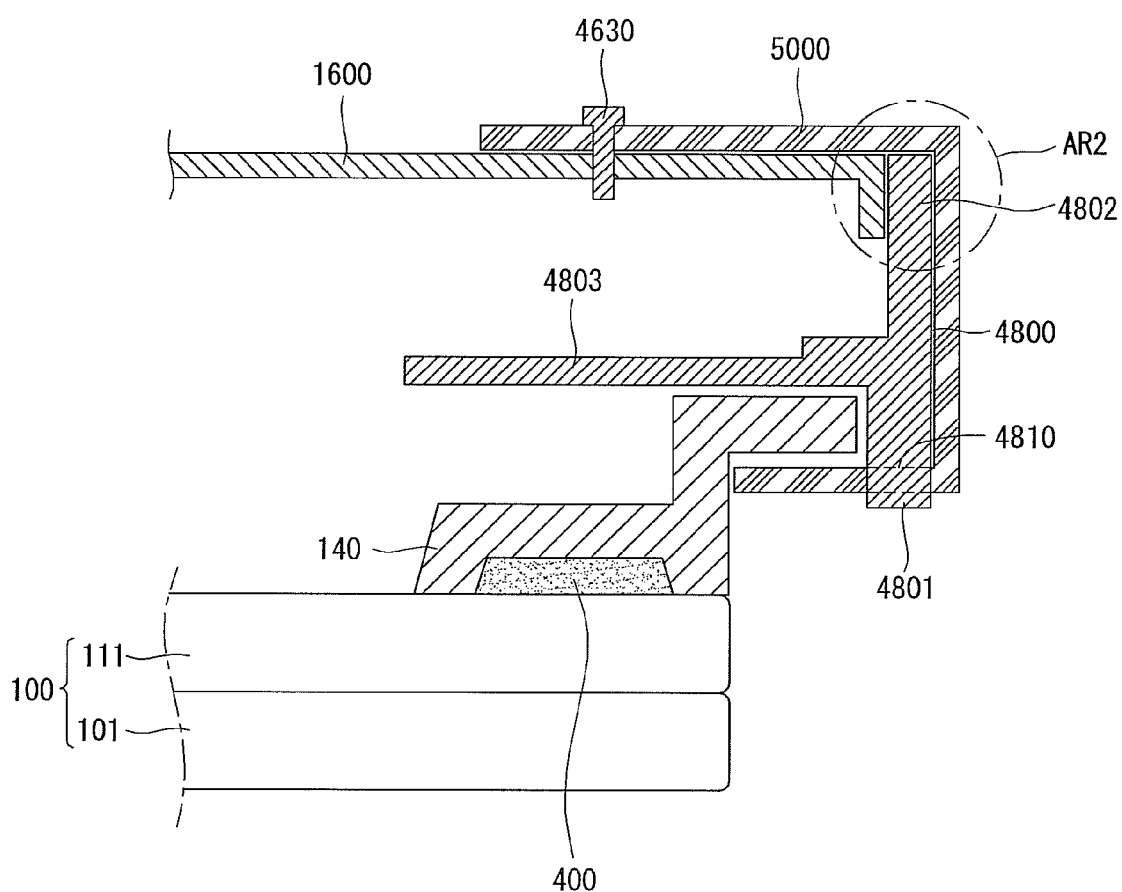

The auxiliary bracket 4800 may include a portion between the frame 1600 and the connection frame 5000 as indicated by a circle AR2 shown in FIG. 96. In this instance, although the auxiliary bracket 4800 is not fastened to the frame 1600 or is not fastened to the connection frame 5000, the auxiliary bracket 4800, the frame 1600, and the connection frame 5000 may be firmly connected to one another.

Alternatively, even when the connection frame 5000 is used, the auxiliary bracket 4800 may be omitted.

Figure 97:
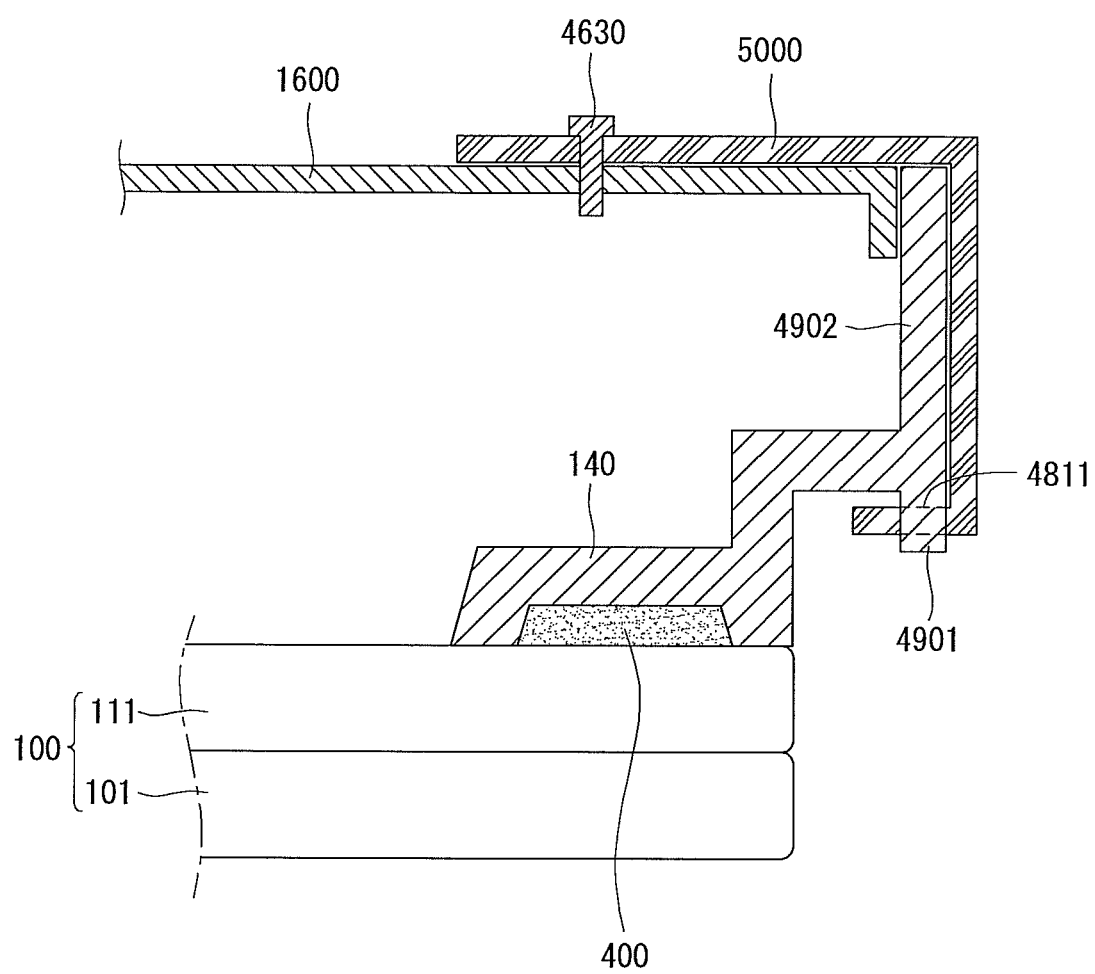

For example, as shown in FIG. 97, the connection frame 5000 may be supported by the 11th vertical part 4902 of the bracket 140. The connection frame 5000 may include a hole 4811 corresponding to the 10th vertical part 4901 of the bracket 140. The bracket 140 may include a portion between the frame 1600 and the connection frame 5000.

In this instance, although the bracket 140 is not fastened to the frame 1600 or is not fastened to the connection frame 5000, the bracket 140, the frame 1600, and the connection frame 5000 may be firmly connected to one another. The connection frame 5000 may include a portion contacting the bracket 140.

An auxiliary frame 5100 may be disposed between the frame 1600 and the optical layer 110. The auxiliary frame 5100 may be fastened to the frame 1600.

As above, when the auxiliary frame 5100 is disposed between the frame 1600 and the optical layer 110, the edge type light sources belonging to the edge type backlight unit may be disposed on the auxiliary frame 5100.

Figure 98:
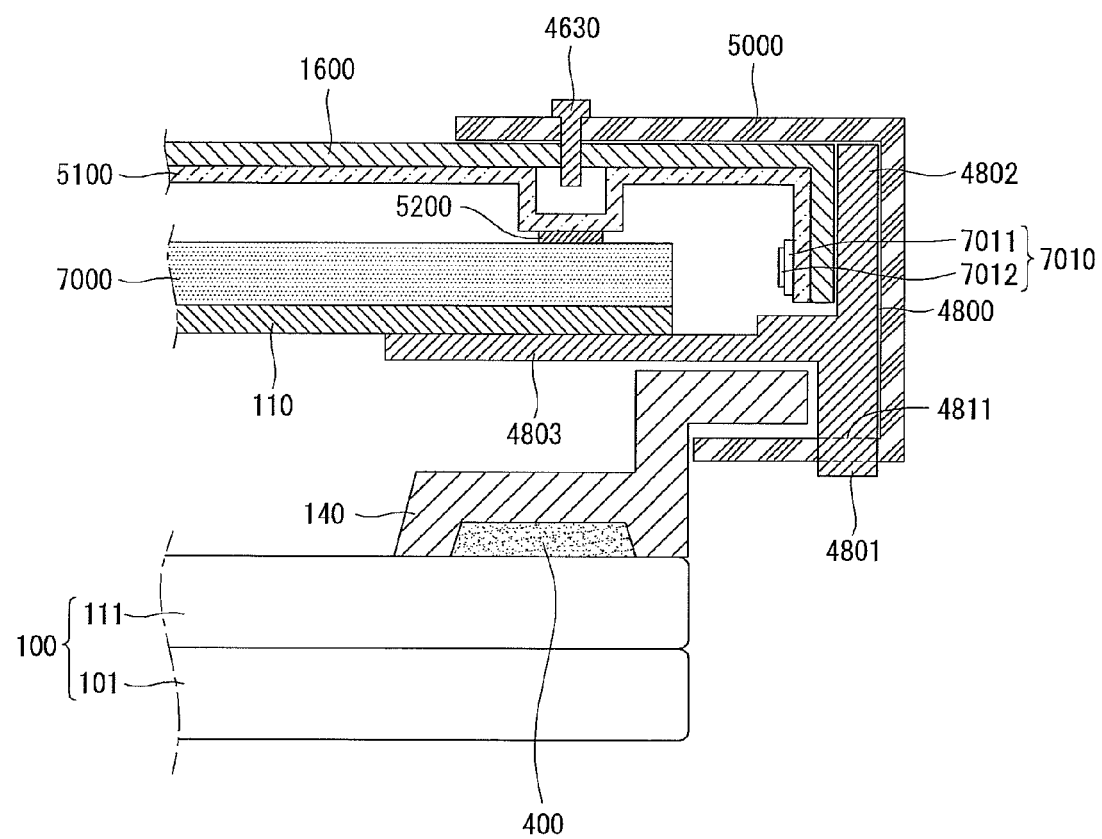

For example, as shown in FIG. 98, an edge type backlight unit 7010 including a substrate 7011 and a light source 7012, for example, LEDs positioned on the substrate 7011 may be disposed on the auxiliary frame 5100.

As above, when the edge type backlight unit 7010 is disposed on the auxiliary frame 5100, a light guide plate 7000 may be disposed between the optical layer 110 and the auxiliary frame 5100.

Further, a buffer 5200 may be disposed between the light guide plate 7000 and the auxiliary frame 5100. The buffer 5200 may have the elasticity. The buffer 5200 may prevent a collision between the light guide plate 7000 and the auxiliary frame 5100 and thus may prevent a damage of the light guide plate 7000.

Figure 99:
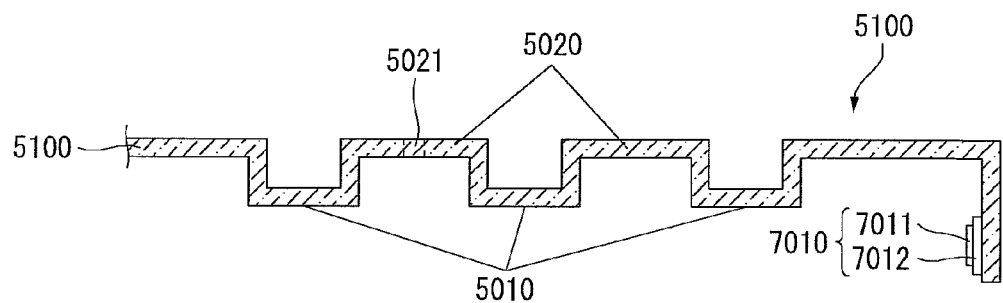

As shown in FIG. 99, the auxiliary frame 5100 may include a plurality of protrusions 5010 protruding to the display panel 100. A depression 5020 may be provided between the two protrusions 5010. At least one depression 5020 may have a fastening hole 5021 through which a fastening member such as a screw can pass. A plurality of fastening members may be used to connect the auxiliary frame 5100 to the frame 1600.

Figure 100:
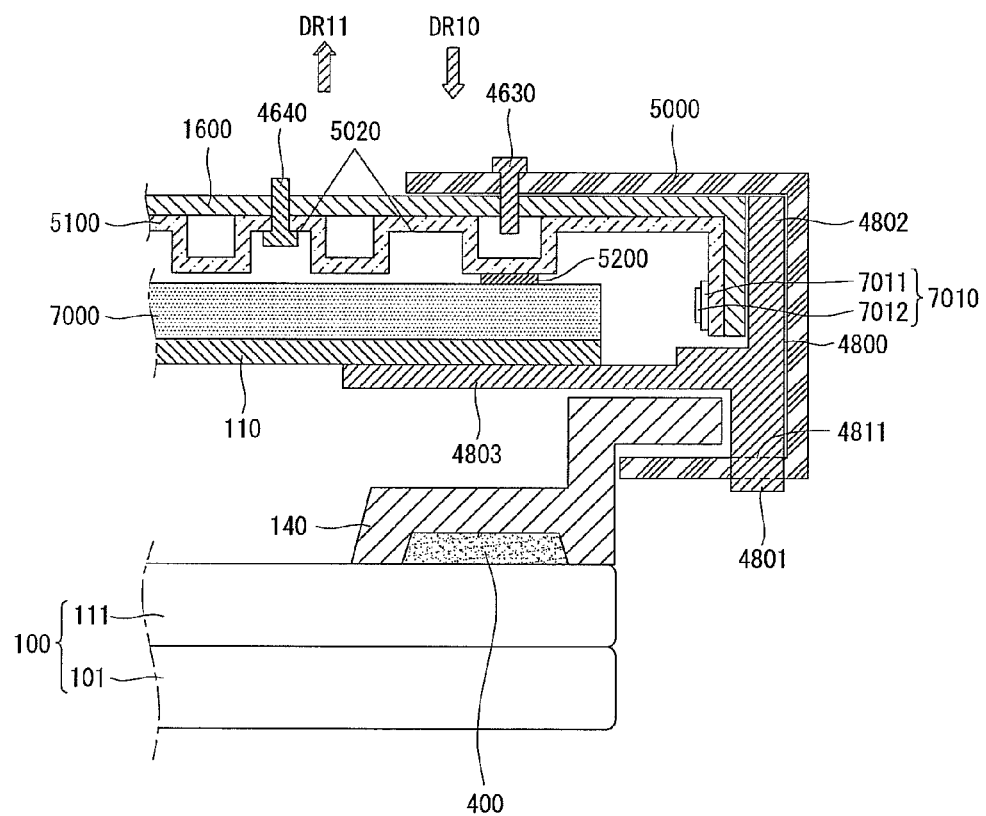

For example, as shown in FIG. 100, at least one of the plurality of fastening members may fasten the frame 1600 to the auxiliary frame 5100 in the direction (i.e., 10th direction DR10) from the frame 1600 toward the auxiliary frame 5100. At least one of the other fastening members may fasten the frame 1600 to the auxiliary frame 5100 in the direction (i.e., 11th direction DR11) from auxiliary frame 5100 toward the frame 1600.

In the embodiment disclosed herein, the fastening member for fastening the frame 1600 to the auxiliary frame 5100 in the 11th direction DR11 is referred to as a first fastening member 4640, and the fastening member for fastening the frame 1600 to the auxiliary frame 5100 in the 10th direction DR10 is referred to as a second fastening member 4630.

The first fastening member 4640 may pass through the depression 5020 of the auxiliary frame 5100. For example, the first fastening member 4640 may pass through the fastening hole 5021 of the depression 5020 of the auxiliary frame 5100. Hence, a portion of the first fastening member 4640 may be positioned between the two protrusions 5010.

The second fastening member 4630 may be disposed at a location overlapping the protrusion 5010 of the auxiliary frame 5100.

The buffer 5200 between the light guide plate 7000 and the auxiliary frame 5100 may be disposed between the light guide plate 7000 and the protrusion 5010 of the auxiliary frame 5100. Namely, the buffer 5200 may overlap the protrusion 5010 in the direction crossing the display panel 100.

In the structure illustrated in FIG. 100, the display device may include the side cover 4400 and the back cover 130.

Figure 101:
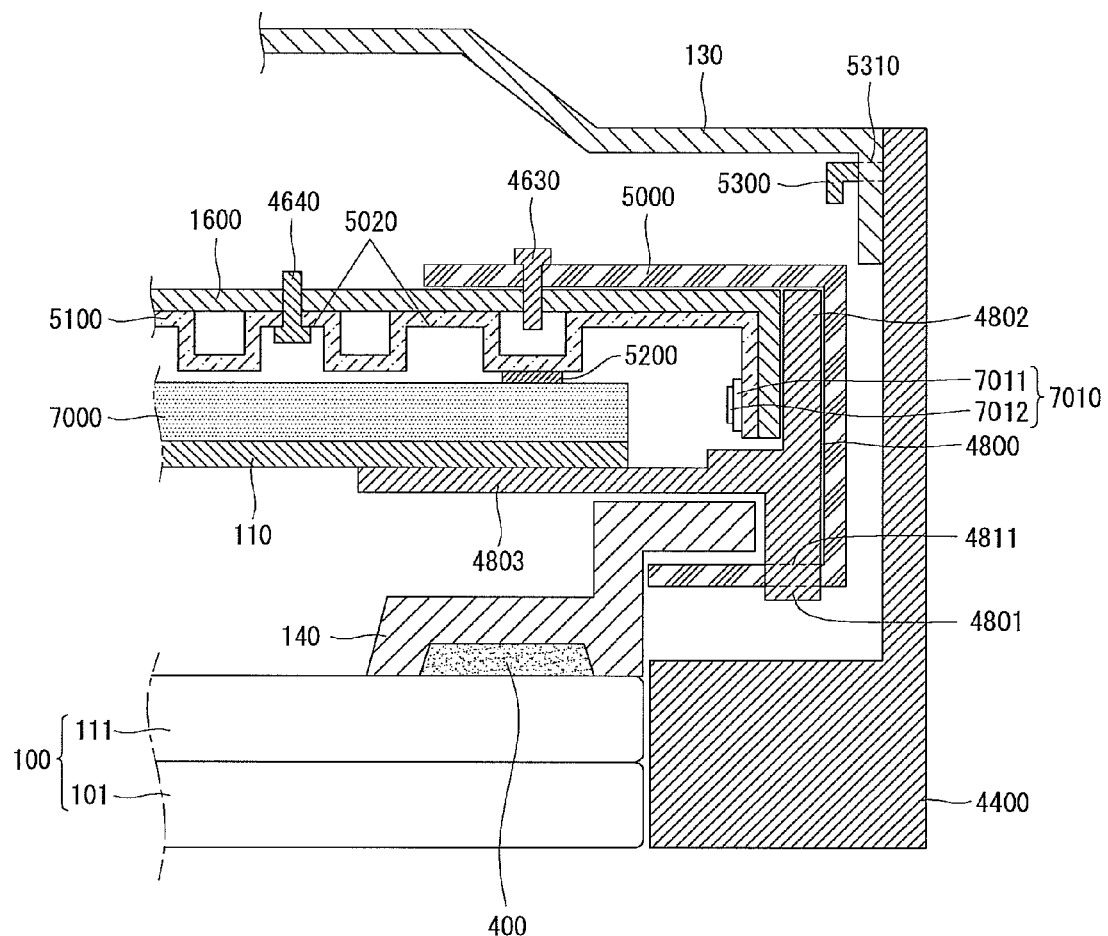

For example, as shown in FIG. 101, the side cover 4400 may include a portion positioned on the side of the display panel 100. The side cover 4400 may be connected to the back cover 130.

The side cover 4400 may include a hook 5300, and the back cover 130 may include a hole 5310 corresponding to the hook 5300. The hook 5300 of the side cover 4400 may be inserted into the hole 5310 of the back cover 130. Hence, the side cover 4400 may be connected to the back cover 130.

A front panel 101 and a rear panel 111 are attached to each other and a plurality of liquid crystals are provided in a gap between the first and rear panels. A plurality of first brackets 140 adhere to the rear panel by an adhesive 400. The first bracket has a first surface where the adhesive is applied. Further, the first bracket has a first protrusion extending in a first direction from a second surface and a second protrusion extending in a second direction from the first protrusion. The first and second surfaces are opposite surfaces.

At least one second bracket or auxiliary bracket 4800 is provided adjacent to the plurality of the first brackets. The second bracket has a first ledge and a second ledge extending in the second direction, and the first ledge is provided over the second protrusion of the first bracket. At least one connection bracket or frame 5000 has a side wall extending in a third direction and a portion extending from the side wall in the second direction to be parallel and adjacent to the second protrusion of the first bracket. The first, second and third directions are perpendicular to each other.

A frame 1600 is in contact with the second bracket. A light source has at least an optical sheet 110, a light guide 7000 and a plurality of light emitting diodes (LEDs) 7010. The light source is provided between the frame and the second bracket.

Figure 102:
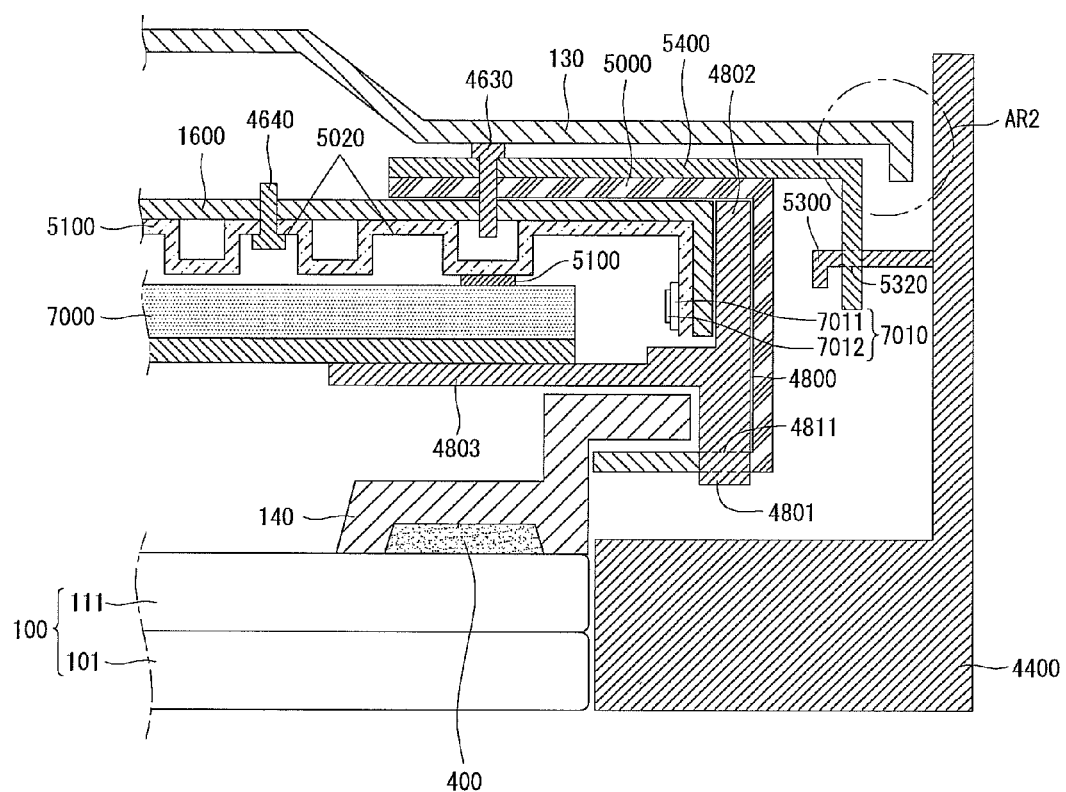

Alternatively, as shown in FIG. 102, the display device may further include a connection cover 5400 disposed between the frame 1600 and the back cover 130. The connection cover 5400 may connect the side cover 4400 to the frame 1600.

The connection cover 5400 may be fastened to the frame 1600. For example, a second fastening member 4630 may fasten the connection cover 5400, the frame 1600, and the auxiliary frame 5100 to one another.

In this instance, the side cover 4400 may include a hook 5300, and the connection cover 5400 may include a hole 5320 corresponding to the hook 5300. The hook 5300 of the side cover 4400 may be inserted into the hole 5320 of the connection cover 5400. Hence, the side cover 4400 may be connected to the connection cover 5400. As a result, the side cover 4400 may be connected to the frame 1600.

The back cover 130 may include a portion between the side cover 4400 and the connection cover 5400. Preferably, an end of the back cover 130 may be positioned between the side cover 4400 and the connection cover 5400 as indicated by a circle AR2 shown in FIG. 102.

Figure 103:
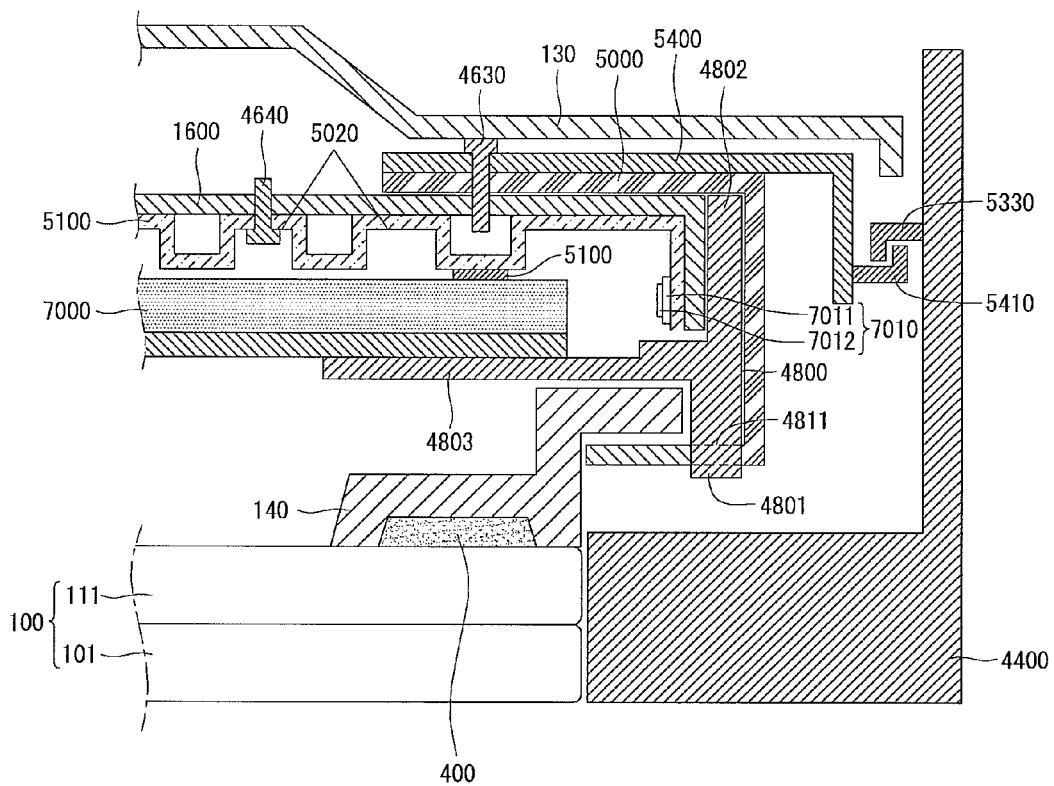

Alternatively, as shown in FIG. 103, the end of the back cover 130 may be positioned between the side cover 4400 and the connection cover 5400 in a state where the end of the back cover 130 rolls. In this instance, the side cover 4400 may be firmly connected to the back cover 130. Further, the side cover 4400 may be firmly connected to the back cover 130 without using a fastening member such as a screw.

Further, the end of the back cover 130 may roll in the direction toward the middle of the display panel 100, so as to prevent a foreign material from being penetrated into the display panel 100, improve the work efficiency, and provide the attractive appearance of the display panel 100.

Figure 104:
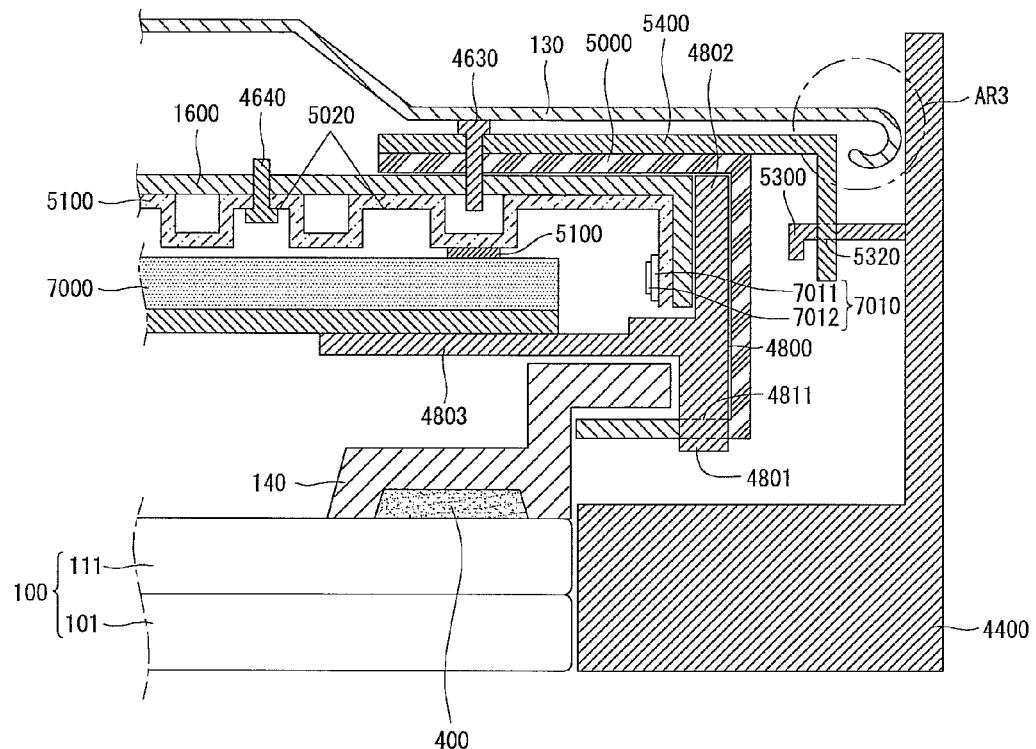

Alternatively, as shown in FIG. 104, the connection cover 5400 may include a first hook 5410 protruding to the side cover 4400, and the side cover 4400 may include a second hook 5330 protruding to the connection cover 5400. When the first hook 5410 is interlocked with the second hook 5330, the side cover 4400 may be connected to the connection cover 5400. Hence, the side cover 4400 may be connected to the frame 1600.

Figure 105:
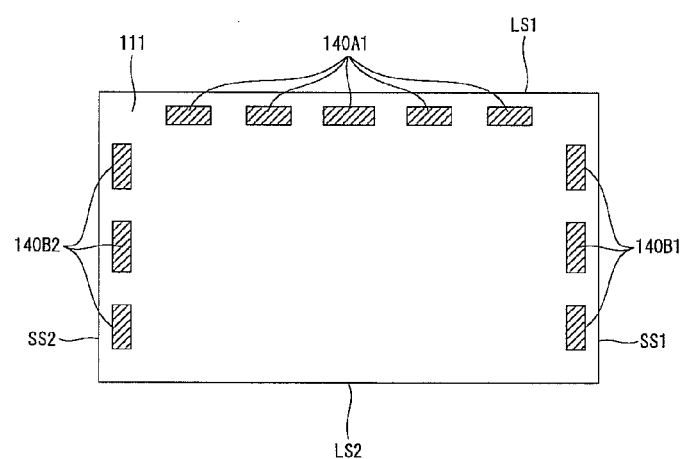

The bracket 140 may be divided into a plurality of sub-brackets. For example, as shown in FIG. 105, the transverse bracket 140A1 positioned in the first area LS1 of the back substrate 111 may be divided into a plurality of sub-brackets, the first longitudinal bracket 140B1 positioned in the third area SS1 of the back substrate 111 may be divided into a plurality of sub-brackets, and the second longitudinal bracket 140B2 positioned in the fourth area SS2 of the back substrate 111 may be divided into a plurality of sub-brackets.

In other words, the plurality of transverse brackets 140A1 in the first area LS1 of the display panel 100 may be positioned parallel to one another in a first direction, for example, in a direction parallel to the long side LS of the display panel 100. Further, the plurality of first longitudinal brackets 140B1 in the third area SS1 of the display panel 100 may be positioned parallel to one another in a second direction crossing the first direction, for example, in a direction parallel to the short side SS of the display panel 100. The plurality of second longitudinal brackets 140B2 in the fourth area SS2 of the display panel 100 may be positioned parallel to one another in the second direction.

As above, when the bracket 140 is divided into the plurality of sub-brackets, a deformation amount of the back cover 130 may be distributed into the plurality of sub-brackets even if the back cover 130 is deformed. Hence, the light leakage phenomenon may be further reduced.

Figure 106:
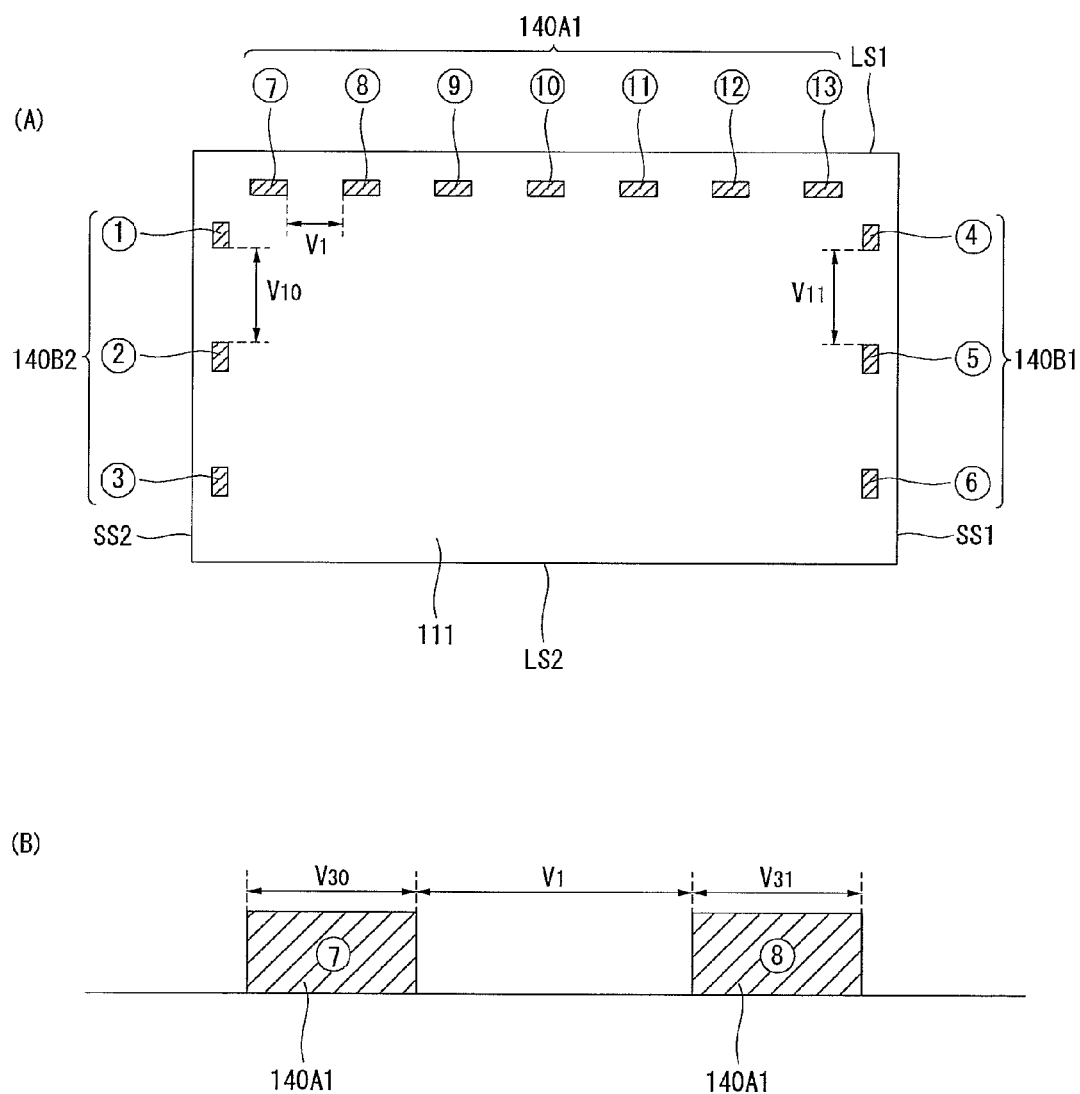

As shown in FIG. 106(A), it is assumed that the transverse bracket 140A1 positioned in the first area of the display panel 100, for example, the first area of the back substrate 111 (i.e., the first long side LS1 of the back substrate 111) is divided into a total of seven transverse brackets ⑦, ⑧, ⑨, ⑩, ⑪, ⑫, and ⑬; the first longitudinal bracket 140B1 positioned in the third area of the display panel 100, for example, the third area of the back substrate 111 (i.e., the first short side SS1 of the back substrate 111) is divided into a total of three longitudinal brackets ①, ②, and ③; and the second longitudinal bracket 140B2 positioned in the fourth area of the display panel 100, for example, the fourth area of the back substrate 111 (i.e., the second short side SS2 of the back substrate 111) is divided into a total of three longitudinal brackets ④, ⑤, and ⑥.

A distance between the adjacent transverse brackets 140A1 may be different from distances between the adjacent longitudinal brackets 140B1 and 140B2. Preferably, the distance between the adjacent transverse brackets 140A1 may be less than the distances between the adjacent longitudinal brackets 140B1 and 140B2. For example, a distance V1 between the first and second transverse brackets ⑦ and ⑧ may be less than a distance V11 between the 1-1 and 1-2 longitudinal brackets ④ and ⑤ and a distance V10 between the 2-1 and 2-2 longitudinal brackets ① and ②.

A reason why the distance between the adjacent transverse brackets 140A1 is less than the distances between the adjacent longitudinal brackets 140B1 and 140B2 is as follows.

The lengths of the first and second long sides LS1 and LS2 of the display panel 100 are longer than the lengths of the first and second short sides SS1 and SS2 of the display panel 100, and thus the pressure may be mainly applied to the first and second long sides LS1 and LS2 of the display panel 100. Considering this, it may be preferable that the transverse brackets 140A1 positioned on the first long side LS1, to which the relatively high pressure is applied, are positioned closer than the longitudinal brackets 140B1 and 140B2.

Further, the total number of transverse brackets ⑦, ⑧, ⑨, ⑩, ⑪, ⑫, and ⑬ positioned on the first long side LS1 of the display panel 100 may be more than a sum of the total number of first longitudinal brackets ①, ②, and ③ positioned on the first short side SS1 of the display panel 100 and the total number of second longitudinal brackets ④, ⑤, and ⑥ positioned on the second short side SS2 of the display panel 100.

A distance between the two adjacent brackets 140 may be greater than a width of the bracket 140.

For example, as shown in FIG. 106(b), it may be preferable that a distance V1 between the first and second transverse brackets ⑦ and ⑧ among the plurality of transverse brackets 140A1 is greater than a width V30 of the first transverse bracket ⑦ and a width V31 of the second transverse bracket ⑧.

Even when each of the transverse bracket 140A1 and the longitudinal brackets 140B1 and 140B2 of the bracket 140 is divided into the plurality of sub-brackets, the back cover 130 may be inserted into the sub-brackets in the sliding manner.

Figure 107:
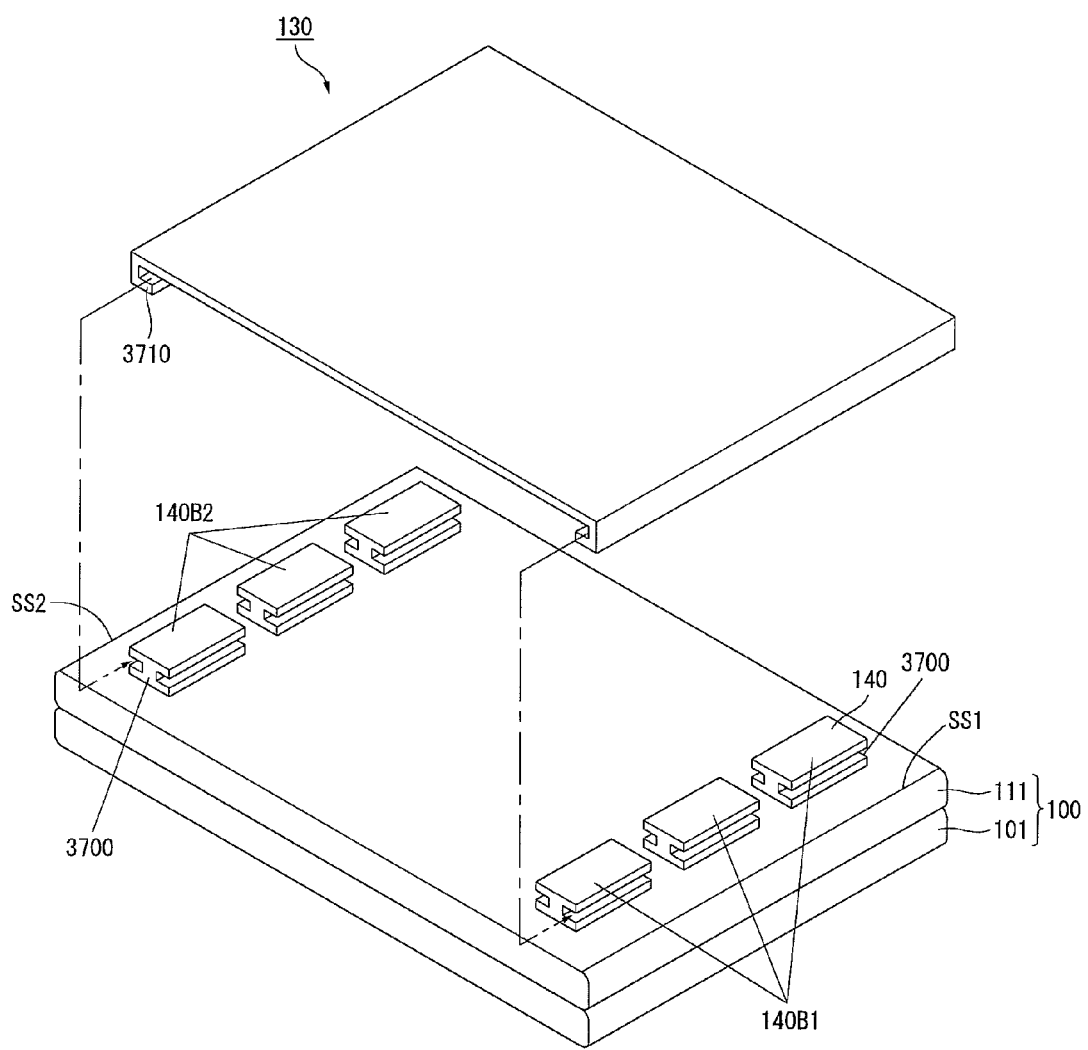

For example, as shown in FIG. 107, the back cover 130 may be connected to the brackets 140 by inserting the protrusions 3710 of the back cover 130 into the outer rails 3700 of the brackets 140 in the sliding manner. In other words, the back cover 130 may be connected to the brackets 140 in the sliding manner.

In this instance, at least one bracket 140 may be interlocked with the back cover 130. For example, at least one first longitudinal bracket 140B1 and at least one second longitudinal bracket 140B1 may be interlocked with the back cover 130.

Further, even when each of the transverse bracket 140A1 and the longitudinal brackets 140B1 and 140B2 of the bracket 140 is divided into the plurality of sub-brackets, the optical layer 110 may be inserted into the sub-brackets in the sliding manner.

Figure 108:
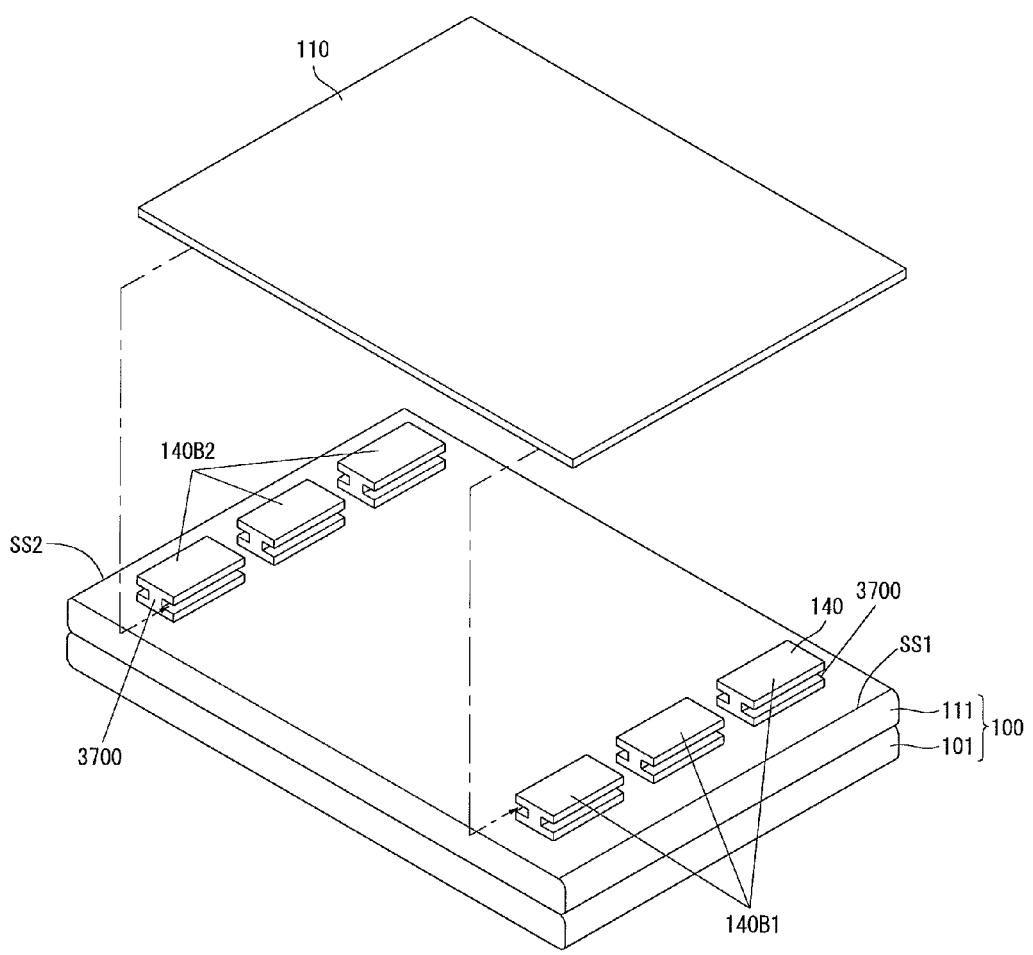

For example, as shown in FIG. 108, the optical layer 110 may be connected to the brackets 140 by inserting the optical layer 110 into the inner rails 3740 of the brackets 140 in the sliding manner. In other words, the optical layer 110 may be connected to the brackets 140 in the sliding manner.

Figure 109:
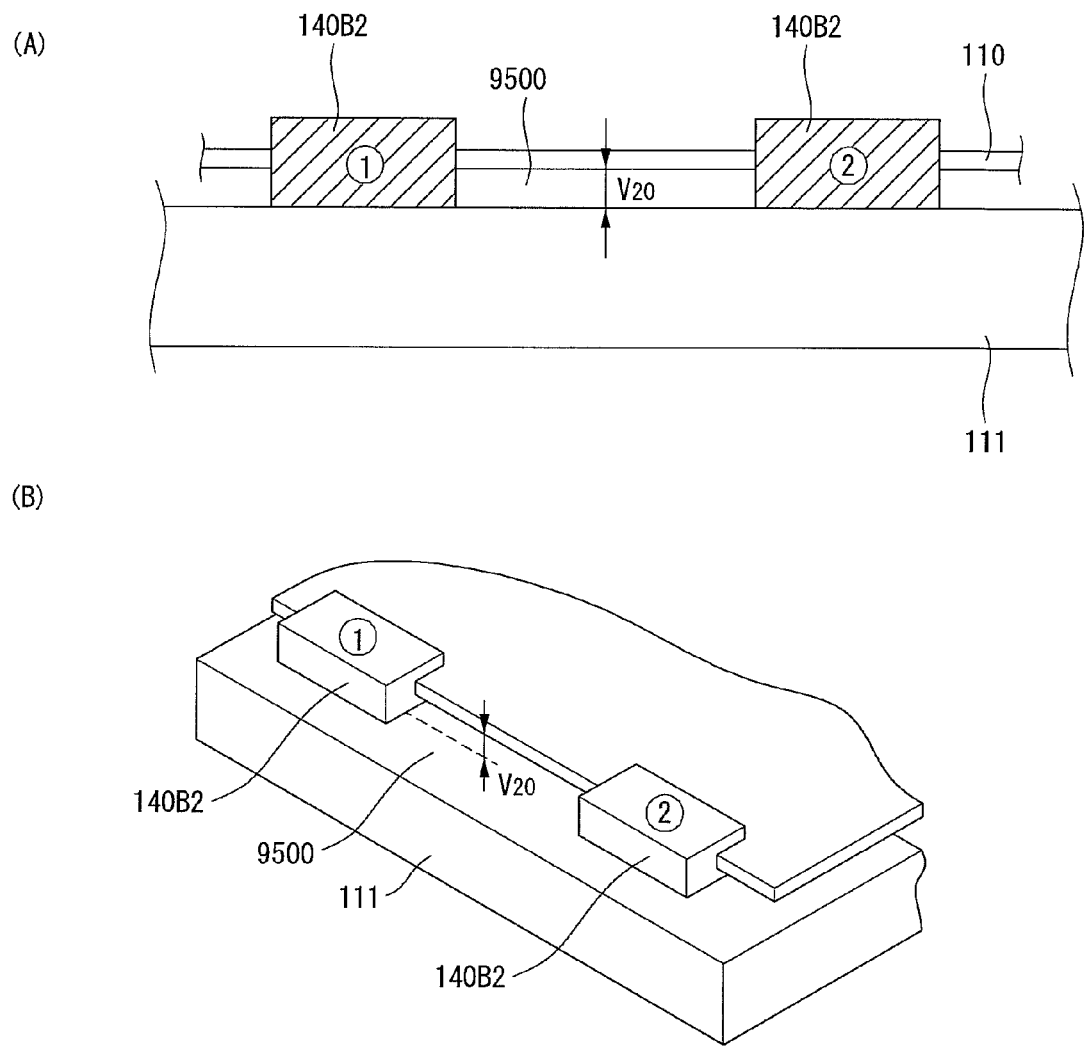

As above, when the optical layer 110 is inserted into the bracket 140, in which each of the transverse bracket 140A1 and the longitudinal brackets 140B1 and 140B2 of the bracket 140 is divided into the plurality of sub-brackets, a air gap 9500 may be formed between the optical layer 110 and the back substrate 111 in an area between the two adjacent brackets 140 as shown in FIG. 109. A height V20 of the air gap 9500 may be less than the height of the bracket 140.

Considering that each of the transverse bracket 140A1 and the longitudinal brackets 140B1 and 140B2 of the bracket 140 is divided into the plurality of sub-brackets and the frame 1600 is interlocked with the brackets 140, at least one of the plurality of brackets 140 may be interlocked with the frame 1600. For example, at least one of the plurality of transverse brackets 140A1 may be interlocked with the frame 1600, at least one of the plurality of first longitudinal brackets 140B1 may be interlocked with the frame 1600, or at least one of the plurality of second longitudinal brackets 140B2 may be interlocked with the frame 1600.

The shape of at least one of the plurality of brackets 140 may be different from the shapes of the other brackets 140, so as to further reduce the light leakage phenomenon.

Figure 110:
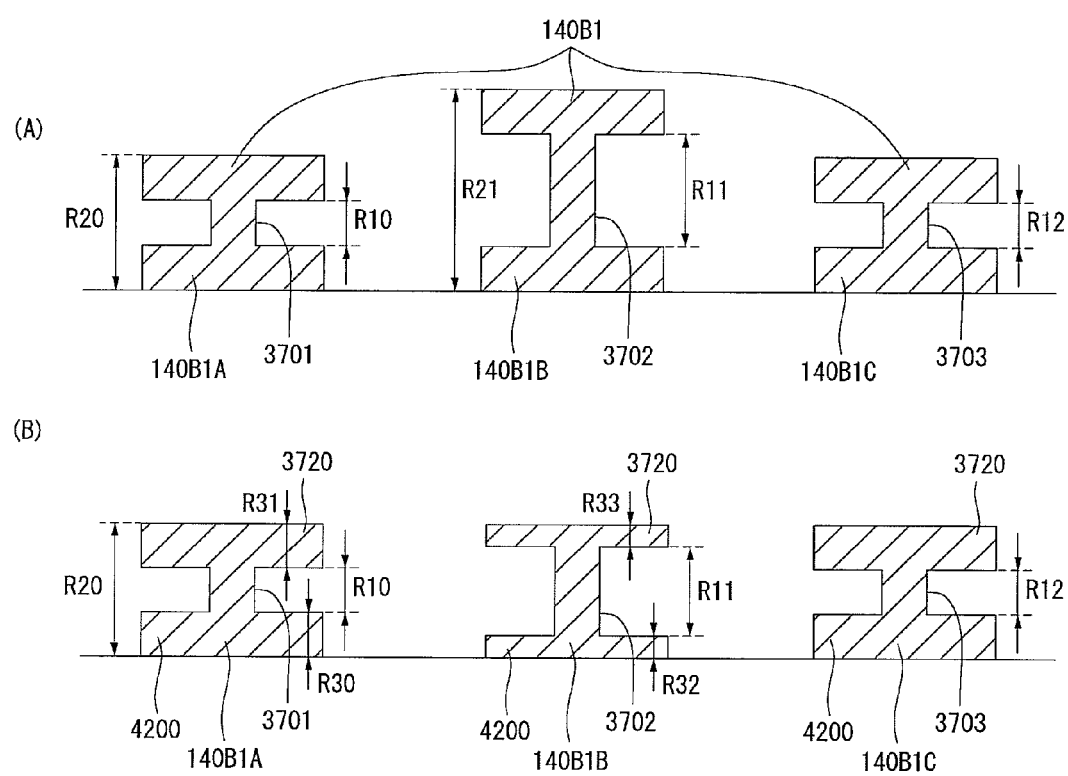

For example, as shown in FIG. 110(A), when the first longitudinal bracket 140B1 is divided into the plurality of first longitudinal brackets, a width R11 of a groove 3702 of a 1-2 longitudinal bracket 140B1B may be greater than a width R10 of a groove 3701 of a 1-1 longitudinal bracket 140B1A and a width R12 of a groove 3703 of a 1-3 longitudinal bracket 140B1C.

In this instance, even if the pressure resulting from the deformation of the back cover 130 is transferred to the 1-1 longitudinal bracket 140B1A and the 1-3 longitudinal bracket 140B1C, the pressure is not transferred to the 1-2 longitudinal bracket 140B1B. Hence, the light leakage phenomenon may be reduced.

In this instance, a height R21 of the 1-2 longitudinal bracket 140B1B may be greater than a height R20 of each of the 1-1 longitudinal bracket 140B1A and the 1-3 longitudinal bracket 140B1C.

Alternatively, as shown in FIG. 110(B), the 1-1 longitudinal bracket 140B1A, the 1-2 longitudinal bracket 140B1B, and the 1-3 longitudinal bracket 140B1C may substantially have the same height R22. Further, a width R11 of a groove 3702 of the 1-2 longitudinal bracket 140B1B may be greater than a width R10 of a groove 3701 of the 1-1 longitudinal bracket 140B1A and a width R12 of a groove 3703 of the 1-3 longitudinal bracket 140B1C.

For this, widths R33 and R32 of protrusions 3720 and 4200 of the 1-2 longitudinal bracket 140B1B may be less than widths R30 and R31 of protrusions 3720 and 4200 of each of the 1-1 longitudinal bracket 140B1A and the 1-3 longitudinal bracket 140B1C.

A distance between the two adjacent brackets 140 may vary depending on their position on the display panel 100.

Figure 111:
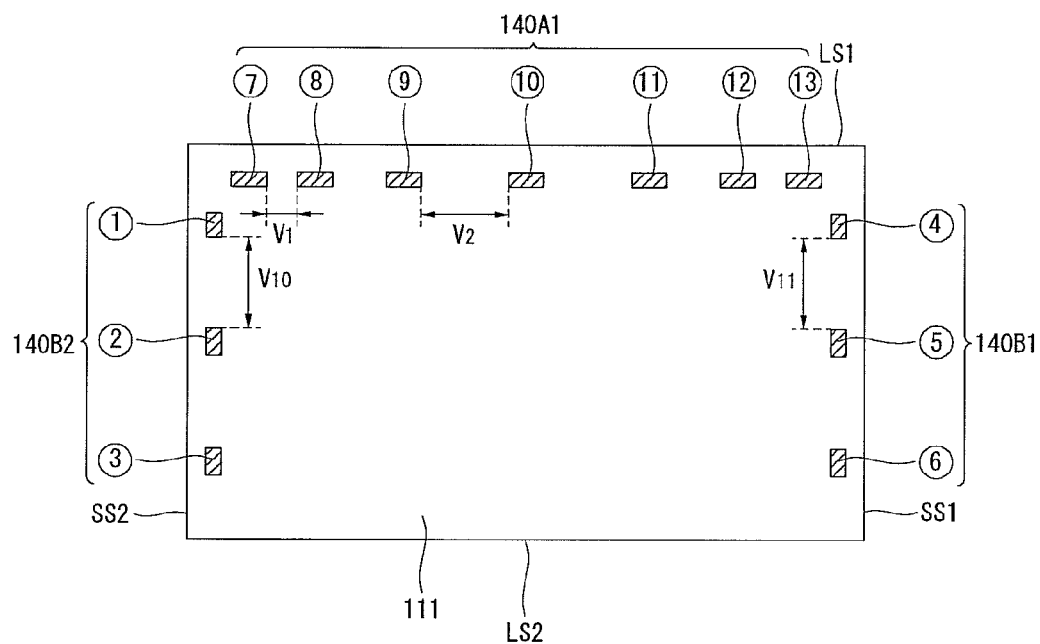

For example, as shown in FIG. 111, in the plurality of transverse brackets 140A1 (i.e., ⑦, ⑧, ⑨, ⑩, ⑪, ⑫, and ⑬) positioned on the first long side LS1 of the display panel 100, a distance V1 between the first and second transverse brackets ⑦ and ⑧ may be different from a distance V2 between the third and fourth transverse brackets ⑨ and ⑩. Preferably, the distance V1 between the first and second transverse brackets ⑦ and ⑧ may be less than the distance V2 between the third and fourth transverse brackets ⑨ and ⑩.

In other words, as the transverse brackets 140A1 on the first long side LS1 of the display panel 100 go from the middle to the outside of the first long side LS1, a distance between the two adjacent transverse brackets 140A1 may increase. In this instance, the structural stability of the display device may be improved.

A distance between the two adjacent brackets 140 in the corner of the display panel 100 may be set to be relatively small.

Figure 112:
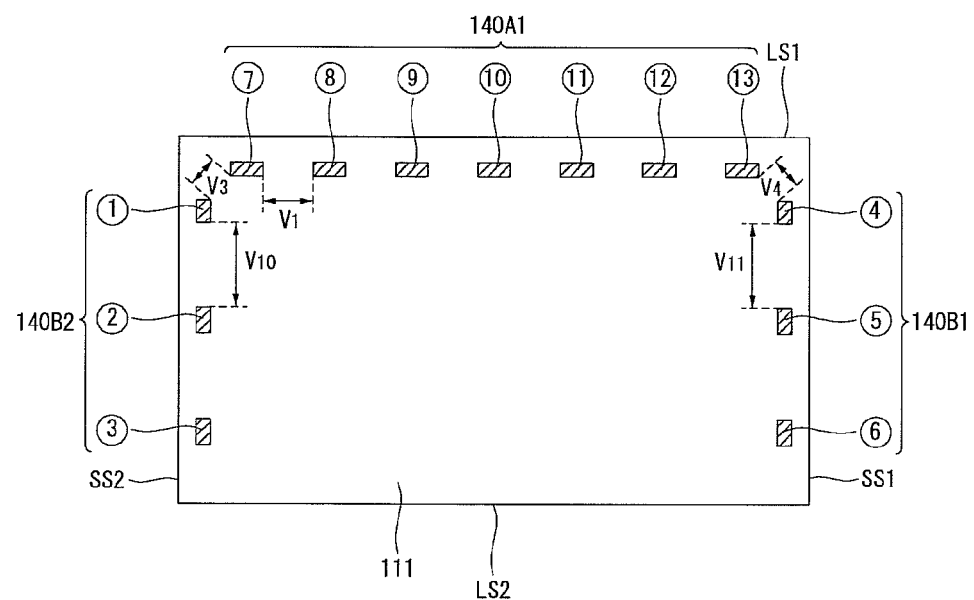

For example, as shown in FIG. 112, a shortest distance V4 between the transverse bracket 140A1 and the first longitudinal bracket 140B1 in a boundary between the first area LS1 and the third area SS1 of the display panel 100 may be less than a distance V11 (or V10) between the two adjacent longitudinal brackets 140B1 (or 140B2) and a distance V1 between the two adjacent transverse brackets 140A1. In other words, the distance V4 between the seventh transverse bracket ⑬ positioned in the first area LS1 of the display panel 100 and the 1-1 longitudinal bracket ④ positioned in the third area SS1 of the display panel 100 may be less than the distance V1 between the first and second transverse brackets ⑦ and ⑧ and the distance V10 between the 2-1 and 2-2 longitudinal brackets ① and ②.

Further, a shortest distance V3 between the transverse bracket 140A1 and the second longitudinal bracket 140B2 in a boundary between the first area LS1 and the fourth area SS2 of the display panel 100 may be less than the distance V11 (or V10) between the two adjacent longitudinal brackets 140B1 (or 140B2) and the distance V1 between the two adjacent transverse brackets 140A1. In other words, the distance V3 between the first transverse bracket ⑦ positioned in the first area LS1 of the display panel 100 and the 2-1 longitudinal bracket ① positioned in the fourth area SS2 of the display panel 100 may be less than the distance V1 between the first and second transverse brackets ① and ⑧ and the distance V10 between the 2-1 and 2-2 longitudinal brackets ① and ②.

In this instance, the structural stability of the display device may be further improved.

Figure 113:
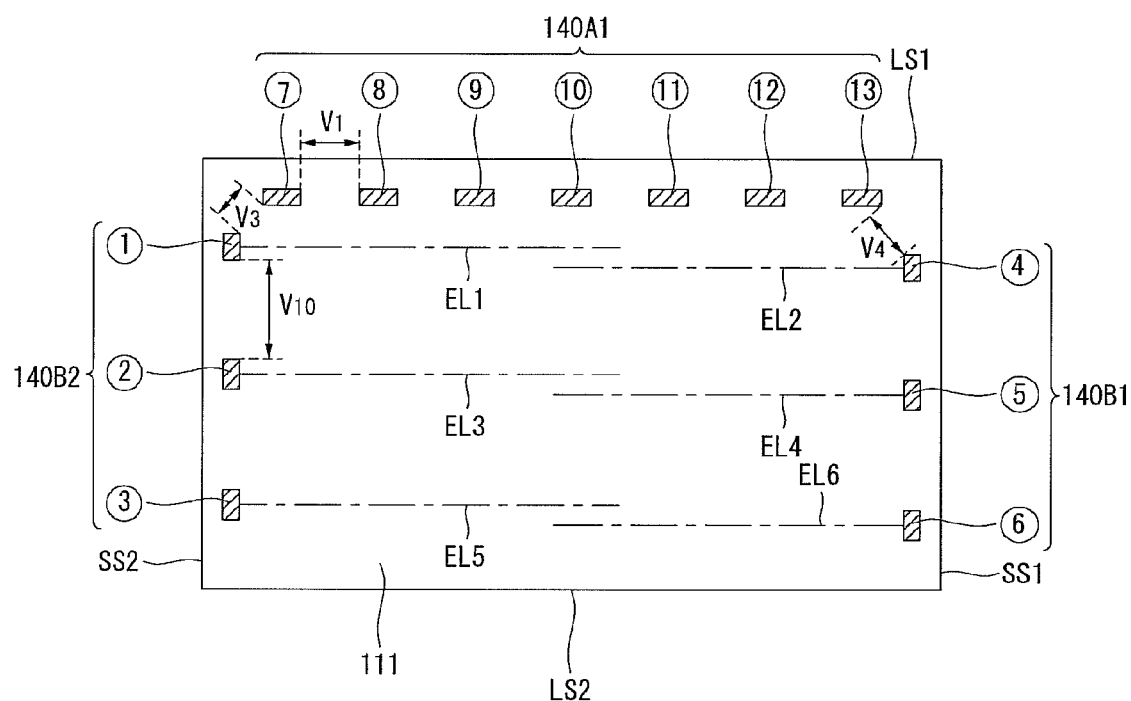

As shown in FIG. 113, the shortest distance V4 between the transverse bracket 140A1 and the first longitudinal bracket 140B1 in the boundary between the first area LS1 and the third area SS1 of the display panel 100 may be different from the shortest distance V3 between the transverse bracket 140A1 and the second longitudinal bracket 140B2 in the boundary between the first area LS1 and the fourth area SS2 of the display panel 100. For example, the shortest distance V4 may be greater than the shortest distance V3.

In this instance, the plurality of first longitudinal brackets 140B1 in the third area SS1 of the display panel 100 and the plurality of second longitudinal brackets 140B2 in the fourth area SS2 of the display panel 100 may be alternately disposed.

For example, a first straight line EL1, which passes through the 2-1 longitudinal bracket ① positioned in the fourth area SS2 of the display panel 100 and is vertical to the short side SS of the display panel 100, may not meet a second straight line EL2, which passes through the 1-1 longitudinal bracket ④ positioned in the third area SS1 of the display panel 100 and is vertical to the short side SS of the display panel 100. The first straight line EL1 and the second straight line EL2 may be separated from each other in a direction vertical to the long side LS of the display panel 100. In this instance, the 2-1 longitudinal bracket ① and the 1-1 longitudinal bracket ④ may be considered to be alternately disposed.

In other words, a distance between the 2-1 longitudinal bracket ① and the first long side LS1 of the display panel 100 may be less than a distance between the 1-1 longitudinal bracket ④ and the first long side LS1 of the display panel 100. Further, a distance between the 2-3 longitudinal bracket ③ and the second long side LS2 of the display panel 100 may be greater than a distance between the 1-3 longitudinal bracket ⑥ and the second long side LS2 of the display panel 100. Hence, the light leakage phenomenon may be further reduced.

The plurality of transverse brackets 140A1, the plurality of first longitudinal brackets 140B1, or the plurality of second longitudinal brackets 140B2 may be arranged in a zigzag pattern.

Figure 114:
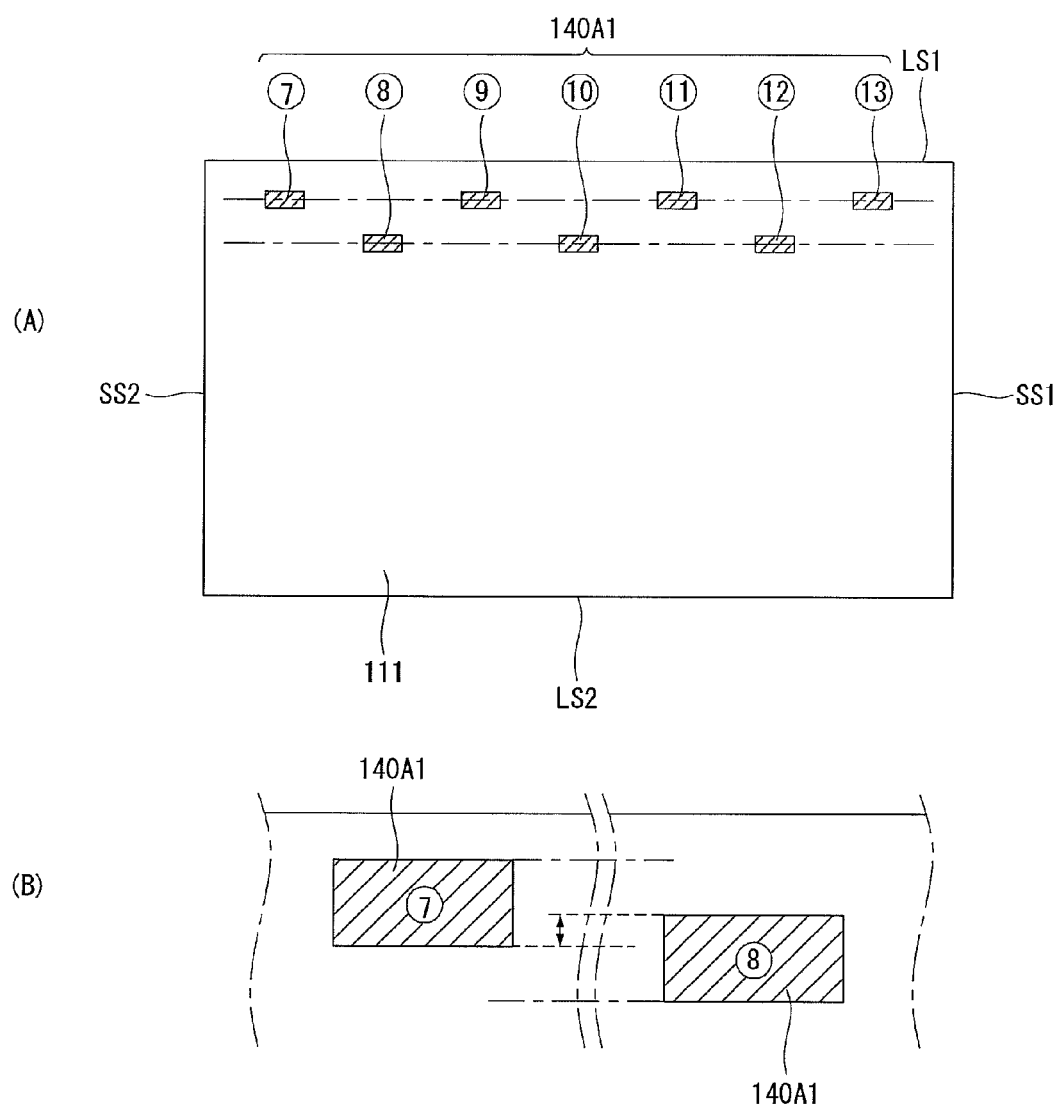

For example, as shown in FIG. 114(A), the plurality of transverse brackets 140A1 (i.e., ⑦, ⑧, ⑨, ⑩, ⑪, ⑫, and ⑬) positioned on the first long side LS1 of the display panel 100 may be arranged in the zigzag pattern.

More specifically, as shown in FIG. 114(B), the first and second transverse brackets ⑦ and ⑧ may partially overlap each other in a direction parallel to th+e long side LS of the display panel 100.

Figure 115:
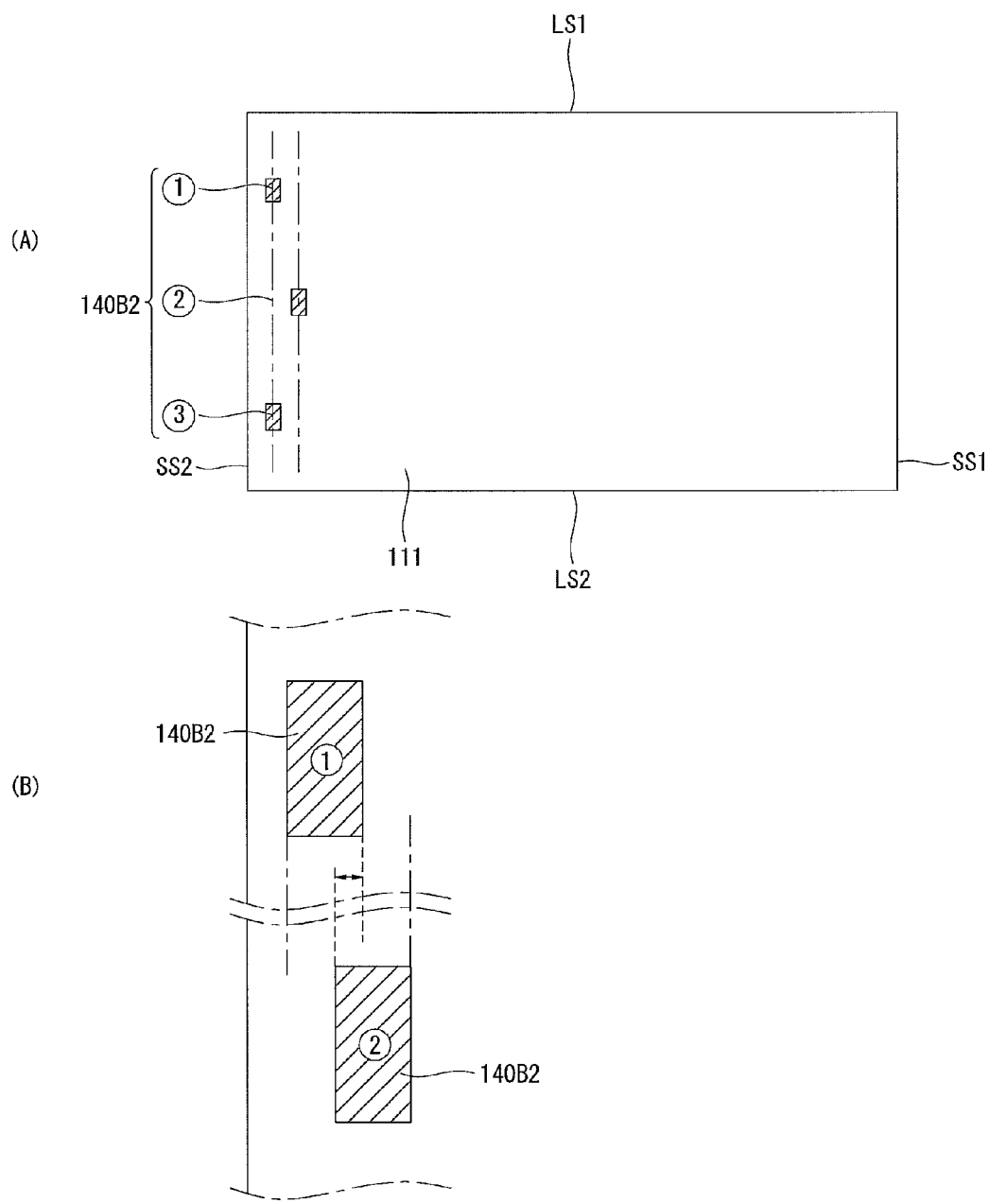

Alternatively, as shown in FIG. 115(A), the plurality of second longitudinal brackets 140B2 (i.e., ①, ②, and ③) positioned on the second short side SS2 of the display panel 100 may be arranged in the zigzag pattern.

More specifically, as shown in FIG. 115(B), the 2-1 and 2-2 longitudinal brackets ① and ② may partially overlap each other in a direction parallel to the short side SS of the display panel 100.

The shapes of the fixing brackets positioned on the back cover 130 may be variously changed. Further, at least one of the plurality of fixing brackets may be disposed in the corner of the back cover 130.

Figure 116:
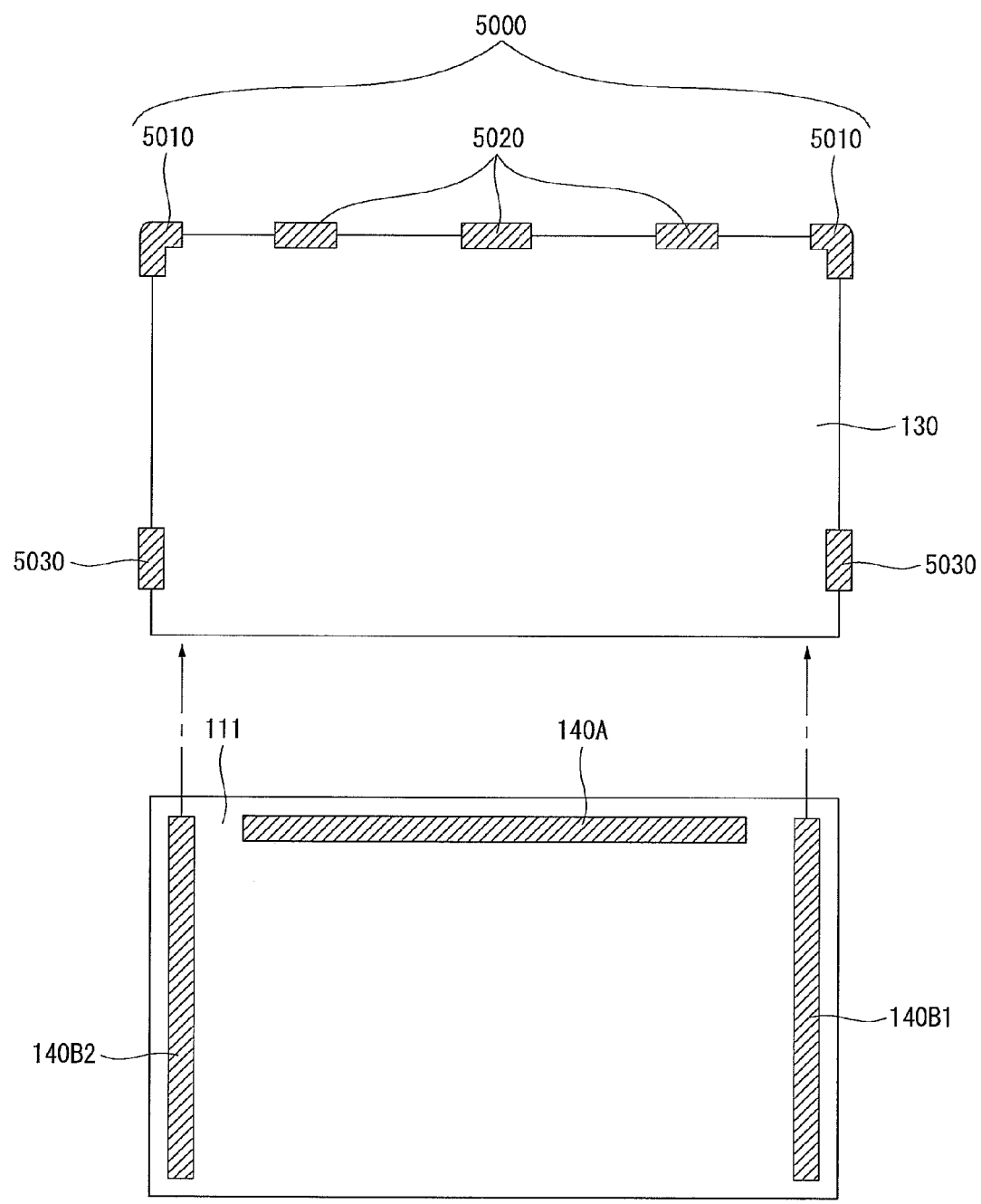

For example, as shown in FIG. 116, a fixing bracket 5000 positioned on the back cover 130 may be divided into a plurality of fixing sub-brackets 5010, 5020, and 5030. Further, at least one of the plurality of fixing sub-brackets 5010, 5020, and 5030 may be disposed in the corner of the back cover 130.

In the following description, the fixing sub-bracket 5010 disposed in the corner of the back cover 130 is referred to as a corner fixing bracket 5010, and the other fixing sub-brackets 5020 and 5030 are referred to as a general fixing brackets 5020 and 5030.

Figure 117:
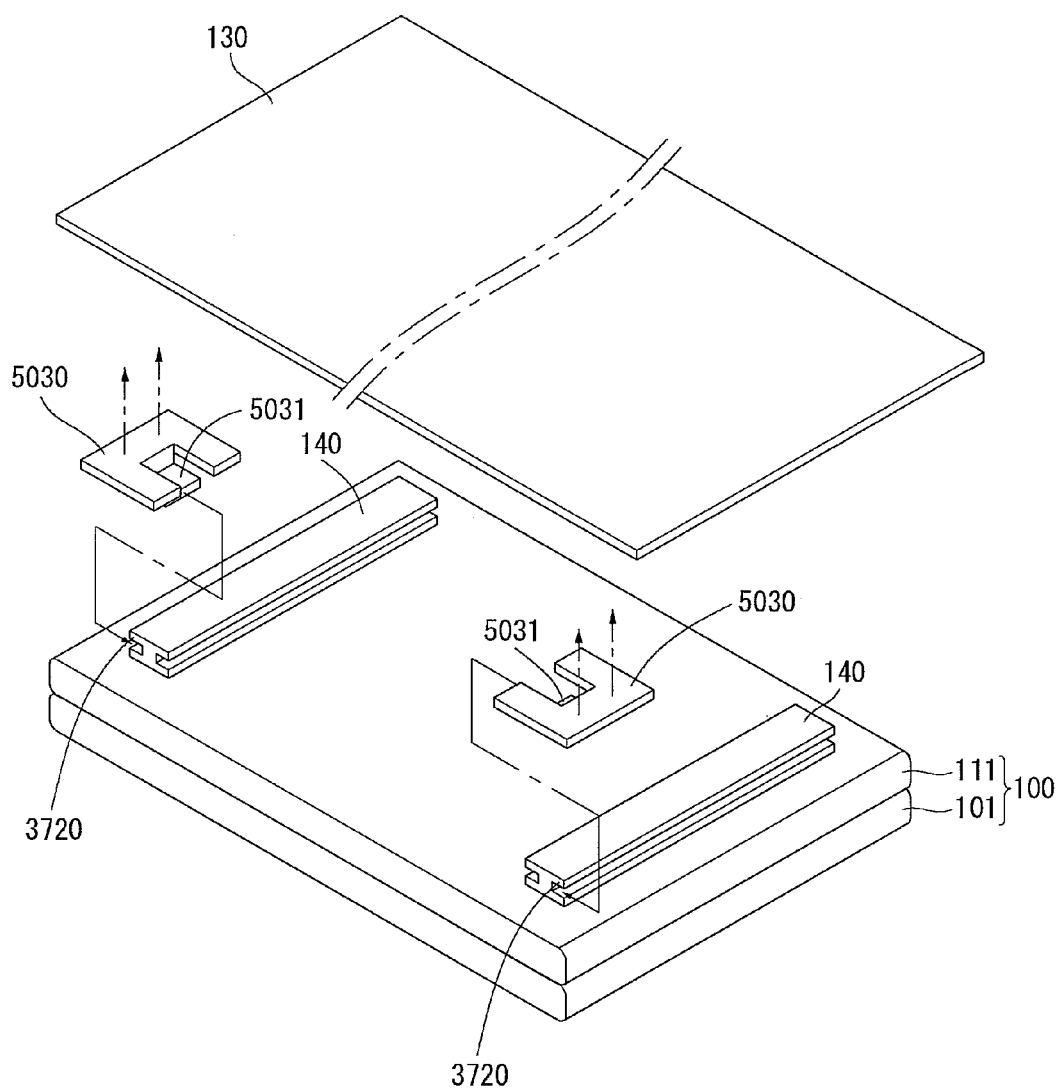

As shown in FIG. 117, each of the general fixing brackets 5020 and 5030 may include a protrusion 5031 protruding to the middle of the back cover 130. The protrusion 5031 may be formed by cutting and processing a portion of each of the general fixing brackets 5020 and 5030.

In this instance, the general fixing brackets 5020 and 5030 attached to the back cover 130 may be connected to the bracket 140 attached to the back substrate 111 in the sliding manner.

The protrusions 5031 of the general fixing brackets 5020 and 5030 may have a hook shape. Thus, the protrusion 5031 may be referred to as a hook.

Figure 118:
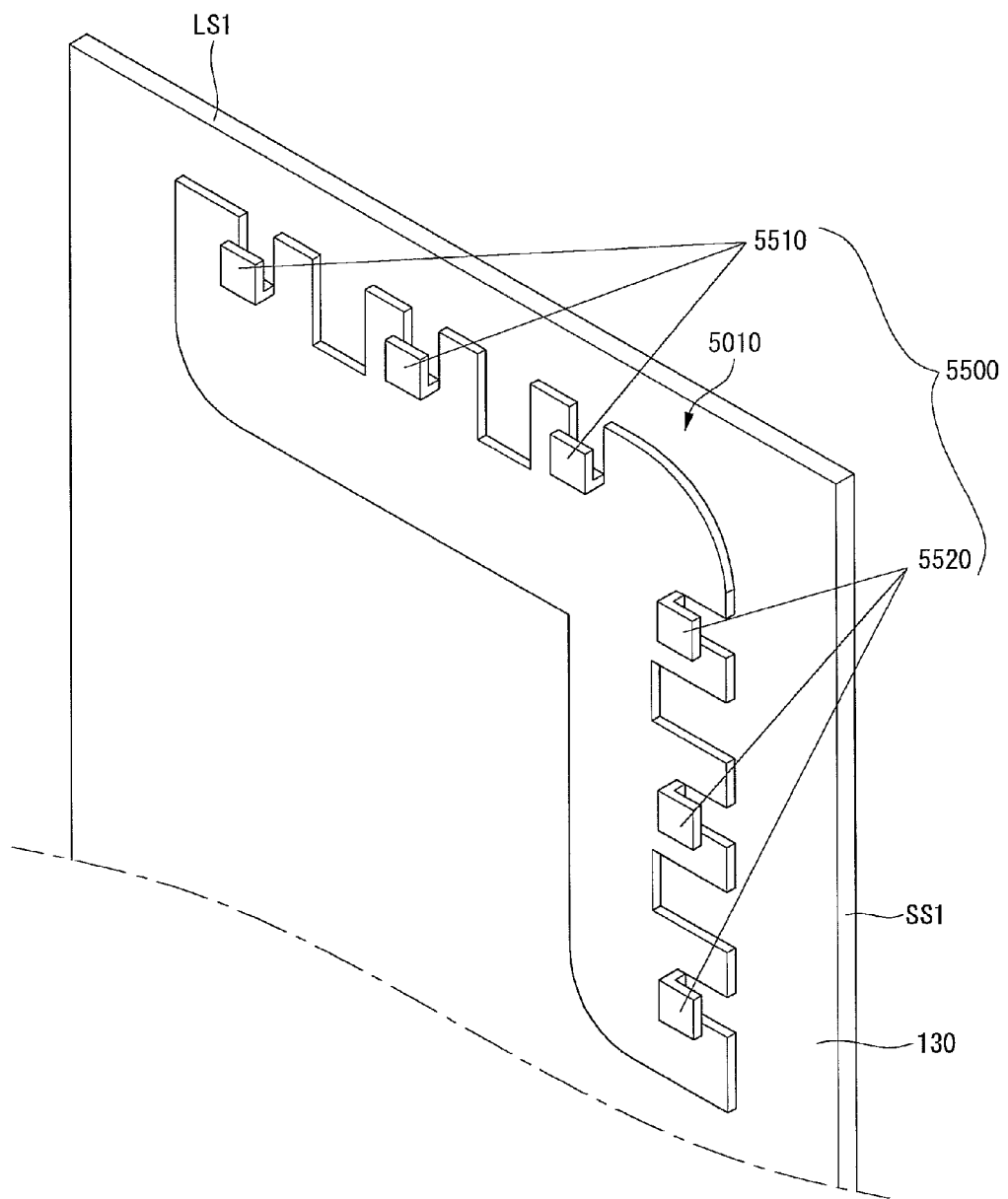

As shown in FIG. 118, the corner fixing bracket 5010 may include longitudinal protrusions 5510 protruding to the first long side LS1 of the back cover 130 and transverse protrusions 5520 protruding to the first short side SS1 (or the second short side SS2) of the back cover 130. The longitudinal protrusion 5510 and the transverse protrusion 5520 of the corner fixing bracket 5010 may have a hook shape. Thus, the protrusions 5510 and 5520 may be referred to as a hook. For example, the longitudinal protrusion 5510 may be referred to as a longitudinal hook, and the transverse protrusion 5520 may be referred to as a transverse hook.

In this instance, in the bracket 140 attached to the back substrate 111, the first bracket 140A1 positioned on the first long side LS1 of the back substrate 111 may be connected to the longitudinal hook 5510, and the third bracket 140B1 positioned on the first short side SS1 of the back substrate 111 may be connected to the transverse hook 5520.

A length of at least one of the plurality of hooks may be different from a length of at least one of the other hooks, so as to further reduce the light leakage phenomenon.

For example, as shown in FIG. 119, a length of a second longitudinal hook 5510B of the plurality of longitudinal hooks 5510 may be less than lengths of first and third longitudinal hooks 5510A and 5510C. Further, a length of a second transverse hook 5520B of the plurality of transverse hooks 5520 may be less than lengths of first and third transverse hooks 5520A and 5520C. In this instance, a stress applied from the outside may be prevented from being transferred to the display panel 100, and thus the light leakage phenomenon may be further reduced.

FIGS. 120 to 128 illustrate another configuration of a display device according to an example embodiment of the invention. In the following description, the descriptions of the configuration and the structure described above are omitted. Further, in the following description, a broadcasting signal receiver is used as an electronic equipment to which the display device according to the embodiment of the invention is applied. The display device according to the embodiment of the invention may be applied to other electronic equipments such as a cellular phone.

In the following description, a display unit 180Q may correspond to the display device shown in FIGS. 1 to 119. Thus, the display device according to the embodiment of the invention may be referred to as the display unit 180Q.

Figure 120:
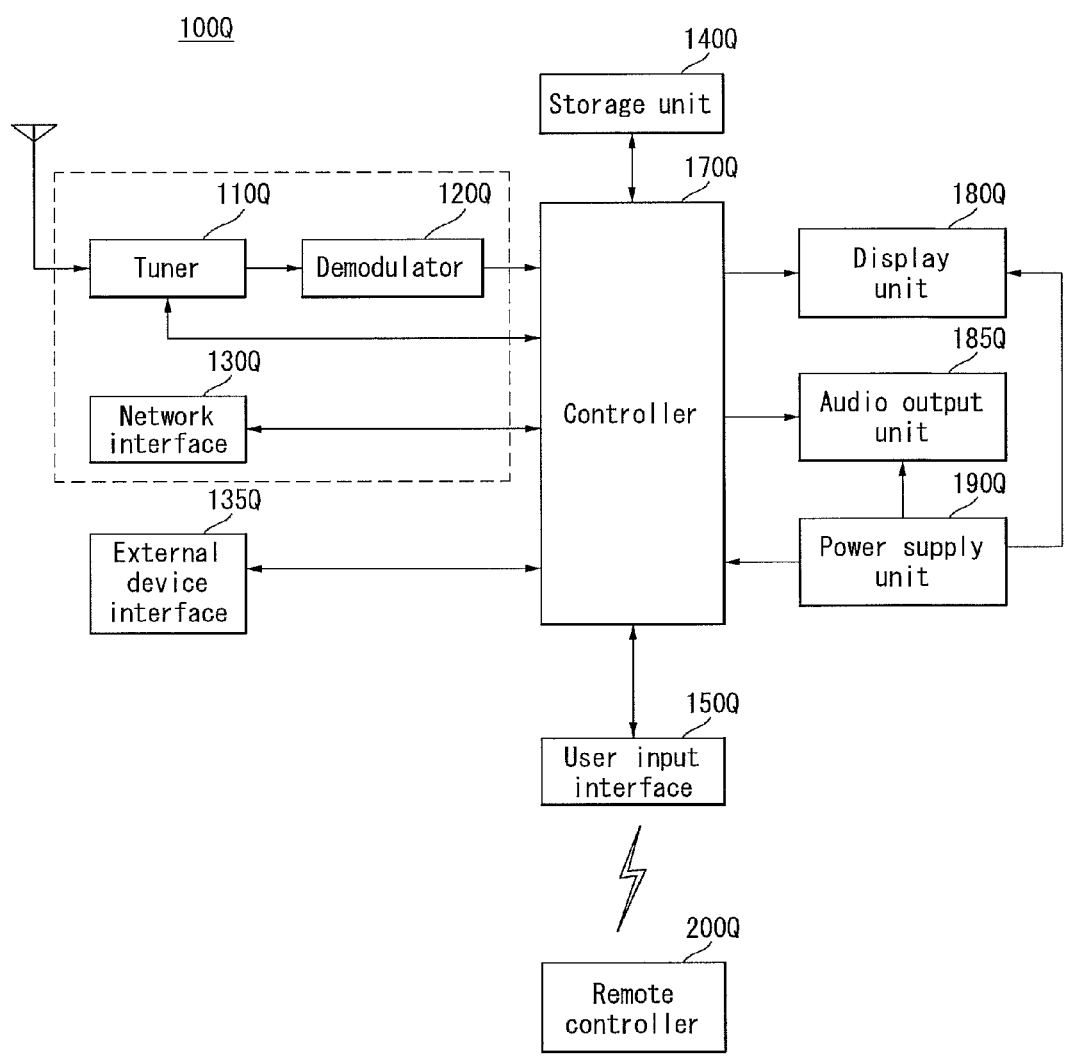
FIGS. 120 to 128 illustrate another configuration of a display device according to an example embodiment of the invention.

As shown in FIG. 120, a broadcasting signal receiver 100Q according to the embodiment of the invention may include a broadcasting receiving unit 105Q, an external device interface 135Q, a storage unit 140Q, a user input interface 150Q, a controller 170Q, a display unit 180Q, an audio output unit 185Q, a power supply unit 190Q, and a photographing unit (not shown). The broadcasting receiving unit 105Q may include a tuner 110Q, a demodulator 120Q, and a network interface 130Q.

If necessary, the broadcasting receiving unit 105Q may be designed so that it includes the tuner 110Q and the demodulator 120Q and does not include the network interface 130Q. On the contrary, the broadcasting receiving unit 105Q may be designed so that it includes the network interface 130Q and does not include the tuner 110Q and the demodulator 120Q.

The tuner 110Q tunes a radio frequency (RF) broadcasting signal, which corresponds to a channel selected by the user or all of previously stored channels, among RF broadcasting signals received through an antenna. Further, the tuner 110Q converts the tuned RF broadcasting signal into a middle frequency signal, a base band image signal, or a voice signal.

The demodulator 120Q receives a digital IF signal converted by the tuner 110Q and performs a demodulating operation.

The demodulator 120Q may perform the demodulating and the channel decoding and then may output a stream signal. The stream signal output by the demodulator 120Q may be a signal obtained by multiplexing an image signal, a voice signal, or a data signal. For example, the stream signal may be MPEG-2 transport stream (TS) obtained by multiplexing MPEG-2 standard image signal, Dolby AC-3 standard voice signal, etc. More specifically, the MPEG-2 TS may include 4-byte header and 184-byte payload.

The stream signal output by the demodulator 120Q may be input to the controller 170Q. The controller 170Q performs demultiplexing, image/voice signal processing, etc. Then, the controller 170Q outputs an image to the display unit 180Q and outputs a voice to the audio output unit 185Q.

The external device interface 135Q may connect an external device to the broadcasting signal receiver 100Q. For this, the external device interface 135Q may include an audio-visual (AV) input/output unit (not shown) or a wireless communication unit (not shown).

The network interface 130Q provides an interface for connecting the broadcasting signal receiver 100Q to a wired/wireless network including an internet network.

The storage unit 140Q may store a program for the signal processing and the control operation of the controller 170Q and may store the processed image signal, the processed voice signal, or the data signal. Further, the storage unit 140Q may temporarily store the image, the voice, or the data signal received from the external device interface 135Q or the network interface 130Q. The storage unit 140Q may store information about a predetermined broadcasting channel through its channel memory function.

The user input interface 150Q may transfer the signal the user inputs to the controller 170Q, or may transfer the signal from the controller 170Q to the user.

For example, the user input interface 150Q may receive and process the control signal indicating the turn-on or turn-off operation, the channel selection, the screen setting, etc. from a remote controller 200Q based on various communication manners such as a RF communication manner and an infrared communication manner. Alternatively, the user input interface 150Q may operate so that the control signal from the controller 170Q is transmitted to the remote controller 200Q.

For example, the user input interface 150Q may transfer a control signal, which is input from a power key, a channel key, a volume key, a local key, etc., to the controller 170Q.

The controller 170Q may perform the demultiplexing processing on the stream input through the tuner 110Q, the demodulator 120Q, or the external device interface 135Q or may perform the processing of demultiplexed signals, thereby generating or outputting the signals for outputting the image or the voice.

The image signal processed by the controller 170Q may be input to the display unit 180Q and may display an image corresponding to the image signal. Further, the image signal processed by the controller 170Q may be input to an external output device through the external device interface 135Q.

The voice signal processed by the controller 170Q may be output to the audio output unit 185Q. Further, the voice signal processed by the controller 170Q may be input to the external output device through the external device interface 135Q.

The controller 170Q may control the entire operation of the broadcasting signal receiver 100Q. For example, the controller 170Q may control the tuner 110Q, so that the tuner 110Q tunes a RF broadcasting signal corresponding to a channel selected by the user or a previously stored channel.

The controller 170Q may control the broadcasting signal receiver 100Q using a user command or an internal program input through the user input interface 150Q. In particular, the controller 170Q may be connected to the network and may allow an application or an application list the user wants to be downed to the broadcasting signal receiver 100Q.

For example, the controller 170Q controls the tuner 110Q, so that a signal of a channel selected based on a predetermined channel selection command received through the user input interface 150Q is input. The controller 170Q processes the image, the voice, or the data signal of the selected channel. The controller 170Q controls that channel information, the user selects, along with the processed image or the processed voice through may be output through the display unit 180Q and the audio output unit 185Q.

The controller 170Q may control the display unit 180Q, so that the display unit 180Q displays the image. For example, the controller 170Q may control the display unit 180Q, so that the display unit 180Q displays a broadcasting image input through the tuner 110Q, an external input image input through the external device interface 135Q, an image input through the network interface, or an image stored in the storage unit 140Q.

The display unit 180Q may convert the image signal, the data signal, and an OSD signal, which are processed by the controller 170Q, or the image signal and the data signal which are received from the external device interface 135Q, into red, green, and blue signals and may generate a driving signal.

The audio output unit 185Q may receive the voice signal (for example, stereo signal, 3.1 channel signal, or 5.1 channel signal) processed by the controller 170Q and may output the voice.

The power supply unit 190Q supplies the power required in all of the components of the broadcasting signal receiver 100Q.

The remote controller 200Q transmits the user command the user inputs to the user input interface 150Q. For this, the remote controller 200Q may use Bluetooth, RF communication, infrared communication, Ultra-wideband (UWB), Zigbee, etc.

The remote controller 200Q may receive the image, the voice, or the data signal output from the user input interface 150Q and may display the image, the voice, or the data signal or may output the voice or the vibration.

Unlike the configuration illustrated in FIG. 120, the broadcasting signal receiver 100Q may not include the tuner 110Q and the demodulator 120Q. Further, the broadcasting signal receiver 100Q may receive image contents through the network interface 130Q or the external device interface 135Q and may reproduce the image contents.

Figure 121:
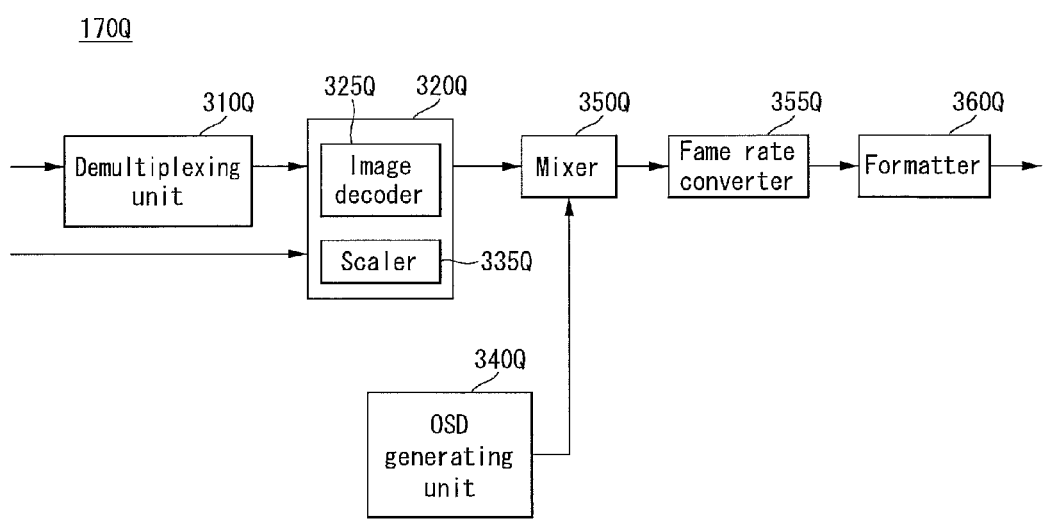

FIG. 121 is an internal block diagram of the controller shown in FIG. 120.

As shown in FIG. 121, the controller 170Q may include a demultiplexing unit 310Q, an image processing unit 320Q, an OSD generating unit 340Q, a mixer 350Q, a frame rate converter 355Q, and a formatter 360Q. The controller 170Q may further include an audio processing unit (not shown) and a data processing unit (not shown).

The demultiplexing unit 310Q demultiplexes an input stream. For example, when MPEG-2 TS is input, the demultiplexing unit 310Q may demultiplex the MPEG-2 TS and may divide the MPEG-2 TS into an image, a voice, and a data signal. A stream signal input to the demultiplexing unit 310Q may be a stream signal output to the tuner 110Q, the demodulator 120Q, or the external device interface 135Q.

The image processing unit 320Q may perform image processing on the demultiplexed image signal. For this, the image processing unit 320Q may include an image decoder 325Q and a scaler 335Q.

The image decoder 325Q decodes the demultiplexed image signal The scaler 335Q performs a scaling operation, so that a resolution of the decoded image signal can be output to the display unit 180Q.

The image decoder 325Q may have various standards of decoders.

For example, when the demultiplexed image signal is the decoded image signal of MPEG-2 standard, the demultiplexed image signal may be decoded by MPEG-2 decoder Further, for example, when the demultiplexed image signal is the decoded image signal of H.264 standard based on digital multimedia broadcasting (DMB) manner or DVB-H, the demultiplexed image signal may be decoded by H.264 decoder.

The image signal decoded by the image processing unit 320Q is input to the mixer 350Q.

The OSD generating unit 340Q generates an OSD signal based on the user input or based on its own input. For example, the OSD generating unit 340Q may generate a signal for displaying various informations on the screen of the display unit 180Q based on the control signal from the user input interface 150Q as a graphic or a text. The generated OSD signal may include various data such as a user interface screen, various menu screens, widget, and icons of the broadcasting signal receiver 100Q.

The mixer 350Q may mix the OSD signal generated by the OSD generating unit 340Q with the image signal decoded by the image processing unit 320Q. The mixed signal is provided to the formatter 360Q. Because the decoded broadcasting image signal or the external input signal is mixed with the OSD signal, the OSD may be overlaid and displayed on the broadcasting image or the external input image. For example, a cursor the OSD generating unit 340Q generates may be displayed on the display unit 180Q.

The frame rate converter 355Q may convert a frame rate of the input image. For example, the frame rate converter 355Q may convert a frame rate of 60 Hz into a frame rate of 120 Hz or 240 Hz. When the frame rate of 60 Hz is converted into the frame rate of 120 Hz, a first frame may be inserted between the first frame and a second frame. Alternatively, a third frame estimated from the first and second frames may be inserted between the first frame and the second frame. When the frame rate of 60 Hz is converted into the frame rate of 240 Hz, the three same frames may be inserted or the three estimated frames may be inserted. The input frame rate may be maintained without a separate conversion.

The formatter 360Q receives an output signal of the frame rate converter 355Q and converts the output signal into a signal of a format suitable for the display unit 180Q. The formatter 360Q then outputs the signal. For example, the formatter 360Q may output R, G, and B data signals, and the R, G, and B data signals may be output as a low voltage differential signaling (LVDS) signal or a mini-LVDS signal.

Other configurations other than the controller 170Q shown FIG. 121 may be used. For example, other module may be added to or omitted in the controller 170Q shown FIG. 121.

As described above with reference to FIGS. 1 to 119, in the display unit 180Q of the broadcasting signal receiver 100Q, the edge of the front surface of the front substrate 101 of the display panel 100 may be exposed.

Figure 122:
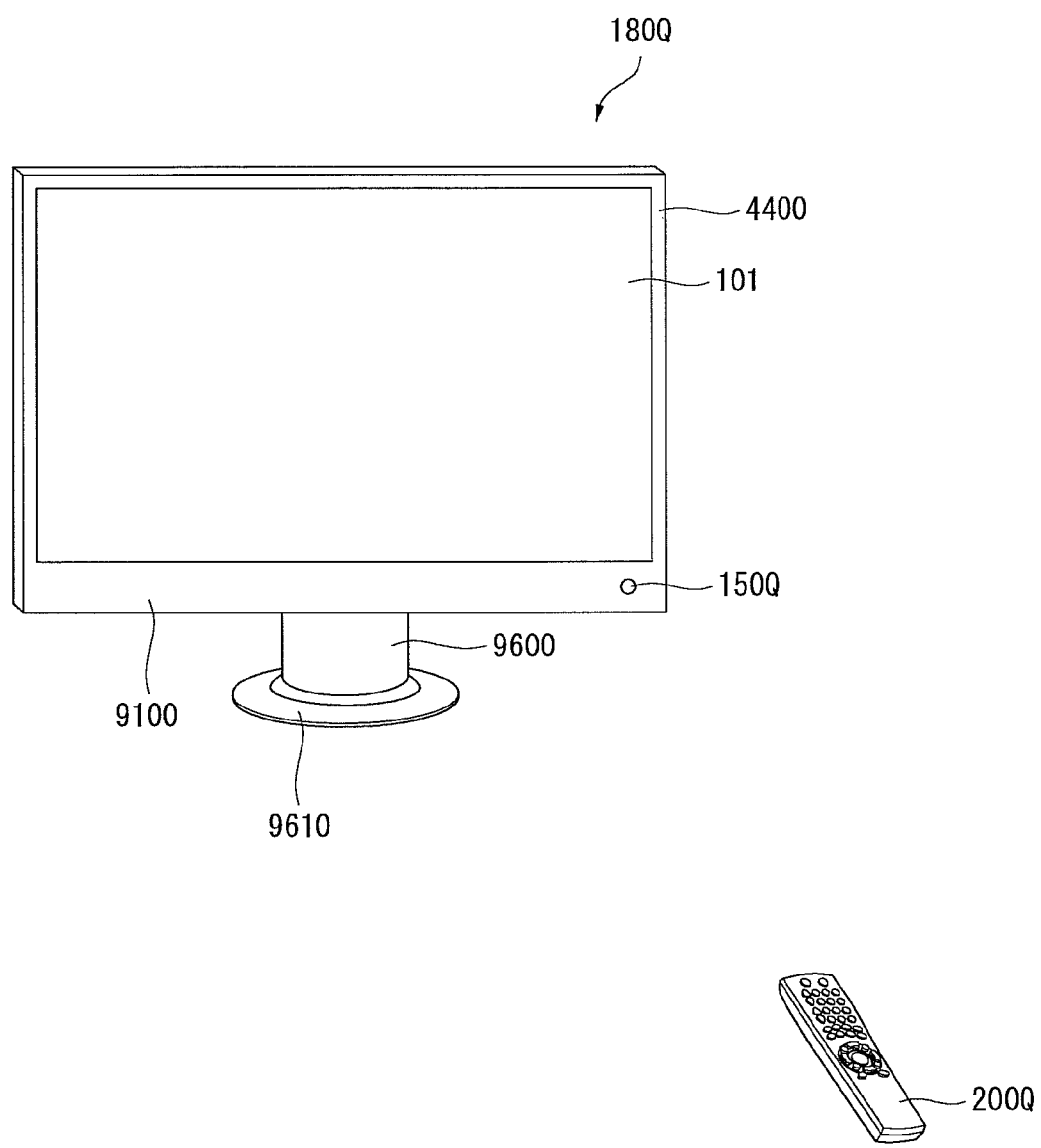
Figure 123:
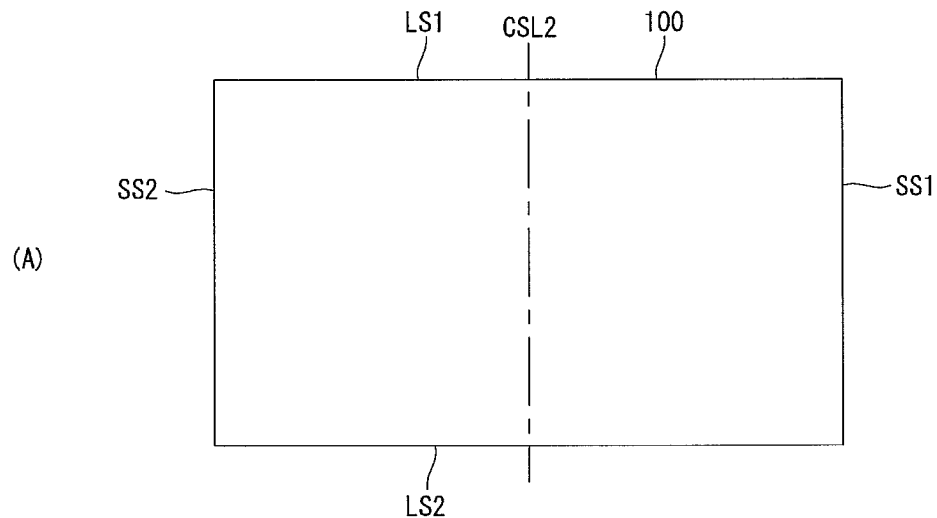
Figure 123:
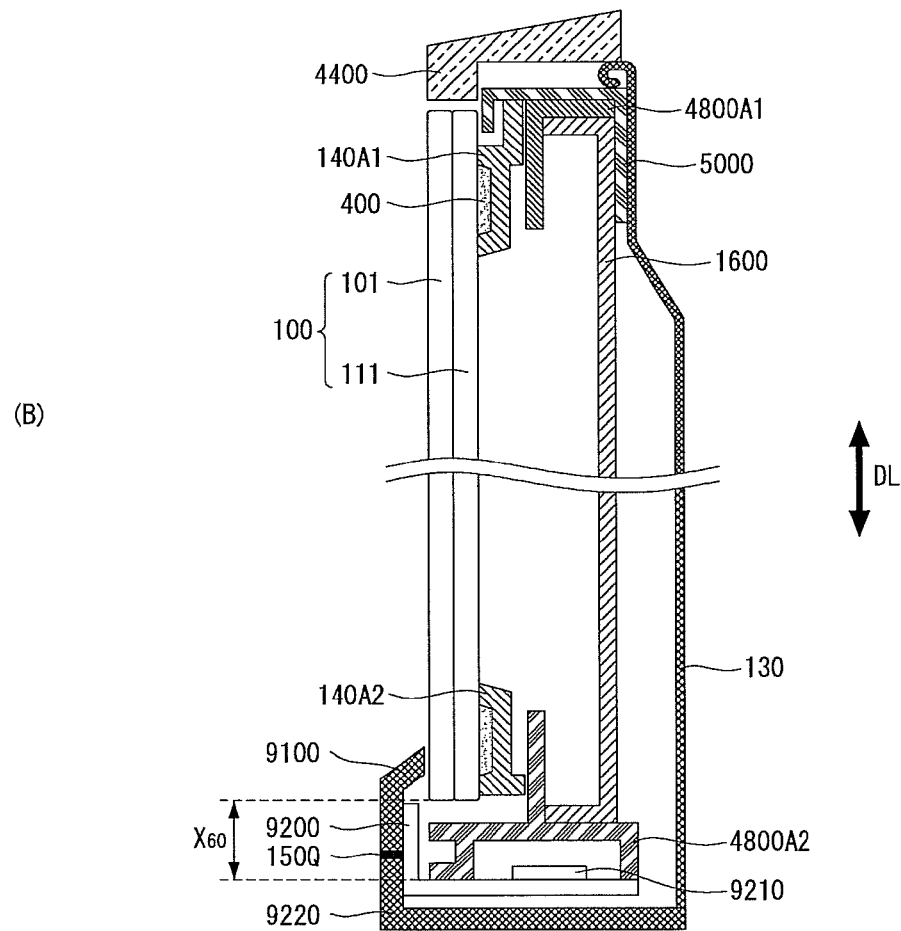

As shown in FIG. 122, the side cover 4400 may be disposed on the side, for example, the first long side LS1, the first short side SS1, and the second short side SS2 of the display panel 100.

A bottom cover 9100 may be disposed on the lower side, for example, the second long side LS2 of the display panel 100.

A stay 9610 may be disposed under the bottom cover 9100 and may be connected to the display unit 180Q through a connector 9600.

When the user in the front of the display unit 180Q sees the display unit 180Q, it may be difficult for the user to perceive the bottom cover 9100. On the contrary, the user may easily perceive the side cover 4400 on the side of the display panel 100. This is because the side cover 4400 is positioned on the side or the upper side of the image and the bottom cover 9100 is positioned on the lower side of the image. Thus, the user may easily perceive the side cover 4400.

Accordingly, in the embodiment disclosed herein, a width of the bottom cover 9100 may be greater than a width of the side cover 4400

In this instance, the user input interface 150Q may be disposed on the bottom cover 9100 having the relatively large width. Namely, the user input interface 150Q may be disposed on the lower side of the display unit 180Q.

It is assumed that the first transverse bracket 140A1 is disposed on the first long side LS1 of the back substrate 111; a first transverse auxiliary bracket 4800A1 is disposed at a location corresponding to the first transverse bracket 140A1; the second transverse bracket 140A2 is disposed on the second long side LS2 of the back substrate 111; a second transverse auxiliary bracket 4800A2 is disposed at a location corresponding to the second transverse bracket 140A2; the first longitudinal bracket 140B1 is disposed on the first short side SS1 of the back substrate 111; a first longitudinal auxiliary bracket 4800B1 is disposed at a location corresponding to the first longitudinal bracket 140B1; the second longitudinal bracket 140B2 is disposed on the second short side SS2 of the back substrate 111; and a second longitudinal auxiliary bracket 4800B2 is disposed at a location corresponding to the second longitudinal bracket 140B2.

FIG. 123(B) is a cross-sectional view taken along a straight line CSL2, which passes through the first and second long sides LS1 and LS2 of the display panel 100 as shown in FIG. 123(A). As shown in FIG. 123(B), the side cover 4400 may be disposed at an end (corresponding to the first long side LS1) of one side of the display device, and the bottom cover 9100 may be disposed at an end (corresponding to the second long side LS2) of the other side of the display device.

The second transverse auxiliary bracket 4800A2 may extend to the outside of the display panel 100 by a distance X60 in a longitudinal direction DL of the display panel 100.

The bottom cover 9100 may cover a portion of the front substrate 101. In this instance, the bottom cover 9100 may include a portion positioned on the front surface of the front substrate 101. The bottom cover 9100 may be connected to the back cover 130.

A bottom frame 9200 may be disposed under the second transverse auxiliary bracket 4800A2. A driving bard 9210 may be disposed between the second transverse auxiliary bracket 4800A and the bottom frame 9200. The driving bard 9210 may supply driving signals to the display panel 100. Alternatively, the driving bard 9210 may supply driving signals to the backlight unit (not shown).

The frame 1600 may be disposed between the back cover 130 and the display panel 100. One side of the frame 1600 is connected to the first transverse auxiliary bracket 4800A1, and the other side is connected to the second transverse auxiliary bracket 4800A.

The user input interface 150Q may be disposed on the bottom cover 9100.

As above, when the user input interface 150Q is disposed on the bottom cover 9100, the image may be more remarkably displayed on the display panel 100. The user may easily input his or her commands.

Figure 124:
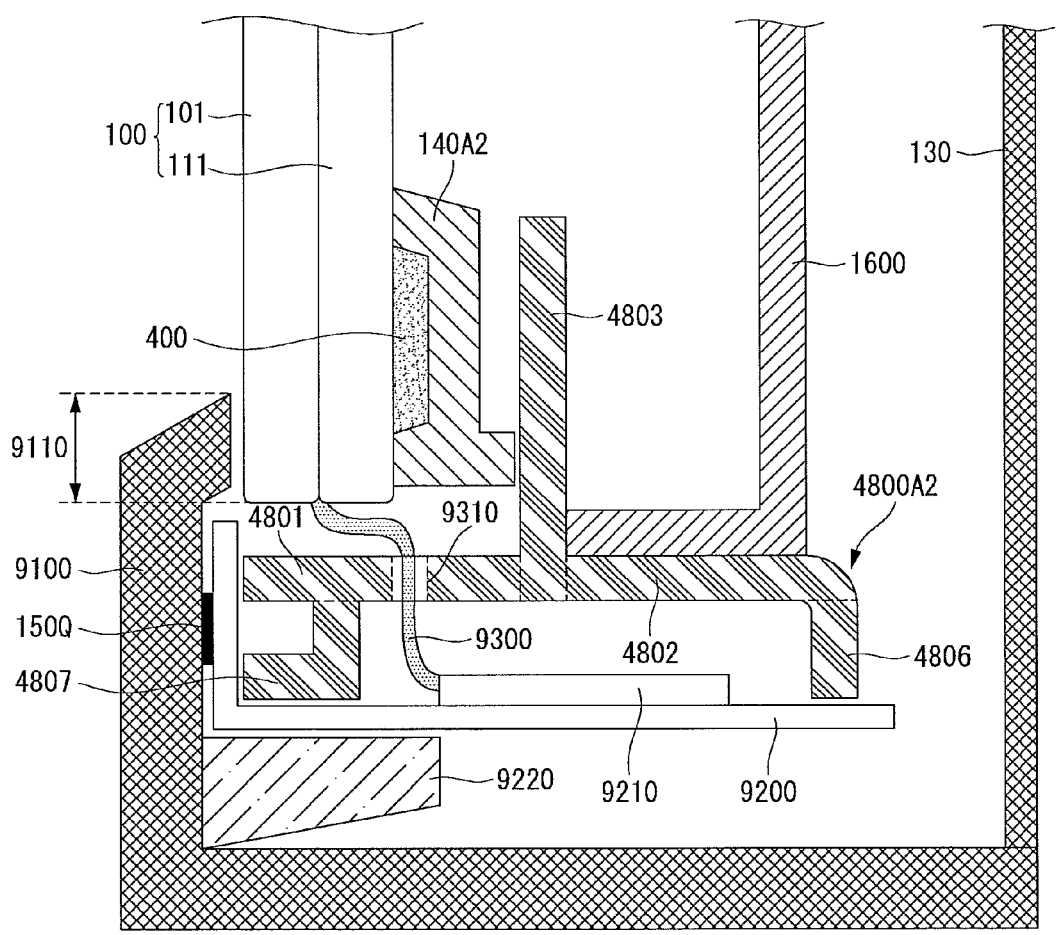

Alternatively, as shown in FIG. 124, the bottom frame 9200 may include a portion between the bottom cover 9100 and the second transverse auxiliary bracket 4800A2, so as to improve the structural stability.

A frame supporter 9220 for supporting the bottom frame 9200 may be formed on the bottom cover 9100.

It may be preferable that the driving board 9210 is electrically connected to the display panel 100 so as to supply the driving signals to the display panel 100. For this, a cable 9300 may be disposed between the driving board 9210 and the display panel 100 to electrically connect the driving board 9210 to the display panel 100.

Further, the second transverse auxiliary bracket 4800A2 may include a through hole 9310 through which the cable 9300 passes.

The user input interface 150Q may be disposed on the bottom of the bottom cover 9100. For example, the user input interface 150Q may be disposed between the bottom cover 9100 and the bottom frame 9200.

The bottom cover 9100 may include a portion having light transmission capable of transmitting light, so that the user command, the user inputs using the remote controller 200Q, passes through the bottom cover 9100 and reaches the user input interface 150Q.

In this instance, the user command input through the remote controller 200Q may pass through the bottom cover 9100 and may be transferred to the user input interface 150Q.

As above, when the user input interface 150Q is disposed on the bottom of the bottom cover 9100, the user may perceive that the user input interface 150Q is hidden by the bottom cover 9100. Further, because a space for the user input interface 150Q is not separately necessary, the attractive appearance of the display panel 100 may be provided.

FIG. 125(B) is a cross-sectional view taken along a straight line CSL1, which passes through the first and second short sides SS1 and SS2 of the display panel 100 as shown in FIG. 125(A). As shown in FIG. 125(B), the side covers 4400 may be disposed at both ends of the display device, respectively.

The width of the side cover 4400 may gradually increase as the side cover 4400 goes toward the back cover 130. Hence, a maximum width X40 of the display device adjacent to the back cover 130 may be greater than a maximum width X41 of the display device adjacent to the front substrate 101 of the display panel 100.

Figure 125:
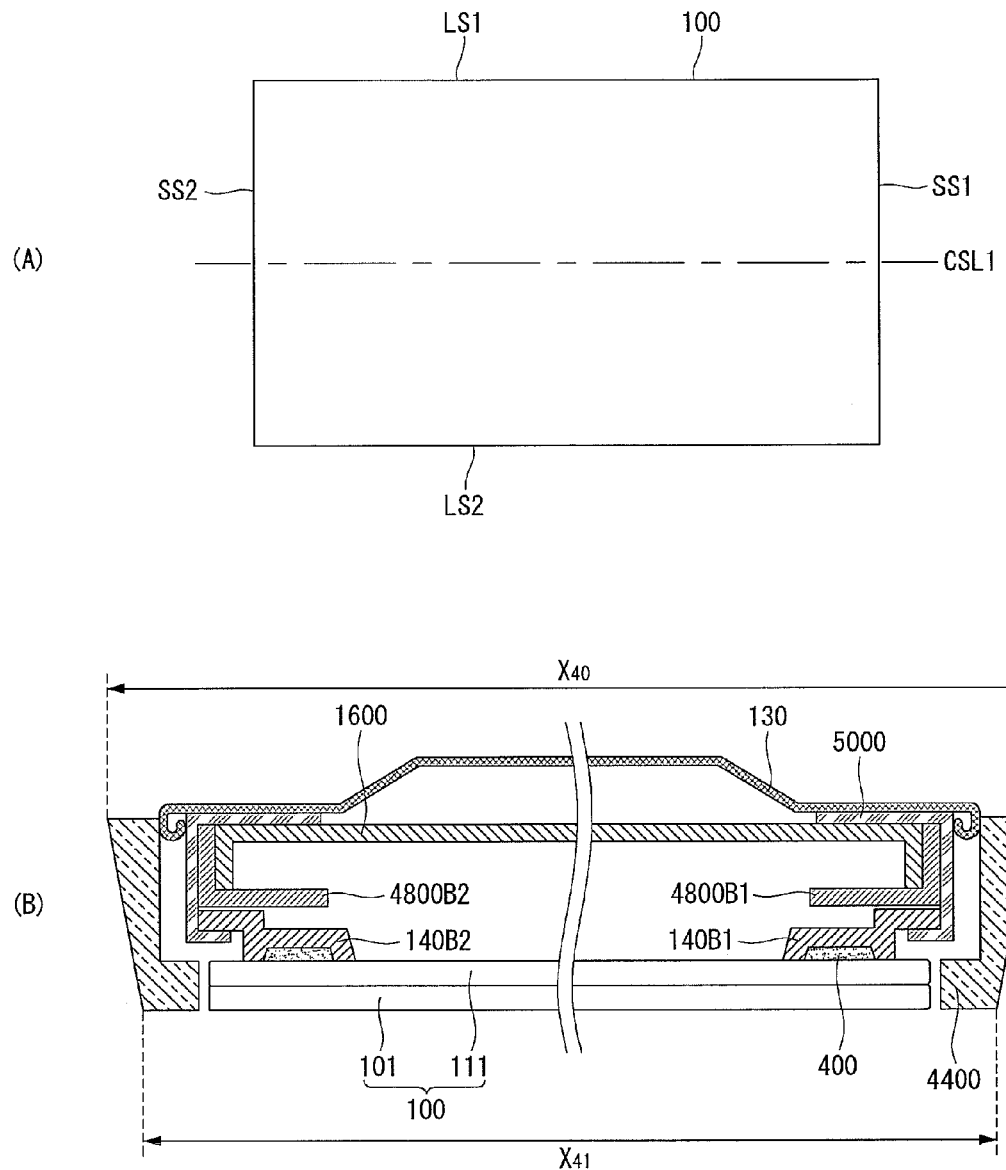
Figure 126:
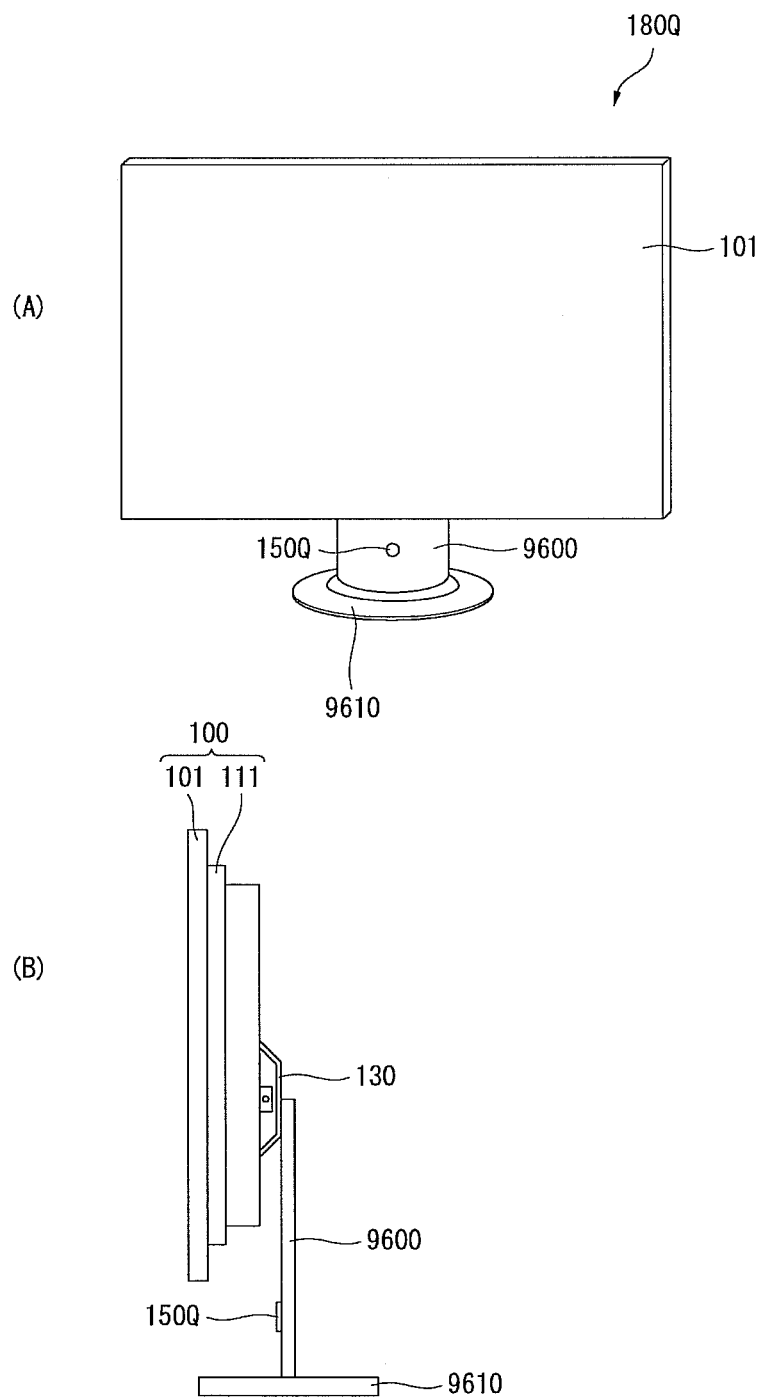

Since the configuration of the display device illustrated in FIG. 125 may be fully analogized based on the above description, a further description may be briefly made or may be entirely omitted.

Alternatively, the user input interface 150Q may be disposed on the connector 9600 for connecting the display unit 180Q to the stay 9610.

For example, as shown in FIGS. 126(A) and 126(B), the user input interface 150Q may be disposed on the connector 9600. In other words, the user input interface 150Q may be not hidden by the display unit 180Q. This may be applied when the edge of the front surface of the front substrate 101 and the side of the front substrate 101 are exposed.

More specifically, when the edge of the front surface of the front substrate 101 and the side of the front substrate 101 are exposed, a space for disposing the user input interface 150Q on the side of the display panel 100 may be insufficient. Thus, the user input interface 150Q may be disposed on the connector 9600.

The connector 9600 may be connected to the back cover 130 positioned in the rear of the display panel 100.

A command input unit for inputting the user command may be formed on the stay 9610.

Figure 127:
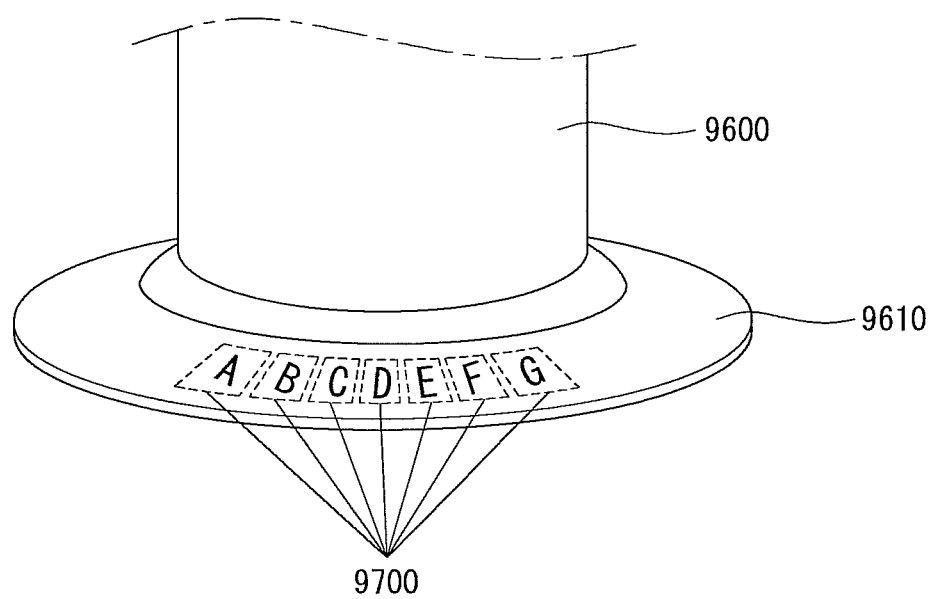

For example, as shown in FIG. 127, a command input unit 9700 for inputting the user command, such as turn-on and turn-off operations of the display device and the channel change, may be formed on the stay 9610. Functions of the command input unit 9700 on the stay 9610 are not limited.

The command input unit 9700 may be configured as a touch sensor. Further, the touch sensor may be disposed inside the stay 9610.

Figure 128:
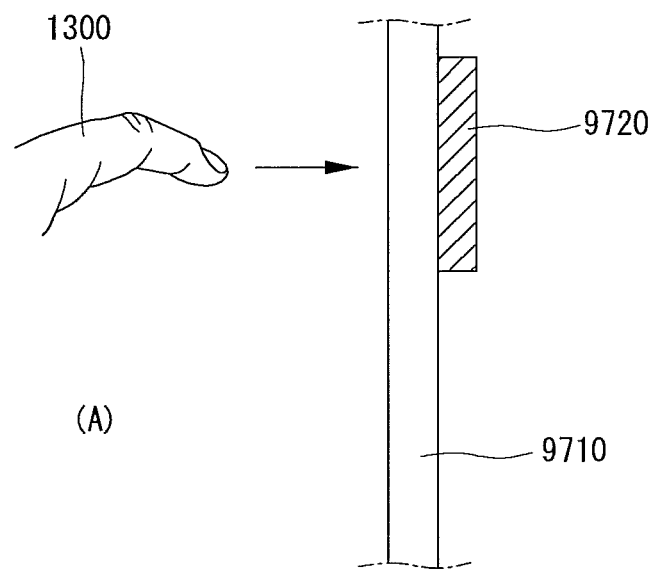
Figure 128:
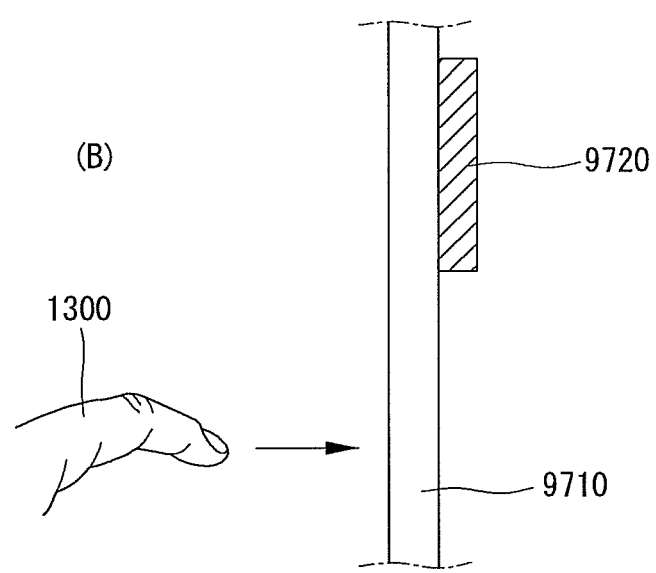

For example, as shown in FIG. 128, the stay 9610 includes a stay housing 9710, and a touch sensor 9720 may be disposed on the bottom of the stay housing 9710.

When the user touches a portion of the stay housing 9710, the touch sensor 9720 may recognize the user's touch operation and may drive the broadcasting signal receiver 100Q.

The touch sensor 9720 may be a sensor capable of sensing the user's body or a small capacitance a specific object has. In this instance, when the user performs a touch operation using his or her body or a specific object having the capacitance, the touch sensor 9720 may recognize the user's touch operation and operate.

For example, as shown in FIG. 128(A), when the user touches a formation area of the touch sensor 9720 in the stay housing 9710, the touch sensor 9720 may sense small changes in the capacitance generated by the user's touch operation and may recognize the user's touch operation. Hence, the broadcasting signal receiver 100Q may perform a predetermined operation.

On the other hand, as shown in FIG. 128(B), when the user touches a non-formation area of the touch sensor 9720 in the stay housing 9710, the touch sensor 9720 may not operate.

As above, when the touch sensor 9720 is disposed in a predetermined area of the stay housing 9710, a portion of the stay housing 9710 may be used as a switch.

The touch sensor 9720 may directly contact the stay housing 9710. Alternatively, a non-conductive buffer (not shown) may be disposed between the stay housing 9710 and the touch sensor 9720.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising
a front panel and a rear panel attached to each other and having a plurality of liquid crystals provided in a gap between the first and rear panels;
a plurality of first brackets adhered to the rear panel by an adhesive, the first bracket having a first surface where the adhesive is applied, and a first protrusion extending in a first direction from a second surface and a second protrusion extending in a second direction from the first protrusion, the first and second surfaces being opposite surfaces;
at least one second bracket provided adjacent to the plurality of the first brackets, and the second bracket having a first ledge and a second ledge extending in the second direction and the first ledge being provided over the second protrusion of the first bracket;
at least one connection bracket having a side wall extending in a third direction and a portion extending from the side wall in the second direction to be parallel and adjacent to the second protrusion of the first bracket, and the first, second and third directions being perpendicular to each other;
a frame in contact with the second bracket; and
a light source having at least an optical sheet, a light guide and a plurality of light emitting diodes (LEDs), the light source being provided between the frame and the second bracket.

2. The display apparatus of claim 1, further comprising a protective layer provided on edges of the front and rear panels.

3. The display apparatus of claim 1, further comprising a side cover provided adjacent to sides of the front and rear panels.

4. The display apparatus of claim 3, further comprising a rear cover over the frame.

5. The display apparatus of claim 1, wherein the first and second protrusions form an inverted L-shape.

6. The display apparatus of claim 1, wherein the second bracket includes a side wall which extends in parallel with the side wall of the connection bracket.

7. The display apparatus of claim 6, wherein the connection bracket includes an opening to receive an end of the side wall and the end protrudes through the opening.

8. The display apparatus of claim 1, wherein the second ledge extends from the first ledge.

9. The display apparatus of claim 1, wherein the second ledge is configured to provide support for at least one of the optical sheet or the light guide.

10. The display apparatus of claim 1, wherein the frame covers the light source.

11. The display apparatus of claim 3, wherein the side cover includes a sidewall extending in the first direction, and an overhang portion extending in a second direction, a first end portion of the sidewall covering the sides of the front and rear panels, the overhang portion being provide at the second end portion, which opposite from the first end portion, and the overhang portion being space from an end of the sidewall by a prescribed distance in the first direction.

12. The display apparatus of claim 1, wherein a first polarizing film having a first prescribed width is provided on the front panel and a second polarizing film having a second prescribed width is provided on the rear panel, the first prescribed width being greater than the second prescribed width in at least one of first direction or the second direction.

13. The display apparatus of claim 12, wherein the second polarizing film is spaced from the plurality of first brackets by a prescribed distance.

14. The display apparatus of claim 1, wherein adjacent first brackets at corners of the rear panel are separated by a distance, which is different from a distance separating adjacent first brackets in the first direction or the second direction.

15. The display apparatus of claim 1, wherein the second bracket and the connection bracket are fastened to each other by a fastening member.

16. The display apparatus of claim 13, wherein the first brackets overlap the first polarizing film.

17. The display device of claim 1, wherein the display panel further includes a blocking member positioned at an edge of a front surface of the front panel, a width of the blocking member is greater than a width of the first brackets and the blocking member overlaps the first brackets.

* * * * *